United States Patent [19]
Purcell et al.

[11] Patent Number: 6,122,442
[45] Date of Patent: Sep. 19, 2000

[54] STRUCTURE AND METHOD FOR MOTION ESTIMATION OF A DIGITAL IMAGE BY MATCHING DERIVED SCORES

[75] Inventors: Stephen C. Purcell, Mountain View; Didier J. Le Gall, Los Altos, both of Calif.

[73] Assignee: C-Cube Microsystems, Inc., Milpitas, Calif.

[21] Appl. No.: 08/520,353

[22] Filed: Aug. 28, 1995

Related U.S. Application Data

[62] Division of application No. 08/105,253, Aug. 9, 1993.

[51] Int. Cl.[7] .................................................. G06T 1/00
[52] U.S. Cl. ........................ 395/118; 395/133; 395/152
[58] Field of Search .................................. 395/118, 119, 395/133, 137, 138, 152, 153, 154, 155, 1, 161; 382/236

[56] References Cited

U.S. PATENT DOCUMENTS

| | | | |
|---|---|---|---|
| 3,252,148 | 5/1966 | Mitchell | 327/144 |
| 3,812,467 | 5/1974 | Batcher | 395/800 |
| 4,489,395 | 12/1984 | Sato | 395/800 |
| 4,514,808 | 4/1985 | Murayama et al. | 395/307 |
| 4,559,608 | 12/1985 | Young et al. | 364/786 |
| 4,591,976 | 5/1986 | Webber et al. | 395/182.18 |

(List continued on next page.)

FOREIGN PATENT DOCUMENTS

| | | |
|---|---|---|
| 0 052 157 | 5/1982 | European Pat. Off. . |
| 0 192 292 | 8/1986 | European Pat. Off. . |
| 0 267 578 | 5/1988 | European Pat. Off. . |
| 0 287 891 | 10/1988 | European Pat. Off. . |
| 0 292 943 | 11/1988 | European Pat. Off. . |
| 0 325 856 | 8/1989 | European Pat. Off. . |
| 0 395 271 | 10/1990 | European Pat. Off. . |

(List continued on next page.)

OTHER PUBLICATIONS

IEEE 1988 Custom Integrated Circuits Conference, May 1988 Rochester, N.Y., US, pp. 24.5. 1–24.5.4, XP 000011005 Keshlear et al. A High Speed 16–Bit Cascadable Alu Using An Aspect Standard Cell Approaach.

IBM Technical Disclosure Bulletin, vol. 30, No. 11, Apr. 1988 New York US pp. 288–290, 'Improved Zero Result Detection When Using a Carry Look–Ahead Adder'.

Patent Abstracts of Japan vol. 8 No. 248 (P–313), Nov. 14, 1984 & JP–A–59121539 (Fujitsu Kabushiki Kaisha).

Xerox Disclosure Journal, vol. 13, No. 4, Aug. 1988 Stamford, Conn, US, pp. 229–234, XP 000098156, Marshall, 'Fast NMOS Adder'.

Patterson, et al. 'Computer Architecture A Quantitative' Approach 1990, Morgan Kaufmann, San Mateo, CA US, XP 000407059.

IBM Technical Disclosure Bulletin, vol. 25, No. 11A, Apr. 1983 New York US, pp. 5613–5620, 'Phase Selector and Synchronizer for Two Phase Clock Circuits'.

(List continued on next page.)

*Primary Examiner*—Almis R. Jankus
*Attorney, Agent, or Firm*—Skjerven, Morrill, MacPherson, Franklin & Friel; Edward C. Kwok

[57] ABSTRACT

A structure and a format for providing a video signal encoder under the MPEG standard are provided. In one embodiment, the video signal interface is provided with a decimator for providing input filtering for the incoming signals. In one embodiment, the central processing unit (CPU) and multiple coprocessors implements DCT and IDCT and other signal processing functions, generating variable length codes, and provides motion estimation and memory management. The instruction set of the central processing unit provides numerous features in support for such features as alpha filtering, eliminating redundancies in video signals derived from motion pictures and scene analysis. In one embodiment, a matcher evaluates 16 absolute differences to evaluate a "patch" of eight motion vectors at a time.

30 Claims, 67 Drawing Sheets

U.S. PATENT DOCUMENTS

| | | | |
|---|---|---|---|
| 4,779,190 | 10/1988 | O'Dell et al. | 395/500 |
| 4,783,840 | 11/1988 | Song | 382/54 |
| 4,816,914 | 3/1989 | Ericsson | 348/405 |
| 4,829,380 | 5/1989 | Iadipaolo | 358/166 |
| 4,838,685 | 6/1989 | Martinez et al. | 352/85 |
| 4,870,563 | 9/1989 | Oguchi | 395/375 |
| 4,887,306 | 12/1989 | Hwang et al. | 382/54 |
| 4,935,942 | 6/1990 | Hwang et al. | 375/354 |
| 4,973,860 | 11/1990 | Ludwig | 327/145 |
| 5,014,187 | 5/1991 | Debize et al. | 395/886 |
| 5,040,225 | 8/1991 | Gouge | 382/6 |
| 5,049,993 | 9/1991 | LeGall et al. | 348/448 |
| 5,099,322 | 3/1992 | Gove | 348/700 |
| 5,134,480 | 7/1992 | Wang et al. | 358/140 |
| 5,144,687 | 9/1992 | Honda | 382/54 |
| 5,157,732 | 10/1992 | Ishii et al. | 382/1 |
| 5,157,742 | 10/1992 | Niihara | 382/236 |
| 5,168,356 | 12/1992 | Acampora et al. | 358/133 |
| 5,196,946 | 3/1993 | Balkansi et al. | 358/433 |
| 5,227,878 | 7/1993 | Puri et al. | 358/136 |
| 5,231,484 | 7/1993 | Gonzales et al. | 358/133 |
| 5,247,586 | 9/1993 | Gobert et al. | 382/42 |
| 5,270,955 | 12/1993 | Bosshart et al. | 364/736.5 |
| 5,317,397 | 5/1994 | Odaka et al. | 348/416 |
| 5,335,321 | 8/1994 | Harney et al. | 395/162 |
| 5,400,076 | 3/1995 | Iwamura | 348/416 |
| 5,408,274 | 4/1995 | Chang et al. | 348/700 |
| 5,418,907 | 5/1995 | Ohki | 395/166 |
| 5,438,633 | 8/1995 | Ghaderi | 382/270 |
| 5,442,747 | 8/1995 | Chan et al. | 395/164 |
| 5,455,908 | 10/1995 | Ishida | 395/166 |
| 5,461,423 | 10/1995 | Tsukagoshi | 348/416 |
| 5,475,430 | 12/1995 | Hamada et al. | 348/394 |
| 5,486,876 | 1/1996 | Lew et al. | 348/719 |
| 5,488,419 | 1/1996 | Hui et al. | 348/402 |

FOREIGN PATENT DOCUMENTS

| | | |
|---|---|---|
| 0478132A1 | 8/1991 | European Pat. Off. . |
| 0 444 660 | 9/1991 | European Pat. Off. . |
| 0 446 001 | 9/1991 | European Pat. Off. . |
| 0 447 203 | 9/1991 | European Pat. Off. . |
| 0 447 234 | 9/1991 | European Pat. Off. . |
| 0453653A3 | 10/1991 | European Pat. Off. . |
| 0 456 394 | 11/1991 | European Pat. Off. . |
| 0 466 981 | 1/1992 | European Pat. Off. . |
| 0 500 174 | 8/1992 | European Pat. Off. . |
| 0 503 956 | 9/1992 | European Pat. Off. . |
| 0 528 366 | 2/1993 | European Pat. Off. . |
| 0572263A2 | 12/1993 | European Pat. Off. . |
| 0574748A2 | 12/1993 | European Pat. Off. . |
| 0 588 668 | 3/1994 | European Pat. Off. . |
| 0 637 894 | 2/1995 | European Pat. Off. . |
| 43 05 578 | 9/1993 | Germany . |
| 43 07 418 | 2/1994 | Germany . |
| 63-245716 | 10/1988 | Japan . |
| 2037117A | 7/1980 | United Kingdom . |
| 2 236 449 | 4/1991 | United Kingdom . |
| 91 03123 | 3/1991 | WIPO . |
| 91 06182 | 5/1991 | WIPO . |
| 93 12486 | 6/1993 | WIPO . |
| 93 21733 | 10/1993 | WIPO . |

OTHER PUBLICATIONS

IEEE Transactions on Circuits and Systems, vol. 36, No. 10, Oct. 1989 New York US, pp. 1275–1280, XP 000085314 Schmidt A Memory Control Chip For Formatting Data Into Blocks Suitable For Video Coding Applications p. 1277, right column, paragraph 2—p. 1278, left column, paragraph 3.

IEEE Transactions on Consumer Electronics, vol. 38, No. 3, Aug. 1992 New York US, pp. 325–340, XP 00011862 Netravali, et al. 'A Codec for HDTV' *p. 327, left column, paragraph right column, paragraph 1*.

IEEE Journal of Solid–State Circuits, vol. SC–21, No. 1, Feb. 1986 New York US, pp. 140–149, Fortier et al. 'Architectures for VLSI Implementation of Movement–Compensated Video Processors' *p. 142, left column, paragraph 3—right column, paragraph 1*.

Signal Processing Image Communication., vol. 3, No. 1, Feb. 1991 Amsterdam NL, pp. 3–21, XP 000234778 Fadzil, et al. 'Video Subband VQ Coding At 64 kbit/s Using Short–Kernal Filter Banks With An Improved Motion Estimation Technique' *p. 7, left column, paragraph 1*.

IEEE Transactions on Communications, vol. COM–27, No. 9, Sep. 1979 New York, US, pp. 1310–1315, Wong, et al., 'Hardwae for Detection And Partial Correction Of PCM Transmission Errors' *p. 1311, left column, paragraph 6—right column, paragraph 1* *p. 1311, right column, last paragraph*.

Electronic Design, vol. 41, No. 9 May 1993 Hasbrouck Heights, New Jersey US, pp. 177–120, XP 000362680, Bursky, 'Image Processing Chip Set Handles Full–Motion Video'.

Patent Abstracts of Japan vol. 13. No. 54 (p–824), Feb. 8, 1989 & JP–A–63 245716 (Fujitsu Limited) Oct. 12, 1988.

"A Complete Single–Chip Implementation of the JPEG Image Compression Standard", Martin Bolton, etc., IEEE, May 12–15, 1991, pp. 12.2.1–12.2.4.

Spatial Techniques, Gonzales, Rafael, C., Library of Congress Cataloging–in–Publication Data, Nov. 1987, pp. 376–380.

"A Flexible Sampling–Rate Conversion Method", Julius O. Smith, et al, IEEE, 1984, pp. 19.4.1–19.4.4.

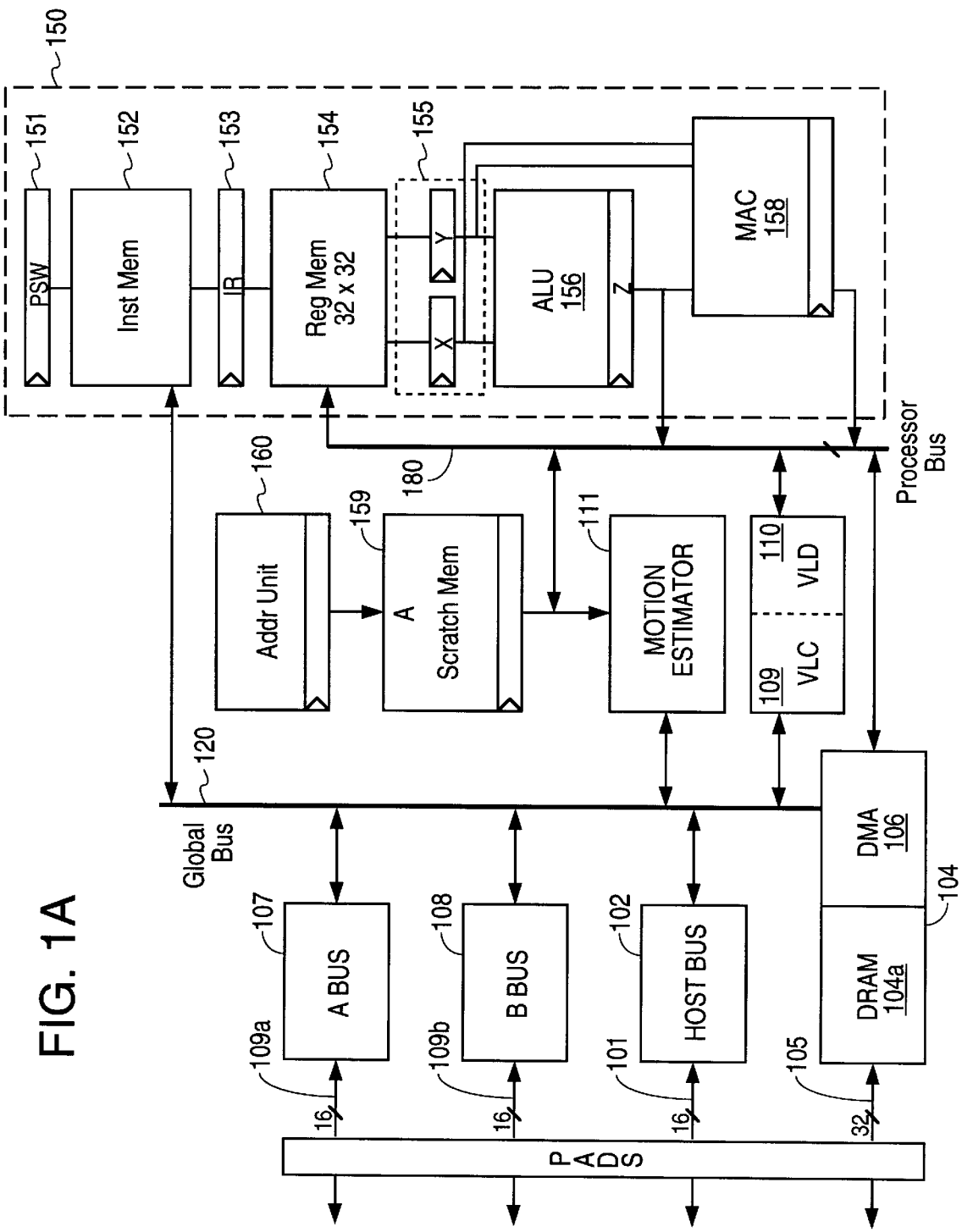

| | phase-0 | phase-1 | phase-2 | phase-3 | phase-4 | phase-5 | phase-6 | phase-7 |
|---|---|---|---|---|---|---|---|---|
| ROUT | D0 | D1 | B0 | B1 | | A | C0 | C1 |
| Ain | 16D0+R | 16D1+R | 8B0 | 8B1 | Sum/8 | 16A+R | -C0 | -C1 |
| Bin | 0 | Sum | 0 | Sum | Sum | Sum | Sum | Sum |
| Cin | 0 | 0 | 0 | 0 | | 1 | 1 | 1 |
| Dec | 0 | Sum/32 | 0 | 0 | | 0 | 0 | Sum/32 |

LUMA DATA :

DecOut = -1/32 C0+    9/32B0 + 1/2A + 9/32 B1    -1/32C1

CHROMA DATA;

DecOut = 1/2 D0 + 1/2D1

* Rounding = 15 ;

FIG. 5C

|   | phase-0 | phase-1 | phase-2 | phase-3 | phase-4 | phase-5 | phase-6 | phase-7 |
|---|---------|---------|---------|---------|---------|---------|---------|---------|
| ROUT | D | A | B0 | B1 | | | | |
| Ain | 16D+R | 8A | 4B0 | 4B1 | | | | |
| Bin | 16D+R | 16A+R | Sum | Sum | | | | |
| Cin | 0 | 1 | 0 | 0 | | | | |
| Dec | Sum/32 | | | Sum/32 | | | | |

LUMA DATA :

DecOut = 1/8B0 + 3/4A + 1/8B1

CHROMA DATA

DecOut = D

FIG. 5D

FIG. 6D $$Y_n = \frac{Y_{n-1} + Y_{n+1}}{2} \quad n = 1, 3, 5, \ldots$$

$\boxed{Y_7}$ = interpolated value $$Cb_n = \frac{Cb_{n-2} + Cb_{n+2}}{2} \quad n = 2, 6, 10, \ldots$$

| Alias Address | | | Physical Address | | |
|---|---|---|---|---|---|
| Decimal | Word | Byte | Decimal | Word | Byte |
| 992, 993 | 3e0, 3e1 | f80, f84 | 960, 961 | 3c0, 3c1 | f00, f04 |
| 994, 995 | 3e2, 3e3 | f88, f8c | 968, 969 | 3c8, 3c9 | f20, f24 |
| 996, 997 | 3e4, 3e5 | f90, f94 | 976, 977 | 3d0, 3d1 | f40, f44 |
| 998, 999 | 3e6, 3e7 | f98, f9c | 984, 985 | 3d8, 3d9 | f60, f64 |
| 1000, 1001 | 3e8, 3e9 | fa0, fa4 | 962, 963 | 3c2, 3c3 | f08, f0c |
| 1002, 1003 | 3ea, 3eb | fa8, fac | 970, 971 | 3ca, 3cb | f28, f2c |
| 1004, 1005 | 3ec, 3ed | fb0, fb4 | 978, 979 | 3d2, 3d3 | f48, f4c |
| 1006, 1007 | 3ee, 3ef | fb8, fbc | 986, 987 | 3da, 3db | f68, f6c |
| 1008, 1009 | 3f0, 3f1 | fc0, fc4 | 964, 965 | 3c4, 3c5 | f10, f14 |
| 1010, 1011 | 3f2, 3f3 | fc8, fcc | 972, 973 | 3cc, 3cd | f30, f34 |
| 1012, 1013 | 3f4, 3f5 | fd0, fd4 | 980, 981 | 3d4, 3d5 | f50, f54 |
| 1014, 1015 | 3f6, 3f7 | fd8, fdc | 988, 989 | 3dc, 3dd | f70, f74 |
| 1016, 1017 | 3f8, 3f9 | fe0, fe4 | 966, 967 | 3c6, 3c7 | f18, f1c |
| 1018, 1019 | 3fa, 3fb | fe8, fec | 974, 975 | 3ce, 3cf | f38, f3c |
| 1020, 1021 | 3fc, 3fd | ff0, ff4 | 982, 983 | 3d6, 3d7 | f58, f5c |
| 1022, 1023 | 3fe, 3ff | ff8, ffc | 990, 991 | 3de, 3df | f78, f7c |

FIG. 7D

| P00 | P01 | P01 | P03 | P04 | P05 |
|---|---|---|---|---|---|
| 0 | 1 E | 4 | 5 O | 40 | 41 E |
| P10 | P11 | P12 | P13 | P14 | P15 |
| 2 | 3 | 6 | 7 | 42 | 43 |
| P20 | P21 | P22 | P23 | P24 | P25 |
| A | B E | E | F O | 4A | 4B E |
| P30 | P31 | P32 | P33 | P34 | P35 |
| 8 | 9 | C | D | 48 | 49 |
| P40 | P41 | P42 | P43 | P44 | P45 |
| 10 | 11 E | 14 | 15 O | 50 | 51 E |

↕ one macro-block

1000a

| PE0 | PE1 | PE2 | PE3 | PE4 | PE5 |
|---|---|---|---|---|---|
| 3A | 3B E | 3E | 3F O | 7A | 7B E |
| PF0 | PF1 | PF2 | PF3 | PF4 | PF5 |
| 38 | 39 | 3C | 3D | 78 | 79 |

FIG. 10B

| P00 | P01 | P02 | P03 | P04 | P05 |
|---|---|---|---|---|---|
| 0 | 1 E | 2 | 3 E | 40 | 41 E |
| P10 | P11 | P12 | P13 | P14 | P15 |
| 4 | 5 | 6 | 7 | 44 | 45 |
| P20 | P21 | P22 | P23 | P24 | P25 |
| 8 | 9 O | A | B O | 48 | 49 O |
| P30 | P31 | P32 | P33 | P34 | P35 |
| C | D | E | F | 4C | 4D |
| P40 | P41 | P42 | P43 | P44 | P45 |
| 10 | 11 E | 12 | 13 E | 50 | 51 E |

...

| PE0 | PE1 | PE2 | PE3 | PE4 | PE5 |
|---|---|---|---|---|---|
| 34 | 35 O | 36 | 37 O | 74 | 75 O |
| PF0 | PF1 | PF2 | PF3 | PF4 | PF5 |
| 38 | 39 | 3A | 3B | 78 | 79 | one macro-block

FIG. 10C

| | | | | |
|---|---|---|---|---|
| 1050a ⟶ | 2A 2B<br>0<br>28 29 | 2E 2F<br>1<br>2C 2D | 6A 6B<br>0<br>68 69 | 6E 6F<br>1<br>6C 6D | ⟵ 1050b |
| | 30 31<br>2<br>32 33 | 34 35<br>3<br>36 37 | 70 71<br>2<br>72 73 | 74 75<br>3<br>76 77 | |
| 1050c ⟶ | 3A 3B<br>0<br>38 39 | 3E 3F<br>1<br>3C 3D | 7A 7B<br>0<br>78 79 | 7E 7F<br>1<br>7C 7D | ⟵ 1050d |
| | x0 x1<br>2<br>x2 x3 | x4 x6<br>3<br>x5 x7 | y0 y1<br>2<br>y2 y3 | y4 y5<br>3<br>y6 y7 | Page<br>Boundry |

FIG. 10E

HOFF

VOFF

HSHRINK

VSHRINK

KEY TO FIG. 16A

| CASE | SUBY | | SUBX | | CUR | | PATCHY | | | PATCHX | | | SLICE | PEL |
|---|---|---|---|---|---|---|---|---|---|---|---|---|---|---|
| | INIT | WRAP | INIT | WRAP | MIN | MAX | INIT | TOP WRAP | BOT | INIT | LEFT WRAP | RIGHT | | |
| 1 | 0 | 0 | 0 | 0 | 1 | 3 | 2 | 0 | 3 | 0 | 0 | 3 | 0 | 3 | 7 |
| 2 | 0 | 0 | 0 | 0 | 0 | 3 | 2 | 0 | 3 | 0 | 0 | 0 | 3 | 0 | 3 | 7 |
| 3 | 0 | 0 | 0 | 0 | 0 | 2 | 2 | 0 | 3 | 0 | 0 | 0 | 3 | 0 | 3 | 7 |
| 4 | 0 | 0 | 0 | 0 | 0 | 1 | 2 | 0 | 3 | 0 | 0 | 0 | 0 | 1 | 3 | 7 |
| 5 | 0 | 0 | 0 | 0 | 1 | 3 | 0 | 0 | 3 | 0 | 0 | 0 | 3 | 0 | 3 | 7 |
| 6 | 0 | 0 | 0 | 0 | 0 | 3 | 0 | 0 | 3 | 0 | 0 | 0 | 3 | 0 | 3 | 7 |
| 7 | 0 | 0 | 0 | 0 | 0 | 2 | 0 | 0 | 3 | 0 | 0 | 0 | 3 | 0 | 3 | 7 |
| 8 | 0 | 0 | 0 | 0 | 1 | 1 | 0 | 0 | 3 | 0 | 0 | 0 | 0 | 1 | 3 | 7 |
| 9 | 0 | 0 | 0 | 0 | 0 | 3 | 0 | 0 | 2 | 1 | 0 | 0 | 3 | 0 | 3 | 7 |
| 10 | 0 | 0 | 0 | 0 | 0 | 3 | 0 | 0 | 2 | 1 | 0 | 0 | 3 | 0 | 3 | 7 |
| 11 | 0 | 0 | 0 | 0 | 0 | 2 | 0 | 0 | 2 | 1 | 0 | 0 | 3 | 0 | 3 | 7 |
| 12 | 0 | 0 | 0 | 0 | 0 | 1 | 0 | 0 | 2 | 1 | 0 | 0 | 0 | 1 | 3 | 7 |

FIG. 18J

| CASE | SUBY | | SUBX | | CUR | | PATCHY | | | | PATCHX | | | | SLICE | PEL |
|---|---|---|---|---|---|---|---|---|---|---|---|---|---|---|---|---|
| | INIT | WRAP | INIT | WRAP | INIT | WRAP | INIT | TOP | WRAP | BOT | INIT | LEFT | WRAP | RIGHT | | |
| 1 | 0 | 0 | 0 | 0 | 2 | 5 | 3 | 0 | 5 | 0 | 0 | 0 | 3 | 0 | 3 | 7 |
| 2 | 0 | 0 | 0 | 0 | 0 | 5 | 3 | 0 | 5 | 0 | 0 | 0 | 3 | 0 | 3 | 7 |
| 3 | 0 | 0 | 0 | 0 | 0 | 3 | 3 | 0 | 5 | 0 | 0 | 0 | 3 | 0 | 3 | 7 |
| 4 | 0 | 0 | 0 | 0 | 0 | 2 | 3 | 0 | 5 | 0 | 0 | 0 | 0 | 1 | 3 | 7 |
| 5 | 0 | 0 | 0 | 0 | 2 | 5 | 1 | 0 | 5 | 0 | 0 | 0 | 3 | 0 | 3 | 7 |
| 6 | 0 | 0 | 0 | 0 | 0 | 5 | 1 | 0 | 5 | 0 | 0 | 0 | 3 | 0 | 3 | 7 |
| 7 | 0 | 0 | 0 | 0 | 0 | 3 | 1 | 0 | 5 | 0 | 0 | 0 | 3 | 0 | 3 | 7 |
| 8 | 0 | 0 | 0 | 0 | 0 | 2 | 1 | 0 | 5 | 0 | 0 | 0 | 0 | 1 | 3 | 7 |
| 9 | 0 | 0 | 0 | 0 | 2 | 5 | 0 | 0 | 5 | 0 | 0 | 0 | 3 | 0 | 3 | 7 |
| 10 | 0 | 0 | 0 | 0 | 0 | 5 | 0 | 0 | 5 | 0 | 0 | 0 | 3 | 0 | 3 | 7 |
| 11 | 0 | 0 | 0 | 0 | 0 | 3 | 0 | 0 | 5 | 0 | 0 | 0 | 3 | 0 | 3 | 7 |
| 12 | 0 | 0 | 0 | 0 | 0 | 2 | 0 | 0 | 5 | 0 | 0 | 0 | 0 | 1 | 3 | 7 |
| 13 | 0 | 0 | 0 | 0 | 2 | 5 | 0 | 0 | 4 | 1 | 0 | 0 | 3 | 0 | 3 | 7 |
| 14 | 0 | 0 | 0 | 0 | 0 | 5 | 0 | 0 | 4 | 1 | 0 | 0 | 3 | 0 | 3 | 7 |
| 15 | 0 | 0 | 0 | 0 | 0 | 3 | 0 | 0 | 4 | 1 | 0 | 0 | 3 | 0 | 3 | 7 |
| 16 | 0 | 0 | 0 | 0 | 0 | 2 | 0 | 0 | 4 | 1 | 0 | 0 | 0 | 1 | 3 | 7 |
| 17 | 0 | 0 | 0 | 0 | 2 | 5 | 0 | 0 | 2 | 1 | 0 | 0 | 3 | 0 | 3 | 7 |
| 18 | 0 | 0 | 0 | 0 | 0 | 5 | 0 | 0 | 2 | 1 | 0 | 0 | 3 | 0 | 3 | 7 |
| 19 | 0 | 0 | 0 | 0 | 0 | 3 | 0 | 0 | 2 | 1 | 0 | 0 | 3 | 0 | 3 | 7 |
| 20 | 0 | 0 | 0 | 0 | 0 | 2 | 0 | 0 | 2 | 1 | 0 | 0 | 0 | 1 | 3 | 7 |

FIG. 18L

Positions of reference macroblock region with respect to corners of the frame reference macroblock region of 5X5 tiles

| CASE | SUBY | | SUBX | | CUR | | PATCHY | | | PATCHX | | | SLICE | PEL |
|---|---|---|---|---|---|---|---|---|---|---|---|---|---|---|
| | INIT | WRAP | INIT | WRAP | INIT | WRAP | INIT | TOP WRAP | BOT | INIT | LEFT WRAP | RIGHT | | |
| 1 | 0 | 1 | 0 | 1 | 0 | 3 | 0 | 2 | 0 | 1 | 1 | 0 | 15 | 7 |
| 2 | 0 | 1 | 0 | 1 | 0 | 3 | 0 | 2 | 0 | 0 | 0 | 1 | 15 | 7 |
| 3 | 0 | 1 | 0 | 1 | 0 | 3 | 0 | 0 | 2 | 1 | 1 | 0 | 15 | 7 |
| 4 | 0 | 1 | 0 | 1 | 0 | 3 | 0 | 0 | 2 | 0 | 0 | 1 | 15 | 7 |
| 5 | 0 | 1 | 0 | 1 | 0 | 3 | 0 | 2 | 0 | 1 | 1 | 0 | 15 | 7 |
| 6 | 0 | 1 | 0 | 1 | 0 | 3 | 0 | 0 | 0 | 0 | 0 | 1 | 15 | 7 |
| 7 | 0 | 1 | 0 | 1 | 0 | 3 | 0 | 0 | 2 | 0 | 1 | 0 | 15 | 7 |
| 8 | 0 | 1 | 0 | 1 | 0 | 3 | 0 | 0 | 0 | 0 | 0 | 1 | 15 | 7 |
| inside | 0 | 1 | 0 | 1 | 0 | 3 | 0 | 0 | 0 | 0 | 0 | 0 | 15 | 7 |

FIG. 18N

STRUCTURE AND METHOD FOR MOTION ESTIMATION OF A DIGITAL IMAGE BY MATCHING DERIVED SCORES

This application is a division of application Ser. No. 08/105,253, filed Aug. 9, 1993 pending.

BACKGROUND OF THE INVENTION

1. Field of the Invention

The present invention relates to integrated circuit designs; and, in particular, the present invention relates to integrated circuit designs for image processing.

2. Discussion of the Related Art

The Motion Picture Experts Group (MPEG) is an international committee charged with providing a standard (hereinbelow "MPEG standard") for achieving compatibility between image compression and decompression equipment. This standard specifies both the coded digital representation of video signal for the storage media, and the method for decoding. The representation supports normal speed playback, as well as other playback modes of color motion pictures, and reproduction of still pictures. The MPEG standard covers the common 525- and 625-line television, personal computer and workstation display formats. The MPEG standard is intended for equipment supporting continuous transfer rate of up to 1.5 Mbits per second, such as compact disks, digital audio tapes, or magnetic hard disks. The MPEG standard is intended to support picture frames of approximately 288×352 pixels each at a rate between 24 Hz and 30 Hz. A publication by MPEG entitled "Coding for Moving Pictures and Associated Audio for digital storage medium at 1.5 Mbit/s," included herein as Appendix A, provides in draft form the proposed MPEG standard, which is hereby incorporated by reference in its entirety to provide detailed information about the MPEG standard.

Under the MPEG standard, the picture is divided into a matrix of "Macroblock slices" (MBS), each MBS containing a number of picture areas (called "macroblocks") each covering an area of 16×16 pixels. Each of these picture areas is further represented by one or more 8×8 matrices which elements are the spatial luminance and chrominance values. In one representation (4:2:2) of the macroblock, a luminance value (Y type) is provided for every pixel in the 16×16-pixel picture area (i.e. in four 8×8 "Y" matrices), and chrominance values of the U and V (i.e., blue and red chrominance) types, each covering the same 16×16 picture area, are respectively provided in two 8×8 "U" and two 8×8 "V" matrices. That is, each 8×8 U or V matrix has a lower resolution than its luminance counterpart and covers an area of 8×16 pixels. In another representation (4:2:0), a luminance value is provided for every pixel in the 16×16 pixels picture area, and one 8×8 matrix for each of the U and V types is provided to represent the chrominance values of the 16×16-pixel picture area. A group of four contiguous pixels in a 2×2 configuration is called a "quad pixel"; hence, the macroblock can also be thought of as comprising 64 quad pixels in an 8×8 configuration.

The MPEG standard adopts a model of compression and decompression based on lossy compression of both interframe and intraframe information. To compress interframe information, each frame is encoded in one of the following formats: "intra", "predicted", or "interpolated". Intra encoded frames are least frequently provided, the predicted frames are provided more frequently than the intra frames, and all the remaining frames are interpolated frames. In a prediction frame ("P-picture"), only the incremental changes in pixel values from the last I-picture or P-picture are coded. In an interpolation frame ("B-picture"), the pixel values are encoded with respect to both an earlier frame and a later frame. By encoding frames incrementally, using predicted and interpolated frames, the redundancy between frames can be eliminated, resulting in a high efficiency in data storage. Under the MPEG, the motion of an object moving from one screen position to another screen position can be represented by motion vectors. A motion vector provides a shorthand for encoding a spatial translation of a group of pixels, typically a macroblock.

The next steps in compression under the MPEG standard provide lossy compression of intraframe information. In the first step, a 2-dimensional discrete cosine transform (DCT) is performed on each of the 8×8 pixel matrices to map the spatial luminance or chrominance values into the frequency domain.

Next, a process called "quantization" weights each element of the 8×8 transformed matrix, consisting of 1 "DC" value and sixty-three "AC" values, according to whether the pixel matrix is of the chrominance or the luminance type, and the frequency represented by each element of the transformed matrix. In an I-picture, the quantization weights are intended to reduce to zero many high frequency components to which the human eye is not sensitive. In P- and B-pictures, which contain mostly higher frequency components, the weights are not related to visual perception. Having created many zero elements in the 8×8 transformed matrix, each matrix can be represented without further information loss as an ordered list consisting of the "DC" value, and alternating pairs of a non-zero "AC" value and a length of zero elements following the non-zero value. The values on the list are ordered such that the elements of the matrix are presented as if the matrix is read in a zig_zag manner (i.e., the elements of a matrix A are read in the order A00, A01, A10, A02, A11, A20 etc.). This representation is space efficient because zero elements are not represented individually.

Finally, an entropy encoding scheme is used to further compress, using variable-length codes, the representations of the DC coefficient and the AC value-run length pairs. Under the entropy encoding scheme, the more frequently occurring symbols are represented by shorter codes. Further efficiency in storage is thereby achieved.

The steps involved in compression under the MPEG standard are computationally intensive. For such a compression scheme to be practical and widely accepted, however, a high speed processor at an economical cost is desired. Such processor is preferably provided in an integrated circuit.

Other standards for image processing exist. These standards include JPEG ("Joint Photographic Expert Group") and CCITT H.261 (also known as "P×64"). These standards are available from the respective committees, which are international bodies well-known to those skilled in the art.

SUMMARY OF THE INVENTION

In accordance with the present invention, a structure and a method for encoding digitized video signals are provided. In one embodiment, the video signals are stored in an external memory system, and the present embodiment provides (a) two video ports each configurable to become either an input port or an output port for video signals; (b) a host bus interface circuit for interfacing with an external host computer; (c) a scratch-pad memory for storing a portion of the video image; (d) a processor for arithmetic and logic operations, which computes discrete cosine transforms and quantization on the video signals to obtain coefficients for compression under a lossy compression algorithm; (e) a motion estimation unit for matching objects in motion between frames of images of the video signals, and outputting motion vectors representing the motion of objects between frames; and (f) a variable-length coding unit for applying an entropy coding scheme on the quantized coefficients and motion vectors.

In one embodiment, a global bus is provided to be accessed by video ports, the host bus interface, the scratch-pad memory, the processor, the motion estimation unit, and the variable-length coding unit. The global bus provides data transfer among the functional units. In addition, in that embodiment, a processor bus having a higher bandwidth than the global bus is provided to allow higher band-width data transfer among the processor, the scratch-pad memory, and the variable-length coding units. A memory controller controls data transfers to and from the external memory while at the same time provides arbitration the uses of the global bus and the processor bus.

Multiple copies of the structure of the present invention can be provided to form a multiprocessor of video signals. Under such configuration, one of the video ports in each structure would be used to receive the incoming video signal, and the other video port would be used for communication between the structure and one or more of its neighboring structures.

In accordance with another aspect of the present invention, one of the two video port in one embodiment comprises a decimation filter for reducing the resolution of incoming video signals. In one embodiment, one of the video ports include an interpolator for restoring the reduced resolution video into a higher resolution upon video signal output.

In accordance with another aspect of the present invention, a memory with a novel address mechanism is provided to sort video signals arriving at the structure of the present invention in pixel interleaved order into several regions of the memory, such that the data in the several regions of this memory can be read in block interleaved order, which is used in subsequent signal processing steps used under various video processing standards, including MPEG.

In accordance with another aspect of the present invention, a synchronizer circuit synchronizes the system clock of one embodiment with an external video clock to which the incoming video signals are synchronized. The synchronization circuit provides for accurate detection of an edge transition in the external clock within a time period which is comparable with a flip-flop's metastable period, without requiring an extension of the system clock period.

In one embodiment of the present invention, a "corner turn" memory is provided. In this corner-turn memory, a selected region is mapped to two set of addresses. Using an address in the first set of addresses, a row of memory cells are accessed. Using an address in the second set of addresses, a column of memory cells are accessed. The corner-turn memory is particularly useful for DCT and IDCT operations where each macroblock of pixels are accessed in two passes, one pass in column order, and the other pass in row order.

In accordance with another aspect of the present invention, a scratch pad memory having a width four times the data path of the processor is provided. In addition, two set of buffer registers, each set including registers of the width of the data path, are provided as buffers between the processor and the scratch pad memory. The buffer registers operates at the clock rate of the processor, while the scratch pad memory can operate at a lower clock rate. In this manner, the bandwidths of the processor and the scratch pad memory are matched without the use of expensive memory circuitry. Each set of buffer registers are either loaded from, or stored into, the scratch pad as a one register having the width of the scratch pad memory, but accessed by the processor individually as registers having the width of the data path. In one set of the buffer registers, each register is provided with two addresses. Using one address, the four data words (each having the width of the data path) are stored into the register in the order presented. Using the other address, prior to storing into the buffer register, a transpose is performed on the four halfwords of the higher order two data words. A similar transpose is performed on the four halfwords of the lower order two data words. The latter mode, together with the corner turn memory allows pixels of a macroblock to be read from, or stored into, the scratch pad memory either in row order or in column order.

In accordance with another aspect of the present invention, the pixels of a macroblock are stored in one of two arrangements in the external dynamic random access memory. Under one arrangement, called the "scan-line" mode, four horizontally adjacent pixels are accessed at a time. Under the other arrangement, which is suitable for fetching reference pixels in motion estimation, pixels are fetched in tiles (4 by 4 pixels) in column order. A novel address generation scheme is provided to access either the memory for scan-line elements or for quad pels. Since most filtering involves quad pels (2×2 pixels), the quad pel mode arrangement is efficient in access time and storage, and avoids rearrangement and complex address decoding.

In accordance with another aspect of the present invention, the operand input terminals of the arithmetic and logic unit in the process is provided a set of "byte multiplexors" for rearranging the four 9-bit bytes in each operand in any order. Because each 9-bit byte can be used to store the value of a pixel, so that the arithmetic and logic unit can operate on the pixels in a quad pel stored in a 36-bit operand simultaneously, the byte multiplexor allows rearranging the relative positions of the pixels within the 36-bit operands, numerous filtering operations can be achieved by simply setting the correct pixel configuration. In one embodiment, in accordance with the present invention, filters for performing pixel offsets, decimations, in either horizontal or vertical directions, or both are provided using the byte multiplexor. In addition, the present invention provides higher compression ratios, using novel functions for (a) activities analysis, used in applying adaptive control of quantization, and (b) scene analysis, used in reduction of interframe redundancy.

In accordance with another aspect of the present invention, a fast detector of a zero result in an adder is provided. The fast zero detector includes a number of "zero generator" circuits and a number of zero propagator circuits. The fast detector signals the presence of a zero result within, as a function of the length of the adder's operands, logarithm time, rather than linear time.

In accordance with another aspect of the present invention, the present invention provides a structure and a method for a non-linear "alpha" filter. Under this non-linear filter, thresholds $T_1$ and $T_2$ are set by the two parameters m and n. If the absolute difference between the two input values of the non-linear filter are less than $T_1$ or greater than $T_2$, a fixed relative weight are accorded the input values, otherwise a relative weight proportional to the absolute difference is accorded the input values. This non-linear filter finds numerous application in signal processing. In one embodiment, the non-linear filter is used in deinterlacing and temporal noise reduction applications.

In accordance with another aspect of the present invention, a structure for performing motion estimation is provided, including: (a) a memory for storing said macroblocks of a current frame and macroblocks of a reference frame; (b) a filter receiving a first group of pixels from the memory for resampling; and (c) a matcher receiving the resampled first group of pixels and a second group of pixels from a current macroblock, for evaluation of a number of motion vectors. The matcher provides a score representing the difference between the second group of pixels and the first group of pixels for each of the motion vectors evaluated. In this embodiment, the best score over a macroblock is selected as the motion vector for the macroblock. In one embodiment, the matcher evaluates 8 motion vectors at a time using a 2×8 "slice" of current pixels and a 4×12 pixel reference area.

In accordance with another aspect of the present invention, a structure is provided for encoding by motion vectors a current frame of video data, using a reference frame of video data. The structure includes a memory circuit for storing (a) adjacent current macroblocks from a row j of current macroblocks, designated $C_{j,p}$, $C_{j,p+1}$, ..., $C_{j,p+n-1}$ in the order along one direction of the row of macroblocks; and (b) adjacent reference macroblocks from a first column i of reference macroblocks, designated $R_{q,i}$, $R_{q+1,i}$, ..., $R_{q+m-1,i}$ and a second column $C_{j+1,p}$ $C_{p+1,p+1}$, ..., $C_{j+1,p+n+1}$. The adjacent reference macroblocks are reference macroblocks within the range of the motion vectors, with each of said current macroblocks being substantially equidistance from the $R_{q,i}$ and $Rq+_{m-1,i}$ reference macroblocks. The structure of the present invention evaluates each of the adjacent current macroblocks against each of the adjacent reference macroblocks under the motion vectors, so as to select a motion vector representing the best match between each of said current macroblock and a corresponding one of said reference macroblocks. When evaluation of the current macroblock against the set of reference frame macroblock in the memory circuit is completed, the current macroblock $C_{j,p}$ is remove from the memory circuit and replaced by a current macroblock $C_{j,p+n}$, said current macroblock $C_{j,p+n}$ being the current macroblock adjacent said macroblock $C_{j,p+n-1}$. At the same time, the column of adjacent reference macroblocks $R_{q,i}$, $R_{q+1,i}$, ..., $R_{q+m-1,i}$ are removed from the memory circuit and replaced by the next column of adjacent reference macroblocks $R_{q,i+1}$, $R_{q+1,i+1}$, ..., $R_{q+m-1,i}$. In this manner, each current macroblock, while in memory, is evaluated against the largest number of reference macroblocks which can be held in the memory circuit, thereby minimizing the number of time current and reference macroblocks have to be loaded into memory. Of course, for purely convenience reasons, the terms "rows" and "columns" are used to describe the relationship between current and reference macroblocks. It is understood that a column of current macroblocks can be evaluated against a row of reference macroblock, within the scope of the present invention.

In accordance with the present invention, the control structure for controlling evaluation of motion vectors is provided by a counter which includes first and second fields representing respectively the current macroblock and the reference macroblock being evaluated. Under the controlling scheme of one embodiment, each of the first and second fields are individually counted, such that when the first field reaches a maximum, a carry is generated to increment the count in the second field. The number of counts in the first and second fields are respectively, the number of current and reference macroblocks. In this manner, each current macroblock is evaluated completely with the reference macroblocks in the memory circuit.

In accordance with another aspect of the present invention, an adaptive thresholding circuit is provided in the zero-packing circuit prior to entropy encoding of the DCT coefficients into variable length code. In this adaptive threshold circuit, a current DCT coefficient is set to zero, if the immediately preceding and the immediately following DCT coefficients are both zero, and the current DCT coefficient is less than a programmable threshold. This thresholding circuit allows even higher compression ratio by extending a zero runlength.

The present invention is better understood upon consideration of the detailed description below and the accompanying drawings.

BRIEF DESCRIPTION OF THE DRAWINGS

FIG. 1a is a block diagram of an embodiment of the present invention provided in an MPEG encoder chip 100.

FIG. 5c is a tables showing, at each phase of the CIF decimation, the data output $R_{out}$ of register 201, the operand inputs $A_{in}$ and $B_{in}$ of 14-bit adder 504, the carry-in input $C_{in}$, and the data output Dec of decimator 204.

FIG. 5d is a tables showing, at each phase of the CCR 601 decimation, the data output $R_{out}$ of register 201, the operand inputs $A_{in}$ and $B_{in}$ of 14-bit adder 504, the carry-in input $C_{in}$, and the data output Dec of decimator 204.

FIG. 6d illustrates the sequence in which stored and interpolated luminance and chrominance pixels are output under interpolation mode.

FIG. 7d shows the mappings between direct and alias addresses of the higher 64 36-bit locations in SMEM 159.

FIGS. 10a and 10b shows pixel arrangements 1000a and 1000b, which are respectively provided to support scan-line mode operation and reference frame fetching during motion estimation.

FIG. 10c shows the logical addresses for scan-line mode access.

FIG. 10e shows a reference frame fetch in which the reference frame crosses a memory page boundary.

FIG. 15c-2 is a block diagram of a circuit 1550 for computing the value of alpha.

FIG. 15c-3, 15c-4, 15c-5, and 15c-6 show the values of alpha obtainable from the various values of parameters m and n.

FIGS. 15d-1–15d-4 illustrate instructions using the byte multiplexors of arithmetic unit 750, using one mode selected from each of the HOFF, VOFF, HSHRINK and VSHRINK instructions, respectively.

FIG. 18j shows, for each of the 12 cases shown in FIG. 18h, the INIT and WRAP values for each of the fields in state counter 1890.

FIG. 18l shows, for each of the twenty cases shown in FIG. 18k, the corresponding INIT and WRAP values for each of the fields of state counter 1890.

FIGS. 18m-1 and 18m-3 show the clipping of motion estimation with respect to the reference frame boundary for either the second stage of a 2-stage motion estimation, or the third stage of a 3-stage motion estimation.

FIG. 18m-2 shows . . . .

FIG. 18n provides the INIT and WRAP values for state counter 1890 corresponding to the reference frame boundary clipping shown in FIGS. 18m-1 and 18m-2.

DETAILED DESCRIPTION OF THE PREFERRED EMBODIMENTS

1. Overview

Figure 1B:
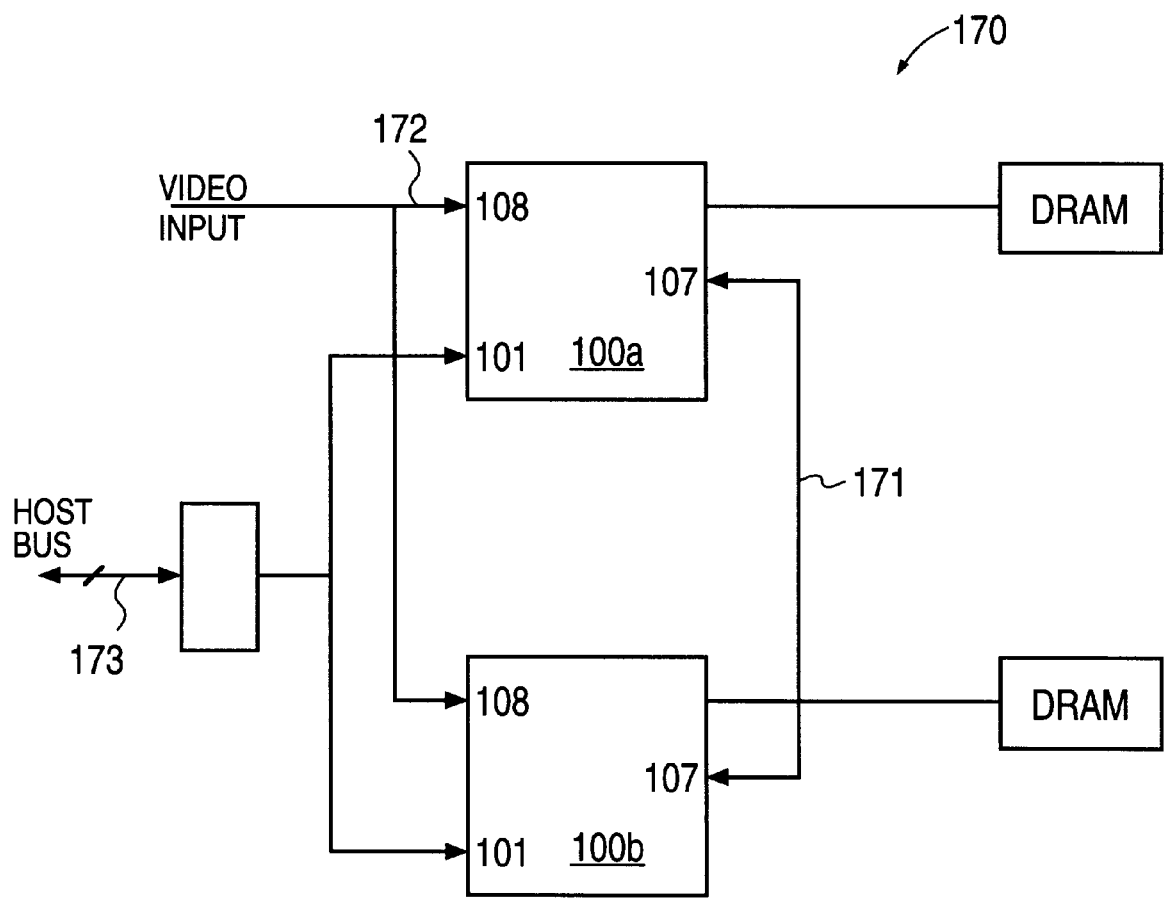
FIG. 1b shows a multi-chip configuration in which two copies of chip 100, chips 100a and 100b, are used.

FIG. 1a is a block diagram of an embodiment of the present invention provided in an encoder/decoder integrated circuit 100 ("chip 100"). In this embodiment, chip 100 encodes or decodes bit stream compatible with MPEG, JPEG and CCITT H.64. As shown in FIG. 1a, chip 100 communicates through host bus interface 102 with a host computer (not shown) over 32-bit host bus 101. Host bus interface 102 implements the IEEE 1196 NuBus standard. In addition, chip 100 communicates with an external memory 103 (not shown) over 32-bit memory bus 105. Chip 100's access to external memory 103 is controlled by a memory controller 104, which includes dynamic random access memory (DRAM) controller 104a and direct memory access (DMA) controller 106. Chip 100 has two independent 16-bit bidirectional video ports 107 and 108 receiving and sending data on video busses 190a and 190b respectively. Video ports 107 and 108 are substantially identical, except that port 107 is provided with a decimation filter, and port 108 is provided with an interpolator. Both the decimator and the interpolator circuits of ports 107 and 108 are described in further detail below.

The functional units of chip 100 communicate over an internal global bus 120, these units include the central processing unit (CPU) 150, the variable-length code coder (VLC) 109, variable-length code decoder (VLD) 110, and motion estimator 111. Central processing unit 150 includes the processor status word register 151, which stores the state of CPU 150, instruction memory ("I mem") 152, instruction register 153, register file ("RMEM") 154, which includes 31 general purpose registers R1–R31, byte multiplexor 155, arithmetic logic unit ("ALU") 156, memory controller 104, multiplier-accumulator (MAC) 158, and scratch memory ("SMEM") 159, which includes address generation unit 160. Memory controller 104 provides access to external memory 103, including direct memory access (DMA) modes.

Global bus 120 is accessed by SMEM 159, motion estimator 111, VLC 109 and VLD 110, memory controller 104, instruction memory 152, host interface 102 and bidirectional video ports 107 and 108. A processor bus 180 is used for data transfer between SMEM 159, VLC 109 and VLD 110, and CPU 150.

During video operations, the host computer initializes chip 100 by loading the configuration registers in the functional units of chip 100, and maintains the bit streams sending to or receiving from video ports 107 and 108.

Figure 1C:
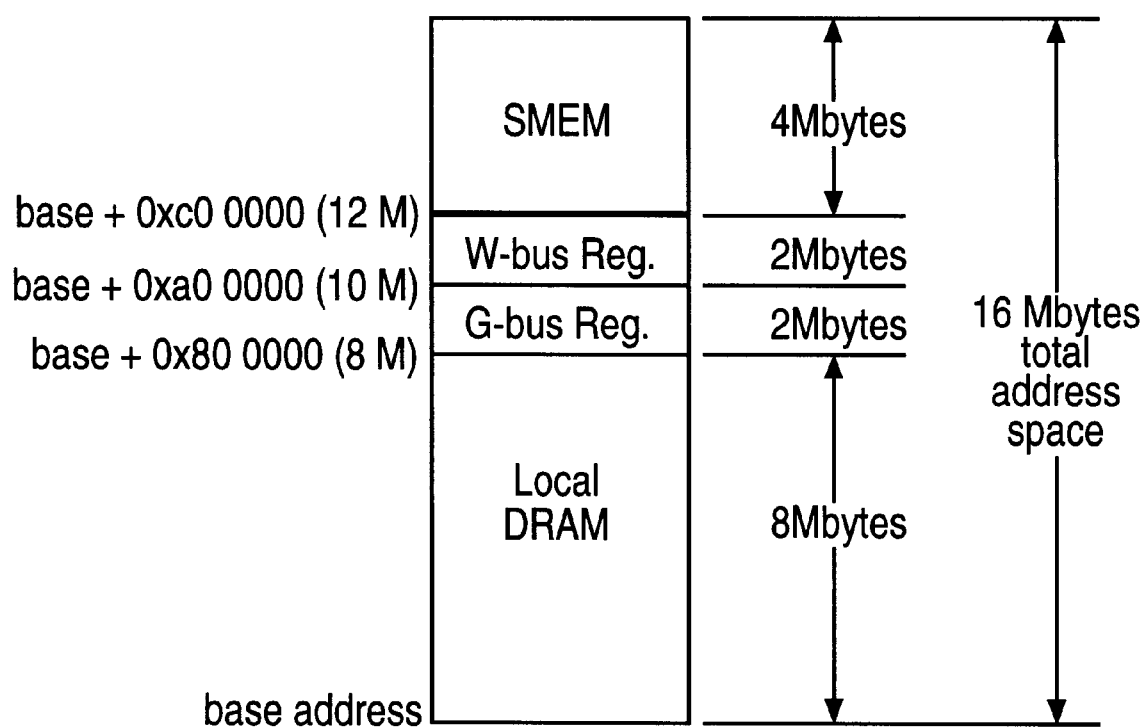
FIG. 1c is a map of chip 100's address space.

Chip 100 has an memory address space of 16 megabytes. A map of chip 100's address space is provided in FIG. 1c. As shown in FIG. 1c, chip 100 is assigned a base address. The memory space between the base address and the location (base address+7FFFFF[1]) is reserved for an external dynamic random access memory (DRAM). The memory space between location (base address+800000) to location (base address+9FFFFF) is reserved for registers addressable over global bus 120. The memory space between location (base address+A00000) and location (base address+9FFFFF) is reserved for registers addressable over a processor bus or write-back bus ("W bus") 180a. A scratch or cache memory, i.e. memory 159, is allocated the memory space between location (base address+C00000) and location (base address+FFFFFF).

[1] Addresses in this descriptions are provided in hexadecimal, unless otherwise stated.

A multi-chip system can be built using multiple copies of chip 100. FIG. 1b shows a two-chip configuration 170, in which two copies of chip 100, chips 100a and 100b are provided. Up to 16 copies of chip 100 can be provided in a multi-chip system. In such a system, video port 108 of each chip is connected to a reference video bus, such as bus 171, which is provided for passing both video data and non-video data between chips. Each chip receives video input at port 107. In FIG. 1b, the video input port 107 of each chip receives input data from external video bus 172. Each chip is provided a separate 16-megabyte address space which is not overlapping with other chips in the multi-chip configuration.

2. Video Ports 107 and 108

Figure 2:
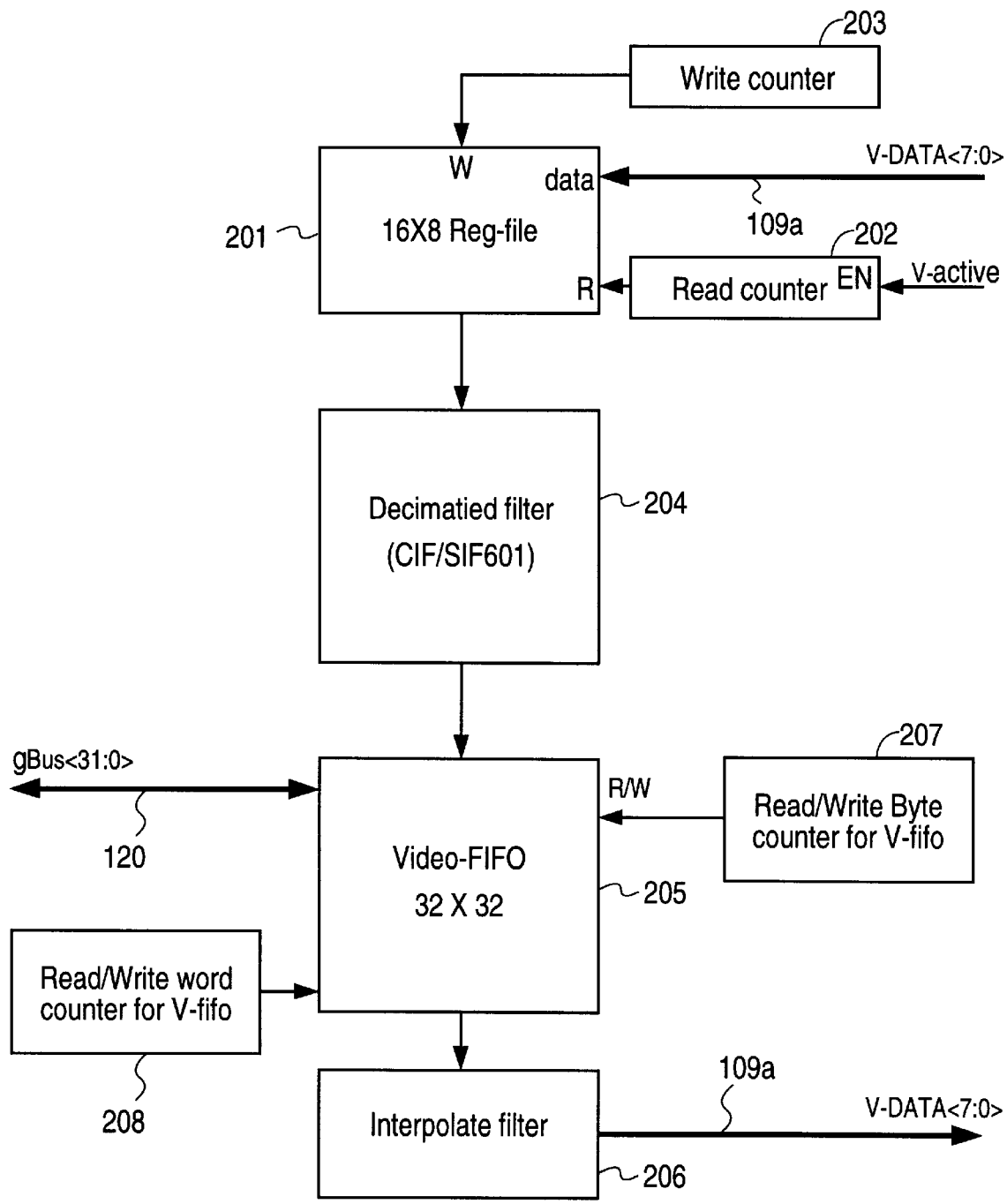
FIG. 2 is a block diagram of video port 107 of chip 100 shown in FIG. 1.

Video ports 107 and 108 can each be configured for input or output functions. When configured as an input port, video port 107 has a decimator for reducing the resolution of incoming video data. When configured as an output port, video port 108 has an interpolator to output data at a higher resolution than chip 100's internal representation. FIG. 2 is a block diagram of video port 107. Video port 107 can operate in either a 16-bit mode or an 8-bit mode. When the video port is configured as an input port, video data is read from video bus 109a into 16×8 register file 201, which is used as a first-in-first-out (FIFO) memory under the control of read counter 202 and write counter 203. Under 8-bit input mode, read counter 202 receives an external signal V_active, which indicates the arrival of video data. Decimation filter or decimator 204, which receives video data from register file 201, can be programmed to allow the data received to pass through without modification, to perform CCR 601 filtering, or CIF decimation. In video port 108, where decimator 204 is absent, only $YC_bC_r$ separation is performed.

The results from decimator 204 are provided to a 32×4-byte video FIFO (VFIFO) 205. The contents of video FIFO 205 are transferred by DMA, under the control of memory controller 104, to external memory 103. Because various downstream processing functions, e.g. DCT, IDCT operations or motion estimation, operate on chrominance and luminance data separately, chrominance and luminance data are separately stored in external memory 103 and moved into and out of video FIFO 205 blocks of the same chrominance or luminance type. Typically, the blocks of chrominance and luminance data covering the same screen area are retrieved from external memory 103 in an interleaved manner ("block interleaved" order). By contrast, input and output of video data on video busses 109a and 109b are provided sample by sample, interleaving chrominance and luminance types ("pixel interleaved" order). To facilitate the sorting of data from pixel interleaved order to block interleaved order ("YUV separation"), during data input, and in the other direction during data output, a special address generation mechanism is provided. This address generation mechanism, which is discussed in further detail below, stores the pixel interleaved data arriving at video port 107 or 108 into video FIFO 205 in block interleaved order. During output, the address generation mechanism reads block interleaved order data from video FIFO 205 in pixel interleaved order for output.

Address counters 207 and 208 are provided to generate the addresses necessary for reading and writing data streaming into or out of video FIFO 205. Address counter 207 is a 9-bit byte counter, and address counter 208 is a 7-bit word counter. In this embodiment, two extra bits are provided in each of counters 207 and 208, to allow video FIFO 205 to overflow without losing synchronization with the external video data stream, in the event that a DMA transfer to and from external memory 103 cannot take place in time.

When the video port is configured for video output, video data is retrieved from external memory 103 and provided to interpolator 206, which can be programmed to allow the data to pass through without modification or to provide a (1,1) interpolation. The output data of interpolator 206 is provided as output of chip 100 on video bus 109a.

a. The Synchronizer

Figure 3A:
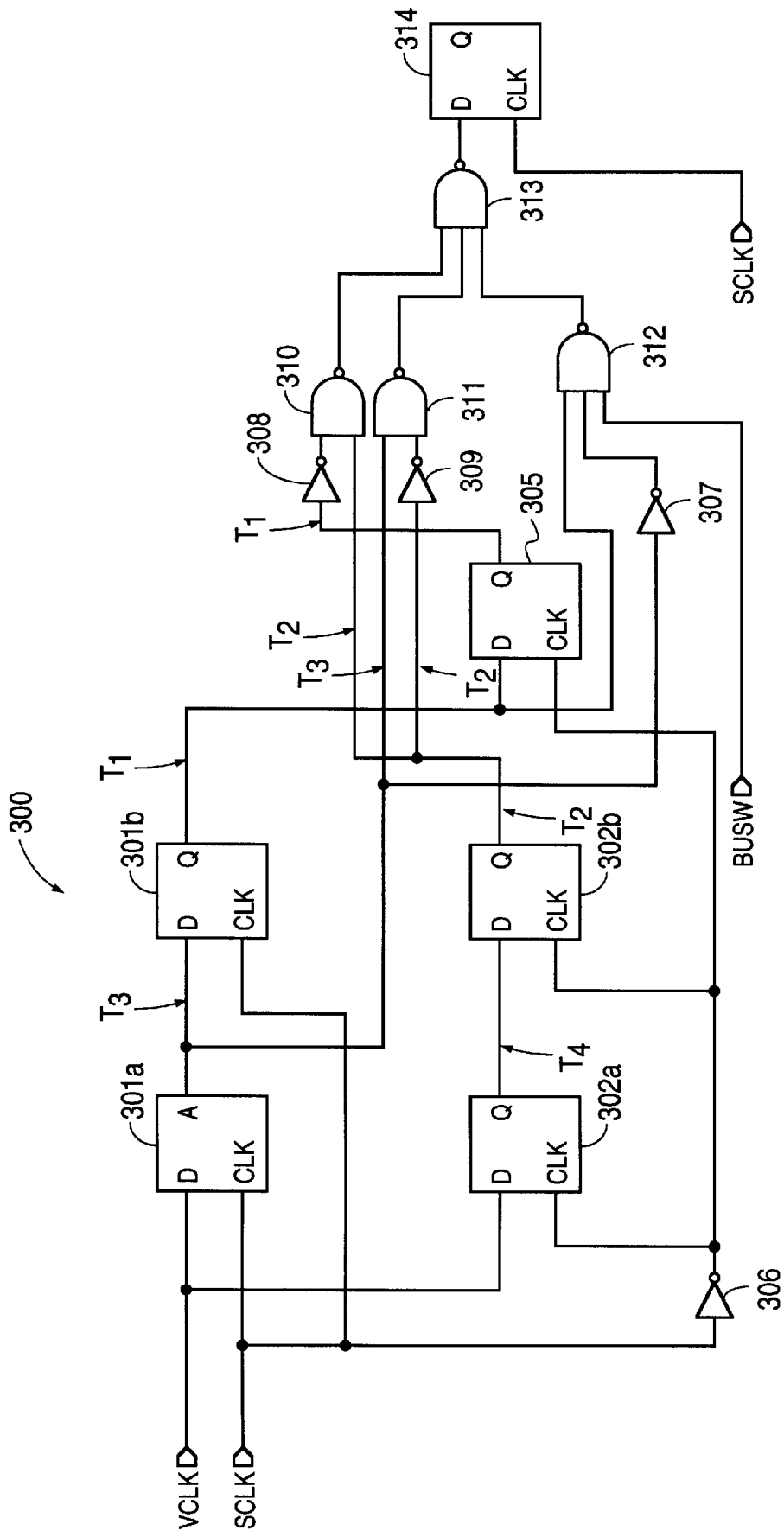
FIG. 3a shows a synchronization circuit 300 for synchronizing video data arrival at port 107 with an external video source, which provides video at 13.5 Mhz under 16-bit mode, and 27 Mhz under 8-bit mode.

Chip 100 operates under an internal clock ("system clock") of chip 100 at a rate of 60 Mhz. However, incoming video data are synchronized with an external clock ("video clock"). Under 8-bit mode, video data arrive at video port 107 at 27 Mhz. Under 16-bit mode, video data arrive at video port 107 at 13.5 Mhz. The system and video clocks are asynchronous with respect to each other. Consequently, for the video data to be properly received, a synchronization circuit 300, which is shown in FIG. 3a, is provided to synchronize the video data arriving at video port 107.

Figure 4A:
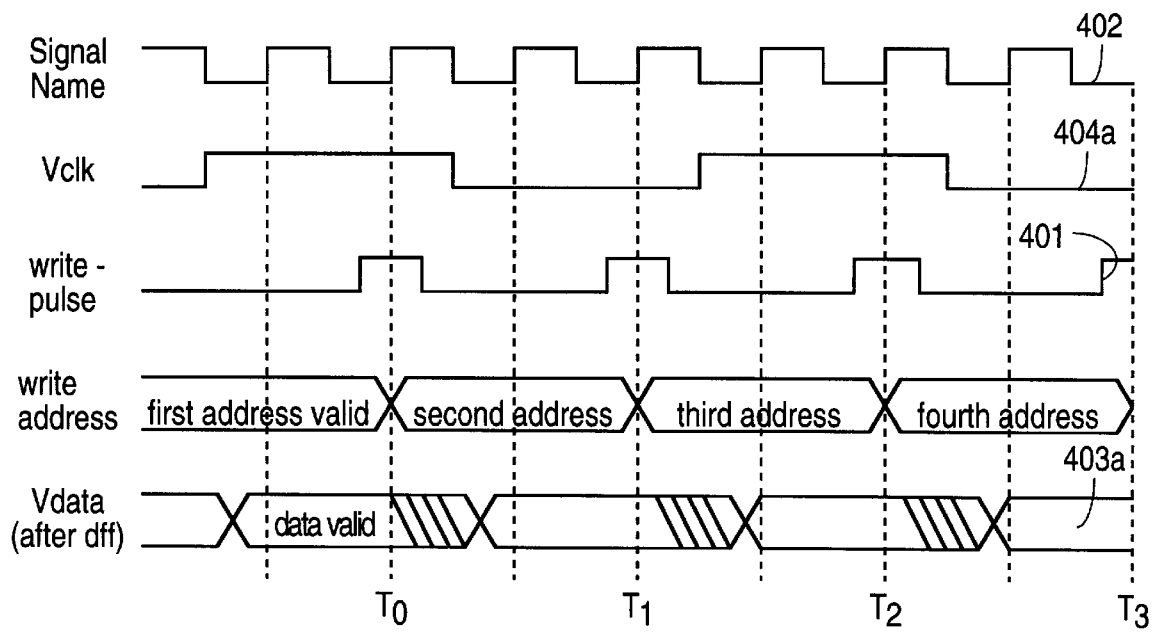
FIG. 4a is a timing diagram of video port 107 for latching video data provided at 13.5 Mhz on video bus 190a under 16-bit mode.

FIG. 4a shows a timing diagram of video port 107 under 16-bit input mode. As shown in FIG. 4a, 16-bit video data arrives at port 107 synchronous with an external video clock signal Vclk 404a, i.e. the video clock, at 13.5 Mhz. Internally, the synchronization circuit generates a write signal 401, which is derived from detecting the transitions of video clock 404a, to latch the 16-bit video data into register file 201 as two 8-bit data. FIG. 4a shows the data stream 403a representing the 8-bit data stream. In FIG. 4a, 16-bit video data are ready at video port 107 at times $t_0$ and $t_2$, and 8-bit video data are latched at times $t_0$, $t_1$, $t_2$, and $t_3$.

Figure 4B:
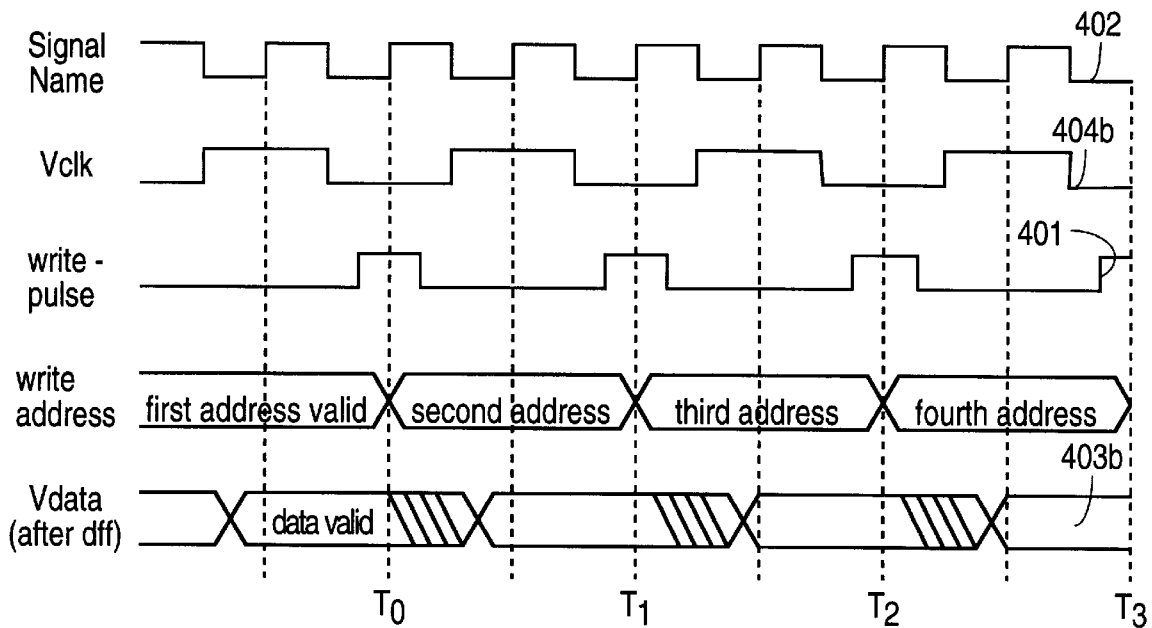
FIG. 4b is a timing diagram of video port 107 for latching video data provided at 27 Mhz on video bus 190a under 8-bit mode.

FIG. 4b shows a timing diagram of video port 107 operating under 8-bit input mode. Under the 8-bit input mode, the write signal 401, which is derived from detecting the transitions of video clock 404b, latches at into register file 201 each 8-bit data word of video data stream 403a at times $t_0$, $t_1$, $t_2$, and $t_3$.

Since the external video clock is asynchronous to the internal system clock, valid data can be latched only within a window of time after a rising edge of the video clock. Thus, valid data are latched only when the rising edges of the video clock are properly detected. In the prior art, such rising edges are detected by sampling the video clock using a flip-flop. However, if the rising edge of the video clock occurs at a time so close to the sampling point that it violates the set-up or the hold time of the flip-flop, the flip-flop can enter a metastable state for an indefinite period of time. During this period of metastability, another sampling by the flip-flop on the input video clock signal cannot take place without risking the loss of data. In chip 100, where the usual time for the output data of a flip-flop to settle is approximately 3 nanoseconds, this metastable period can exceed 12 nanoseconds.

Under the 8-bit input mode, a rising edge in the external video clock occurs every 37 nanoseconds. To detect this rising edge, the sampling frequency is required to be at least twice the frequency of the video clock Vclk, which translates to a period of no more than 18.4 nanoseconds. As mentioned above, if a rising edge occurs too closely in time to a sampling point, the sampling flip-flop enters into a metastable state. Because a metastable flip-flop may require in excess of 12 nanoseconds to resolve, i.e. more than half of the available time between arrivals of the clock edges of the video clock, the detections of rising edges in the video clock signal occur in an unpredictable manner. In certain circumstances, some rising edges would be missed. (In the 16-bit mode, however, because the input data arrives approximately every 74 nanoseconds, there is ample time for the metastable flip-flop to resolve before the arrival of the next rising edge of the video clock).

To ensure that a rising edge of the external video clock is always caught, the external video clock is sampled at both the rising edges and the falling edges of the system clock. By contrast, the video data at video port 107 or 108 are only sampled at the rising edges of the system clock. A synchronization circuit 300, shown in FIG. 3a, is provided to detect the edges on the video clock.

As shown in FIG. 3a, the video clock (Vclk) is provided to the data inputs of two 2-bit shift registers 301 and 302. Shift register 301 comprises D flip-flops 301a and 301b, and shift register 302 comprises D flip-flop 302a and 302b. Shift registers 301 and 302 are clocked by the rising and the falling edges of system clock SClk, respectively. In addition, the output data of shift register 301 is provided to a data input terminal of D flip-flop 305, which is also clocked by the falling edge of system clock Sclk. Preferably, D flip-flop 301a is skewed to have a rapid response to a rising edge at its data input terminal. Likewise, D flip-flop 302a is skewed to have a rapid response to a falling edge at its data input terminal. Such response skewing can be achieved by many techniques known in the art, such as the use of ratio logic and the use of a high gain in the master stage of a master-slave flip-flop.

NAND gates 310–313 are provided in an AND-OR configuration. NAND gates 310 and 311 each detect a rising edge transition, and NAND gate 312 detects a falling edge transition. An edge transition detected in any of NAND gates 310–312 results in a logic '1' in NAND gate 313. NAND gate 312 is used in the 16-bit mode to detect a falling edge of the video clock. This falling edge is used in the 16-bit mode to confirm latching of the second 8-bit data of the 16-bit data word on video port 107.

Figure 3B:
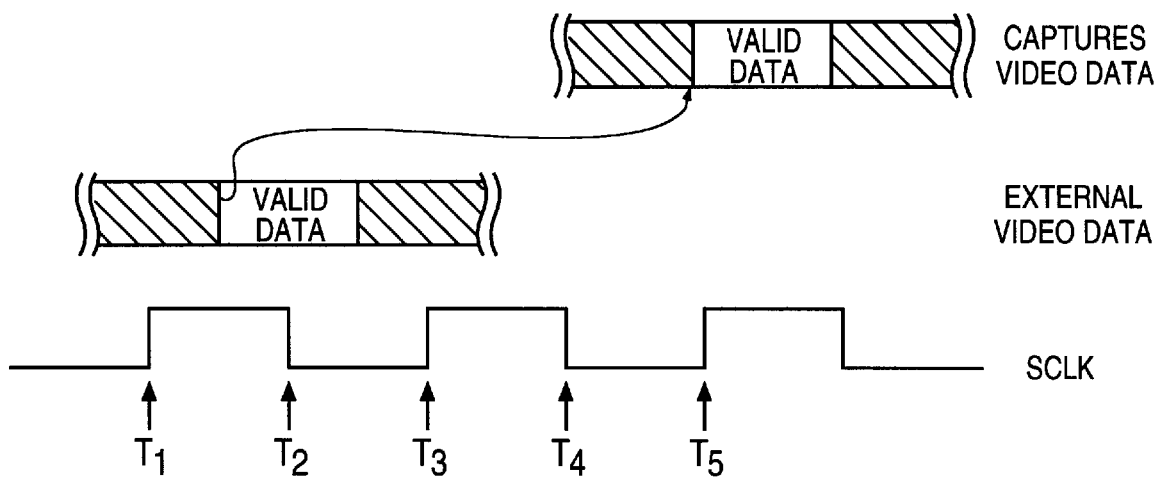
FIG. 3b shows the times at which the samples of video clock signal Vclk indicated in FIG. 3a are obtained.

The operation of synchronization circuit 300 can be described with the aid of the timing diagram shown in FIG. 3b and the time annotations indicated on the signal lines of FIG. 3a. FIG. 3b shows the states of system clock signal (Sclk) at times $t_1$ to $t_4$. The time annotation on each signal line in FIG. 3a indicates, at time $t_4$, the sample of the video clock held by the signal line. For example, since the sample of the video clock at time $t_1$ propagates to the output terminal of D flip-flop 301b after two rising edges of the system clock, the output terminal of D flip-flop 301b at time $t_4$ is annotated "$t_1$" to indicate the value of D flip-flop 301b's output data. Similarly, at time $t_4$, which is immediately after a falling edge of the system clock, the output datum of D flip-flop 305 is also labelled "$t_1$", since it holds the sample of the video clock at time $t_1$.

At time $t_4$, therefore, NAND gate 310 compares an inverted sample of the video clock at time $t_1$ with a sample of the video clock at time $t_2$. If a rising edge transition occurs between times $t_1$ and $t_2$, a zero is generated at the output terminal of NAND gate 310. NAND gate 310, therefore, detects a rising edge arriving after the sampling edge of the system clock. At the same time, NAND gate 311 compares an inverted sample of the video clock at time $t_2$ with a sample of the video clock at time $t_3$. Specifically, if a rising edge occurs between times $t_2$ and $t_3$, a zero is generated at the output terminal of NAND gate 311. Thus, NAND gate 311 detects a rising edge of the video clock arriving before the sampling edge of the system clock.

The output datum of NAND gate 313 is latched into register 314 at time $t_5$. The value in register 314 indicates whether a rising edge of Vclk is detected between times $t_1$ and $t_3$. This value is reliable because, even if D flip-flop 301a enters into a metastable state as a result of a rising edge of video clock signal Vclk arriving close to time $t_3$, the metastable state would have been resolved by time $t_5$.

In video port 107, NAND gate 312 is provided to detect a falling edge of the video clock under the 16-bit mode of operation.

b. The Decimator

Figure 5A:
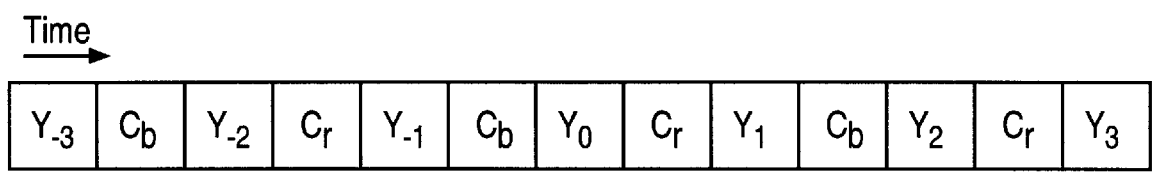
FIG. 5a shows the sequence in which 4:2:2 video data arrives at port 107.

Video port 107 processes video signals of resolutions between CCR 601 (i.e. 4:2:2, 720×480) and QCIF (176× 144). In one application, CCR 601 video signals are decimated by decimator 204 to CIF (352×288) resolution. FIG. 5a shows the sequence in which CCR 601 Y (luminance), $C_b$ and $C_r$ (chrominance) data arrive at port 107.

Decimation is performed by passing the input video through digital filters. In CCR 601 filtering, the chrominance data are not filtered, but the digital filter for luminance data provides as filtered pixels, each denoted Y*, according to the equation:

$$Y_0^* = \frac{2(Y_{-1} + Y_1) + 6Y_0}{8}$$

where $Y_0$ is the luminance data at the center tap, and $Y_{-1}$ and $Y_1$ are luminance data of the pixels on either side of pixel $Y_0$.

In this digital filter, after providing as output the filtered luminance pixel $Y^*_0$, the center tap moves to input luminance sample $Y_1$.

For CIF decimation, the digital filter for luminance samples has the equation, $$Y_0^* = \frac{16Y_0 + 9(Y_{-1} + Y_1) - (Y_3 + Y_{-3})}{32}$$

where $Y_{-3}, Y_{-2}, Y_{-1}, Y_0, Y_1, Y_2, Y_3$ are consecutive input luminance data ($Y_{-2}$ and $Y_2$ are multiplied with a zero coefficient in this embodiment).

Unlike the CCR 601 filtering, the center tap moves to $Y_2$, so that the total number of filtered output samples is half the total number of input luminance samples to achieve a 50% decimation. Under CIF decimation, $C_r$ and $C_b$ type chrominance data are also filtered and decimated. The decimation equations are:

$$Cr_0^* = \frac{Cr_0 + Cr_{-1}}{2}; Cb_0^* = \frac{Cb_0 + Cb_{-1}}{2}$$

where $Cr_0$ and $Cr_{-1}$, and $Cb_0$ and $Cb_{-1}$ are consecutive samples of the $C_r$ and $C_b$ types. The $C_b$ and $C_r$ filters then operate on the samples $Cr_1$ and $Cr_2$, $Cb_1$, and $Cb_2$ respectively. Consequently, under CIF decimation, the number of filtered output samples in each of the $C_b$ and $C_r$ chrominance types is half the number of the corresponding chrominance type input pixels.

Figure 5B:
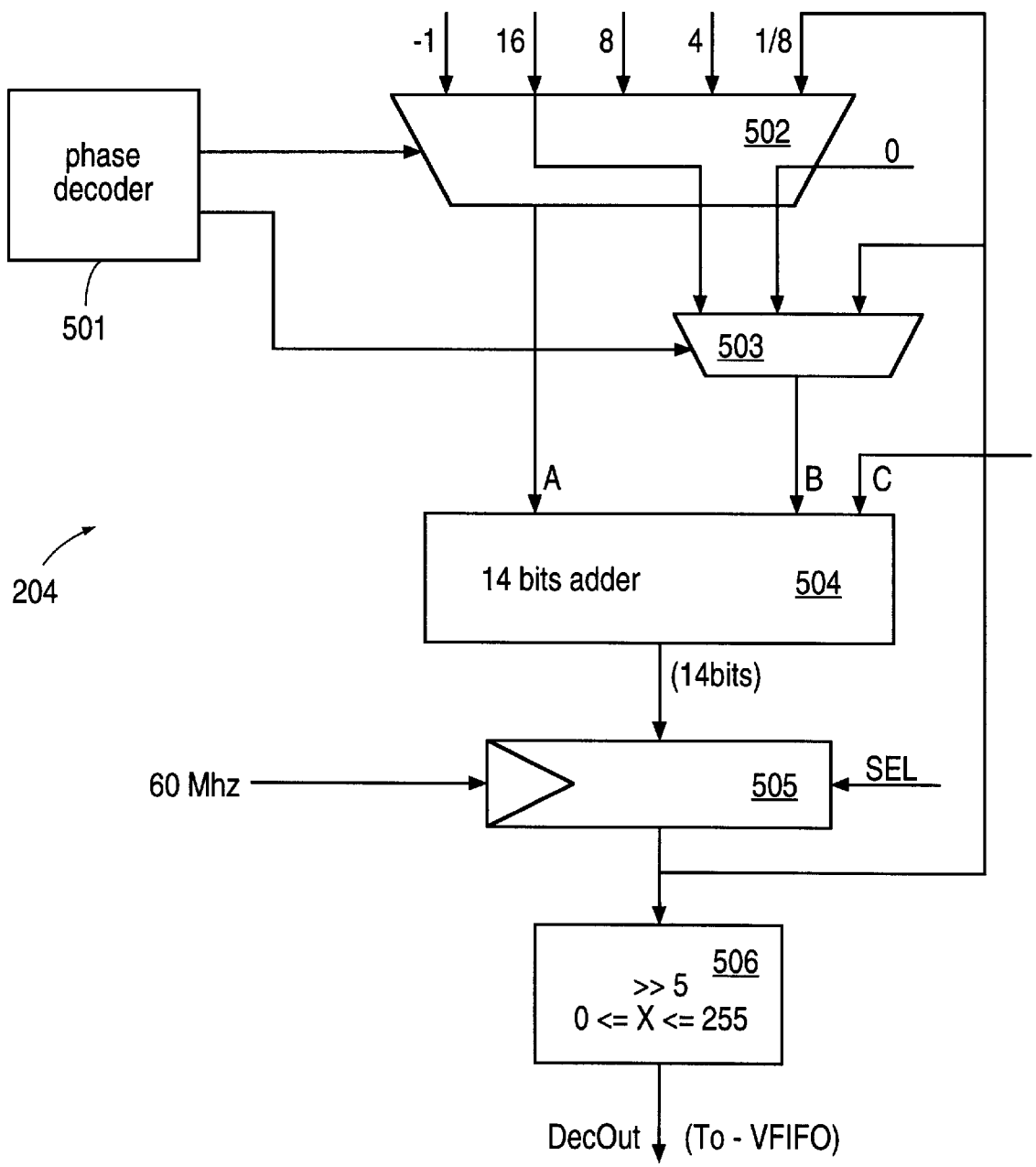
FIG. 5b is a block diagram of decimator 204 of video port 107.

FIG. 5b is a block diagram of decimator 204. As shown in FIG. 5b, Decimator 204 comprises phase decoder 501, multiplexors 502 and 503, a 14-bit adder 504, latch 505 and limiter 506. Phase decoder 501 is a state machine for keeping track of input data into decimator 204, so as to properly sequence the input samples for digital filtering.

FIG. 5c is a table showing, at each phase of CIF decimation, the data output $R_{out}$ of register 201, the operand inputs $A_{in}$ and $B_{in}$, and the carry-in input $C_{in}$ of adder 504, and the data output Dec of decimator 204 after limiting at limiter 506. Similarly, FIG. 5d is a table showing, at each phase of the CCIR 601 decimation, the data output $R_{out}$ of register 201, the operand inputs $A_{in}$ and $B_{in}$, and the carry-in input $C_{in}$ of adder 504, and the data output Dec of decimator 204 after limiting at limiter 506.

During a decimation operation, a data sample is retrieved from register file 201. The bits of this data sample are shifted left an appropriate number of bit positions, or inverted, to scale the data sample by a factor of 4, 8, 16 or −1, before being provided as input data to multiplexor 502. When scaling by 16 is required, is added to the input datum to multiplexor 502 to compensate precision loss due to an integer division performed in limiter 506. Multiplexor 502 also receives as an input datum the latched 14-bit result of adder 504 right-shifted by three bits. Under the control of phase decoder 501, multiplexor 502 selects one of its input data as an input datum to adder 504, at adder 504's $A_{in}$ input terminal. Multiplexor 503 selects the data sample (left-shifted by four bits) from register 201, a constant zero, or the latched result of 14-bit adder 504. The output datum of multiplexor 503 is provided as data input to 14-bit adder 504, at the $B_{in}$ input terminal.

The output datum of 14-bit adder 504 is latched at the system clock rate (60 Mhz) into register 505. Limiter 506 right-shifts the output datum of register 505 by 5 bits, so as to limit the output datum to a value between 0 and 255. The output datum of limiter 506 is provided as the data output of decimator 204.

As mentioned above, video port 108 can alternatively be configured as an output port. When configured as an output port, port 108 provides, at the user's option, a (1, 1) interpolation between every two consecutive samples of same type chrominance or luminance data.

Figure 6A:
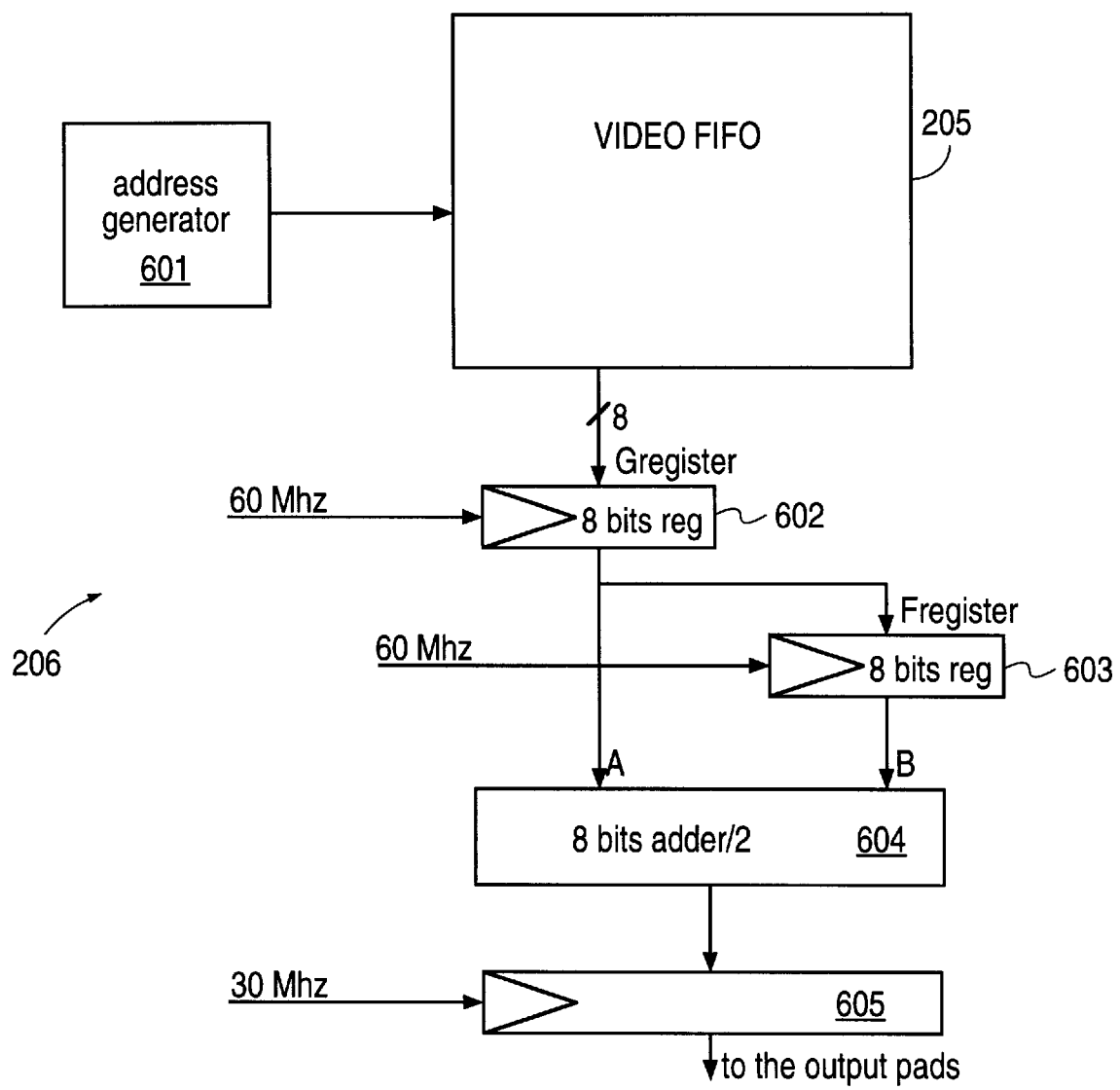
FIG. 6a is a block diagram of interpolator 206.

FIG. 6a shows interpolator 206 of chip 100. As shown in FIG. 6a, during video output mode, an address generator 601, which includes address counters 207 and 208, is provided to read from video FIFO 205 samples of video data. Consecutive samples of video data of the same type are latched into 8-bit registers 602 and 603. Data contained in register 602 and 603 are provided as input operands to adder 604. Each result of adder 604 is divided by 2, i.e. right-shifted by one bit, and latched into register 605. In this embodiment, registers 602 and 603 are clocked at 60 Mhz, and register 605 is clocked at 30 Mhz.

When video bus 109a is configured as an input bus, video FIFO 205 receives from decimator 204 the decimated video data, which is then transferred to external memory 103. Alternatively, when video bus 109a is configured as an output bus, video data are received from external memory 103 and provided in a proper sequence to interpolator 206 for output to video bus 109a. The operation of the video FIFO in video port 107 is similar to that of video FIFO 205.

When YUV separation is performed during input mode, or when interpolation is performed during output mode, video FIFO 205 is divided into four groups of locations ("block interleaved groups"). Each block interleaved group comprises a 16-byte "Y-region", an 8-byte "U-region", and an 8-byte "V-region". Data transfers between video FIFO 205 and external memory 103 occur as DMA accesses under memory controller 104's control. Address counters 207 and 208 generate the addresses required to access video FIFO 205.

Figure 6B:
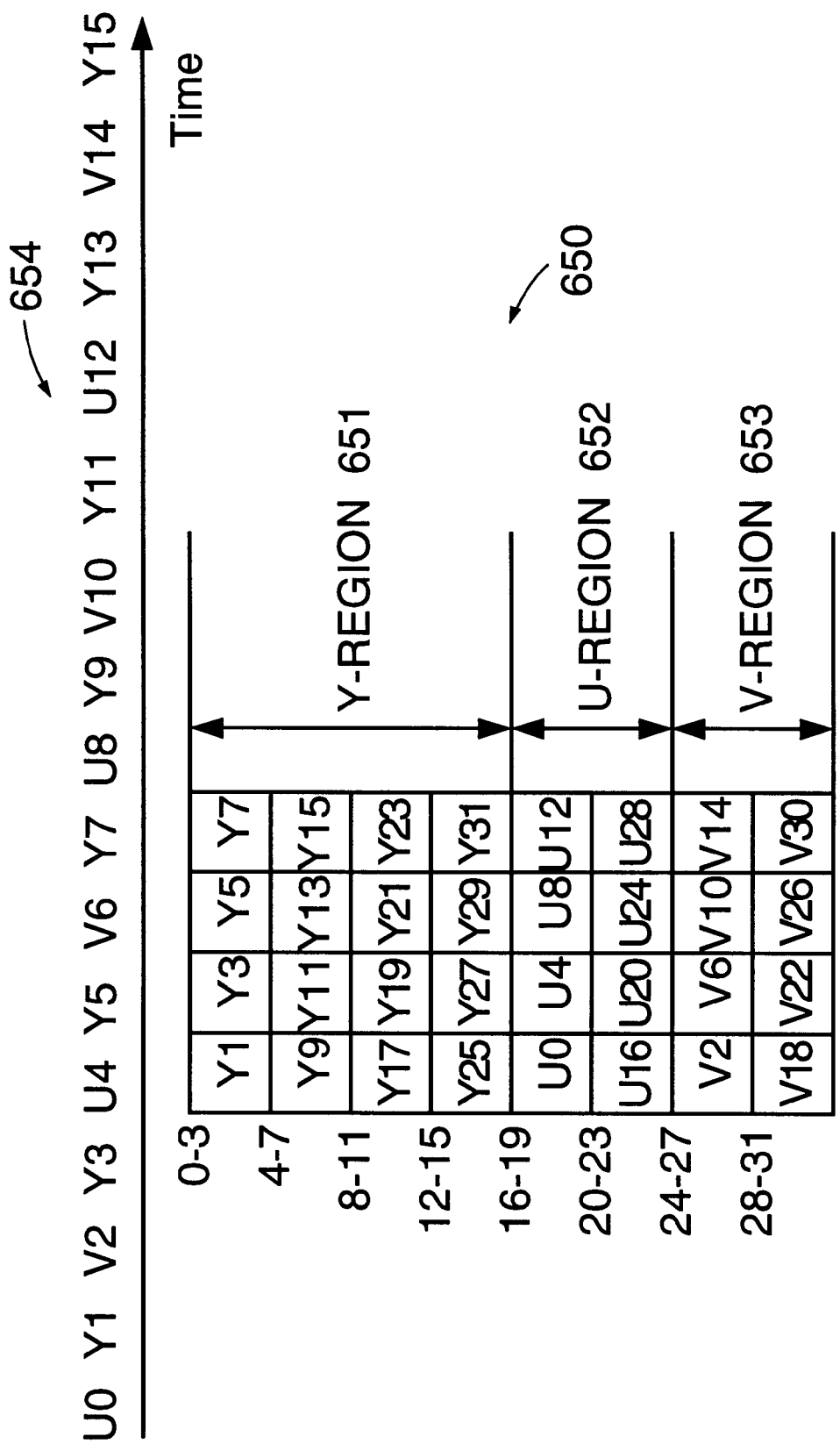
FIG. 6b is an address map of video FIFO 205, showing the partition of video FIFO 205 into Y region 651, U region 652 and V region 653, and the storage locations of data in a data stream 654 received from decimator 204.

FIG. 6b is an address map 650 of a block interleaved group in video FIFO 205, showing the block interleaved group partitioned into Y-region 651, U-region 652 and V-region 653. A data stream 654 arriving from decimator 204 is shown at the top of address map 650. Shown in each of the regions are the locations of data from data stream 654.

Address map 650 also represents the data storage location for performing interpolation, when video port 107 is configured as an output port. As shown in FIG. 6b, the Y-region 651 is offset from the U-region 652 by sixteen bytes, and the U-region 652 is further offset from the V-region 653 by eight bytes. In addition, adjacent groups of block interleaved locations are offset by 32 bytes.

Figure 6C:
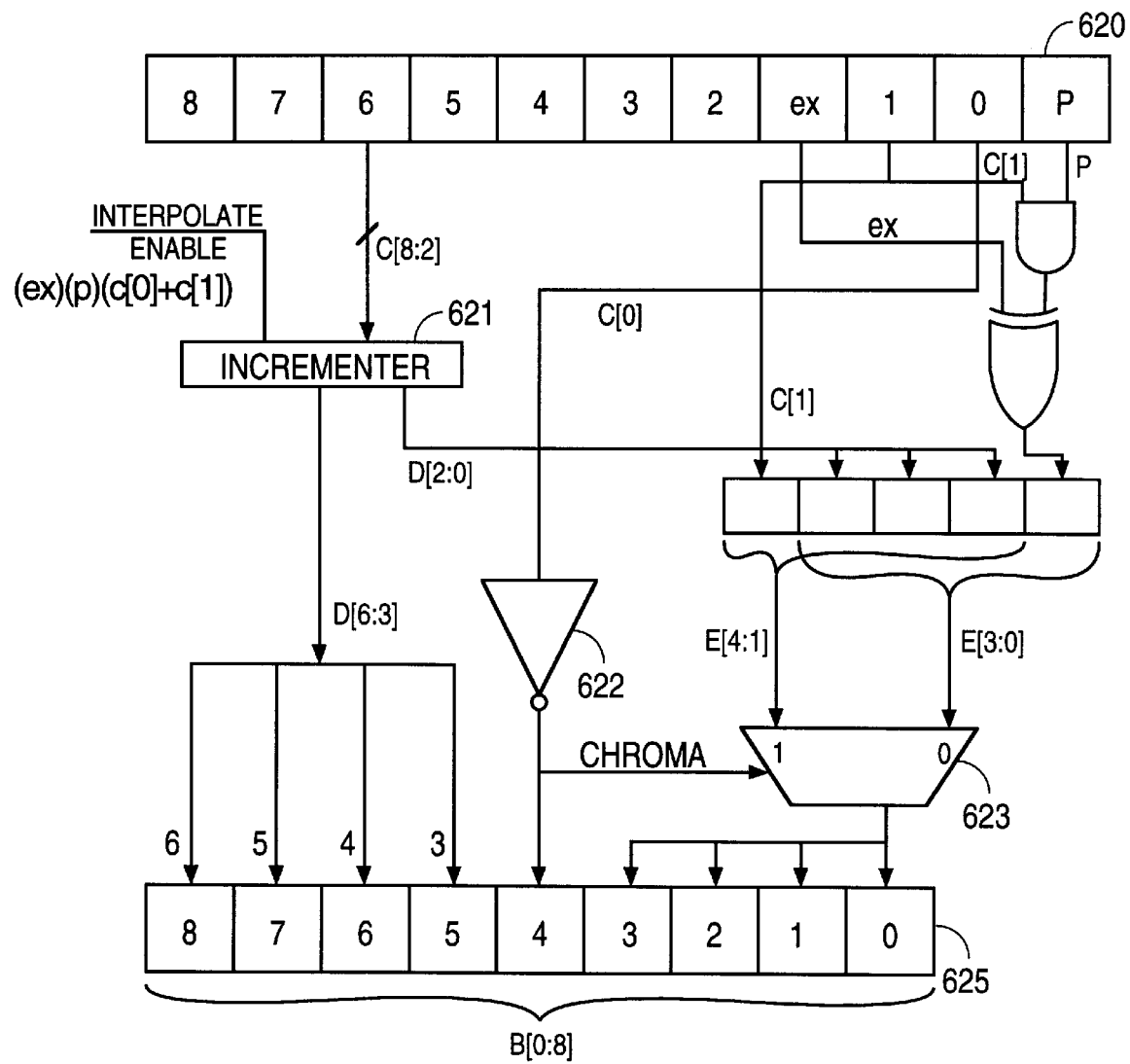
FIG. 6c illustrates the generation of addresses for accessing video FIFO 205 from the contents of address counter 207, during YUV separation, or during video output.

Address counter 207 generates the addresses of video FIFO 205 for YUV separation during input mode, and the addresses for interpolation during output mode. FIG. 6c illustrates address generation by address counter 207 for accessing video FIFO 205. As shown in FIG. 6c, address counter 207 comprises a 11-bit counter 620 counting at 60 Mhz. Embedded fields in counter 620 include a 9-bit value C[8:0], and bits "p" and "ex". The positions of these bits in counter 620 are shown in FIG. 6c. The "p" bit, which is the least significant bit of counter 620, represents the two phases of an interpolation operation. These two phases of an interpolation operation correspond to operand loadings into registers 602 and 603 (FIG. 6a) during the (1, 1) interpolation.

During interpolation, every other luminance sample, every other red type chrominace sample ($C_r$), and every other blue chrominance sample ($C_b$) are interpolated. FIG. 6d shows, under interpolation mode, the sequence in which stored and interpolated luminance and chrominace samples are output.

Bit C[0] of binary counter 620 counts at 30 Mhz. Since video data samples are received or output at video ports 107 and 108 in pixel interleaved order at 30 MHz, bit C[0] of binary counter 620 indicates whether a luminance sample or a chrominance sample is received or output. Since bit C[1] counts at half the rate of bit C[0], for chrominance samples, bit C[1] indicates whether a $C_b$ or a $C_r$ type chrominance sample is output.

Bits C[8:0] are used to construct the byte address B[8:0] (register 625) for accessing video FIFO 205. Bits B[6:5] indicate which of the four block interleaved groups in video FIFO 205 is addressed. Thus, bits B[8:5] form a "group address". Incrementer 621 receives bits C[8:2] and, during interpolation, increments the number represented by these bits. Bits C[8:2] is incremented whenever the following expression evaluates to a logical true value:

(ex∧p)∧($\overline{C[0]}$∨C[1])

where ∧ is the logical operator "and" and ∨ is the logical operator "or". Bit "ex" of binary counter 620 indicates an interpolation output. Thus, according to this expression, incrementer 621 increments C[8:2] at one of the two phases of the interpolation operation, every other luminance output, or every other blue or red chrominance output. In this embodiment, when the output sample is not an interpolated output sample, incrementer 621 is disabled. Consequently, both registers 602 and 603 (FIG. 6a) obtain their values from the same byte address. In effect, the same sample is fetched twice, so that each non-interpolated sample is really obtained by performing a 1-1 interpolating using two identical values.

The data output of incrementer 621 is referenced as D[6:0]. As shown in FIG. 6c, the group address B[6:5] is provided by bits D[4:3]. Since a toggle of bit B[4] indicates a jump of 16 byte addresses, bit B[4] can be used to switch, within a block interleaved group, between the luminance and the chrominance regions. Accordingly, bit B[4] adopts the value of negated bit C[0]. In addition, since a toggle of bit B[3] indicates a jump of eight byte addresses, bit B[3] can be used to switch, when a chrominance sample is fetched, between the U and V regions of a block interleaved group. Thus, as shown in FIG. 6c, bit B[3] has the value of bit C[1].

The unregistered value 624 contains a value E[4:0] formed by the ordered combination of bit C[1], bits D[2:0] and the bit which value is provided by the expression ((C[1]∧p)∨ex), where ∨ is the "exclusive-or" operator. Bits E[4:1] provides the byte address bits B[3:0] during output of a chrominance sample, and bits E[3:0] provides byte address bits B[3:0] during output of a luminance sample. Bit E[0] ensures the correct byte address is output when an "odd" interpolated luminance sample is output. (U+V refer to chrominance pixel types $C_b$+$C_r$ respectively.)

Figure 6E:
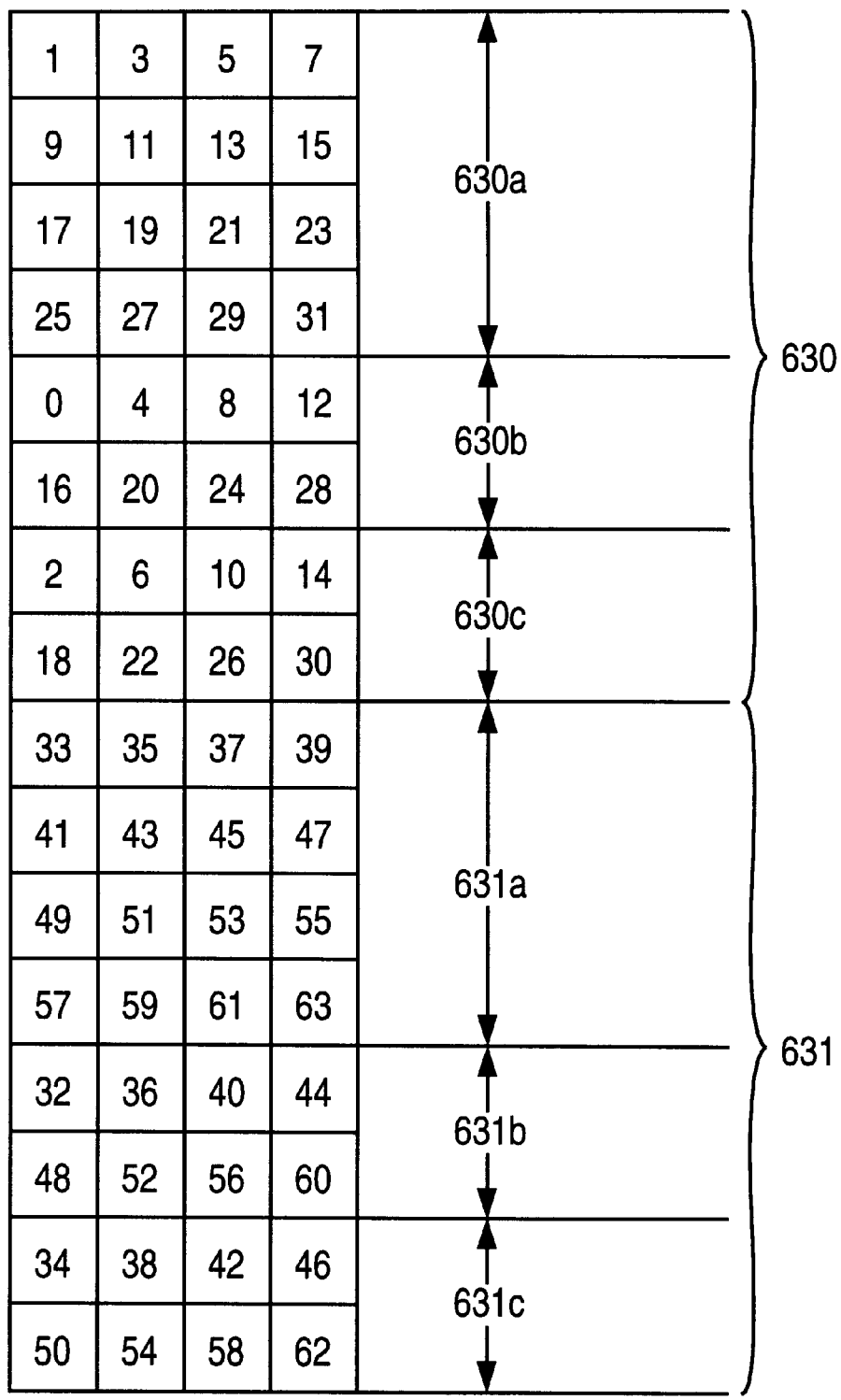
FIG. 6e shows two block interleaved groups 630 and 631 in video FIFO 205.

FIG. 6e shows two adjacent block interleaved groups 630 and 631. Group 630 comprises Y-region 630a, U-region 630b and V-region 630c and group 631 comprises Y-region 631a, U-region 631b and V-region 631c. In FIG. 6e, the labels 1–31 in group 630 represent the positions, in pixel interleaved order, of the pixels stored at the indicated locations of video FIFO 205. Likewise, the labels 32–63 in group 631 represent the positions, in pixel interleaved order, of the pixels stored at the indicated locations. The control structure of FIG. 6c ensures that the proper group addresses are generated when the output sequence crosses over from output samples obtained or interpolated from pixels in group 630 to samples obtained or interpolated from pixels in group 631.

3. The Memory Structure

Figure 7A:
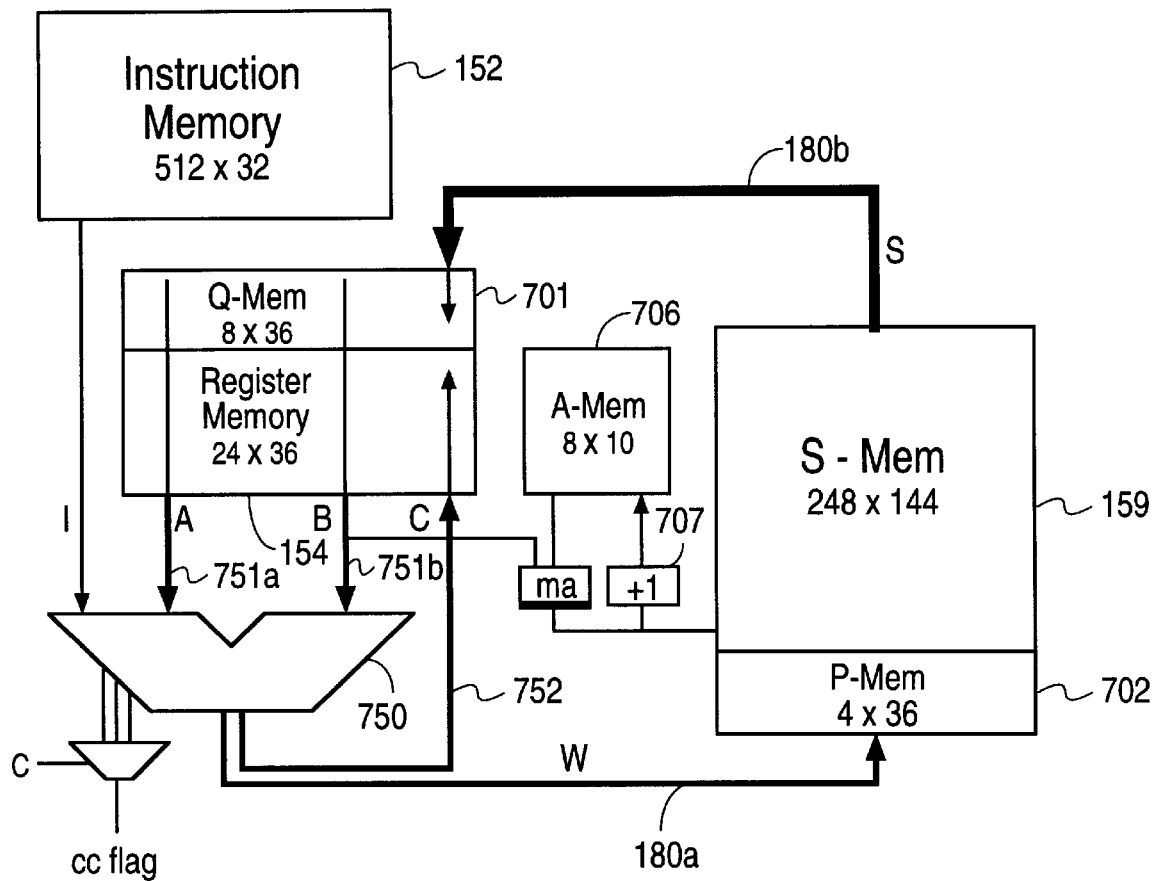
FIG. 7a is an overview of data flow between memory blocks relating to CPU 150.

Internally, chip 100 has six major blocks of memory circuits relating to CPU 150. These memory circuits, which are shown in FIG. 7a, include instruction memory 152, register file 154, Q memory 701 ("QMEM"), SMEM 159, address memory ("AMEM") 706, and P memory 702 ("PMEM"). In addition, a FIFO memory ("VLC FIFO") 703 (not shown) is provided for use by VLC 109 and VLD 110 during the coding and decoding of variable-length codes. A "zig-zag" memory 704 ("Z mem", not shown) is provided for accessing DCT coefficients in either zigzag or binary order. Finally, a window memory 705 ("WMEM", not shown) is provided in motion estimator 111 for storing the current and reference blocks used in motion estimation.

Figure 15A:
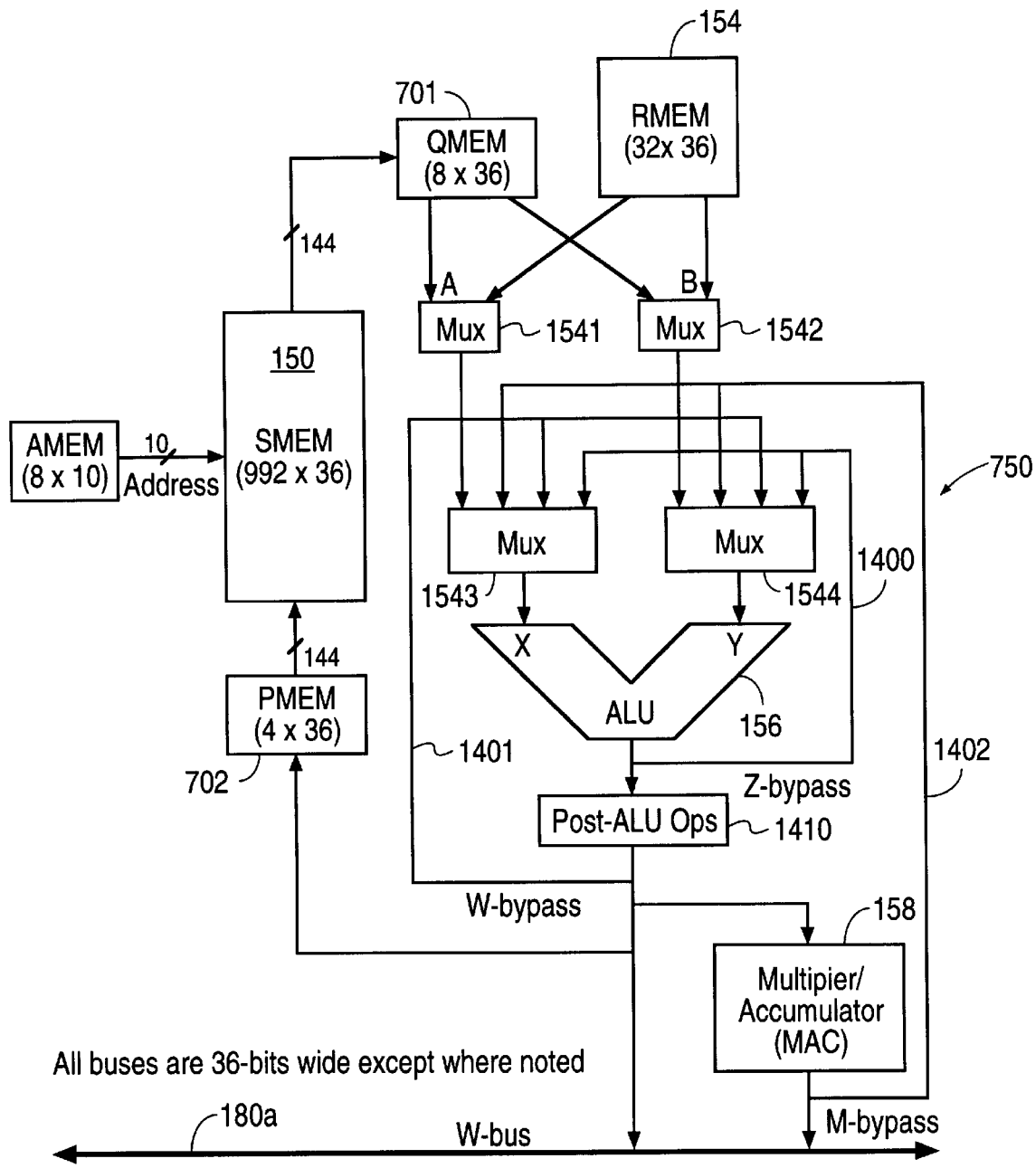
FIG. 15a is a block diagram of arithmetic unit 750.
Figure 15B:
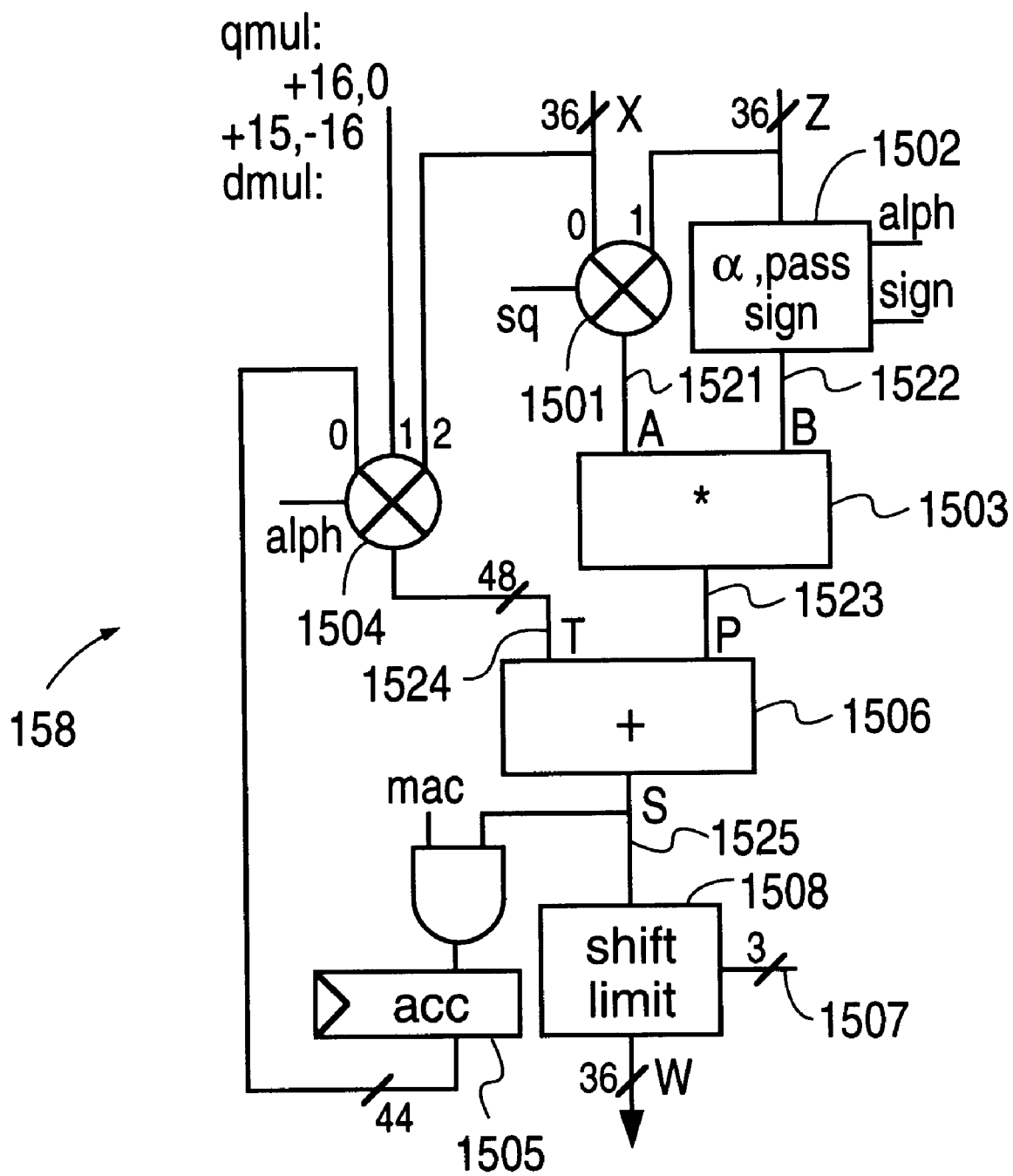
FIG. 15b is a schematic diagram of MAC 158.
Figures 1, 15C:
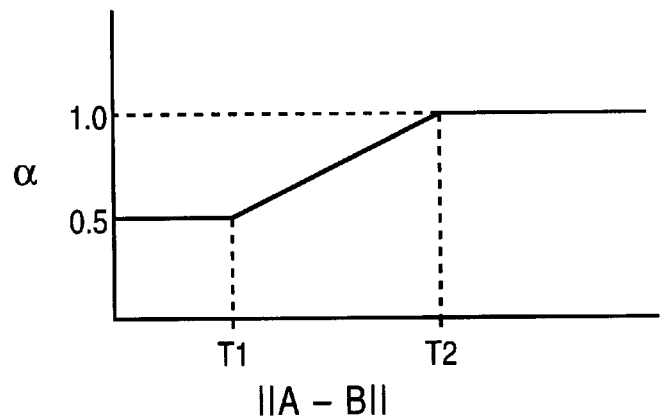
FIG. 15c-1 illustrates an example of "alpha filtering" in the mixing filter for combining chroma during a deinterlacing operation.
Figures 2, 15C:
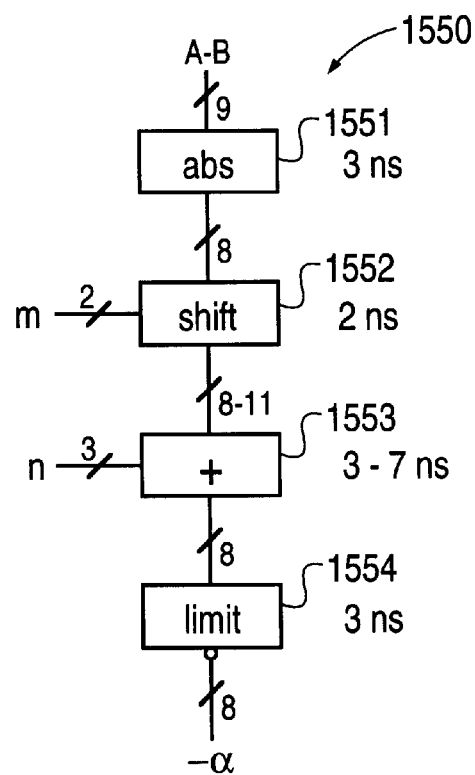
Figures 3, 15C:
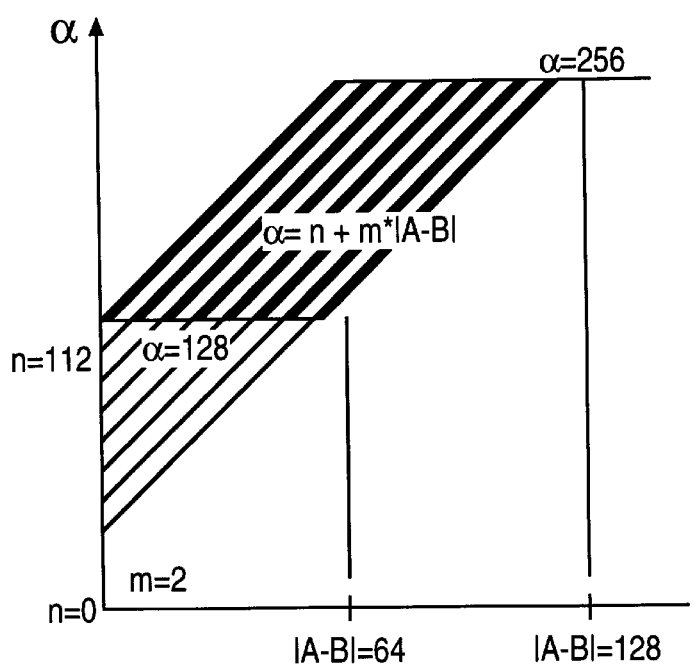
Figures 4, 15C:
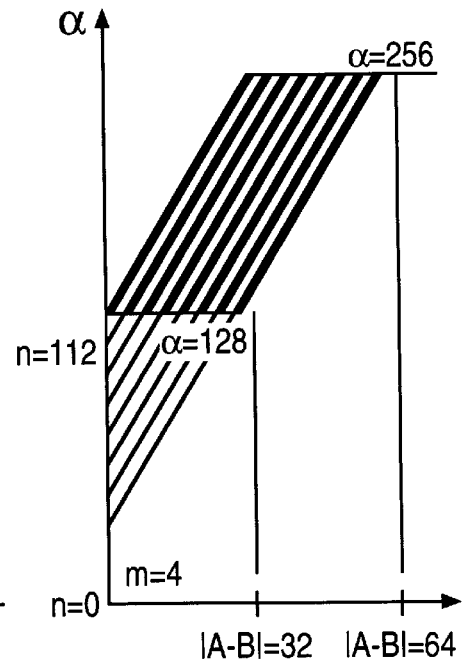
Figures 5, 15C:
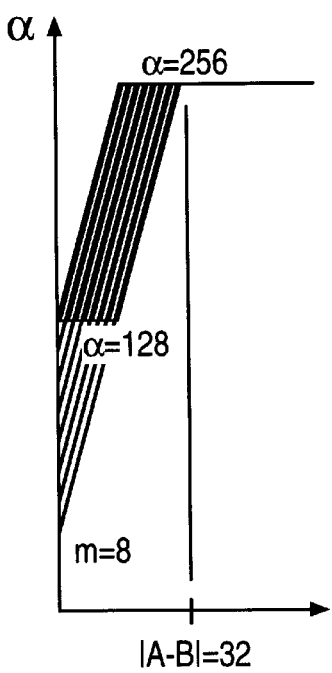
Figures 6, 15C:
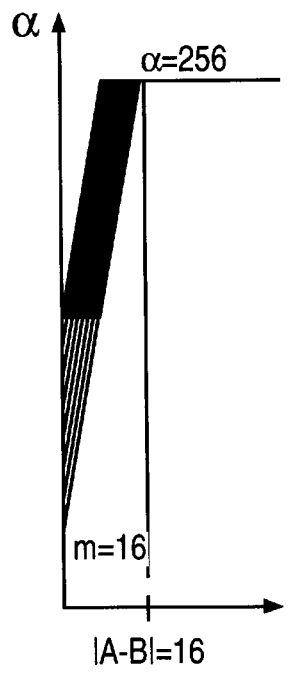

In FIG. 7a, an arithmetic unit 750 represents both ALU 156 and MAC 158 (FIG. 1). Instructions for arithmetic unit 750 are fetched from instruction memory 152. Instruction memory 152 is implemented in chip 100 as two banks of 512×32 bit single port SRAMs. Each bank of instruction memory 152 is accessed during alternate cycles of the 60 Mhz system clock. Instruction memory 152 is loaded from global bus 120.

The two 36-bit input operands and the 36-bit result of arithmetic unit 750 are read and written into the 32 general purpose registers R0–R31 of register file 154. The input operands are provided to arithmetic unit 750 over 36-bit input busses 751a and 751b. The result of arithmetic unit 750 are provided by 36-bit output bus 752. (In this embodiment, register R0 is a pseudo-register used to provide the constant zero).

QMEM 701, which is organized as eight 36-bit registers Q0–Q7, shares the same addresses as registers R24–R31. To distinguish between an access to one of registers R24–R31 and an access to one of the registers in QMEM 701, reference is made to a 2-bit configuration field "PQEn" (P–Q memories enable) in CPU 150's configuration register. In this embodiment, registers R0–R23 are implemented by 3-port SRAMs. Each of registers R0–R23 is clocked at the system clock rate of 60 MHz, and provides two read-ports, for data output onto busses 751*a* and 751*b*, and one write port, for receiving data from bus 752. Registers R24–R31 are accessed for read and write operations only when the "PQEN" field is set to '00'. The access time for each of registers R0–R23 is 8 nanoseconds. The write ports of registers R0–R31 are latched in the second half period of the 60 Mhz clock, to allow data propagation in the limiting and clamping circuits of arithmetic unit 750.

SMEM 159, which is organized as a 256×144-bit memory, serves as a high speed cache between external memory 103 and the register file 154. SMEM 159 is implemented by single-port SRAM with an access time under two periods of the 60 Mhz system clock (i.e. 33 nanoseconds).

To provide higher performance, special register files QMEM 701 and PMEM 702 are provided as high speed paths between arithmetic unit 750 and SMEM 159. Output data of SMEM 159 are transferred to QMEM 701 over the 144-bit wide processor bus 180*b*). Input data to be written into SMEM 159 are written into PMEM 702 individually as four 36-bit words. When all four 36-bit words of PMEM 702 contain data to be written into SMEM 159, a single write into SMEM 159 of a 144-bit word is performed. SMEM 159 can also be directly written from a 36-bit data bus in "W bus" 180*a*, bypassing PMEM 702. W bus 180*a* comprises a 36-bit data bus and a 6-bit address bus. Busses 180*a* and 180*b* form the processor bus 180 shown in FIG. 1.

In this embodiment, QMEM 701 is implemented by 3-port 8×36 SRAMs, allowing (i) write access on bus 108*b* as two quad-word (i.e. 144-bit) registers, and (ii) read access on either bus 751*a* or 751*b* as eight 36-bit registers. The access time for QMEM 701 is 16 nanoseconds. PMEM 702 allows write access from both W bus 180*a* and QGMEM 810 (see below). QGMEM 810 is an interface between global bus 120 and processor bus 180*a*. PMEM 702 is read by SMEM 159 on an 144-bit bus 708 (not shown).

Figure 7B:
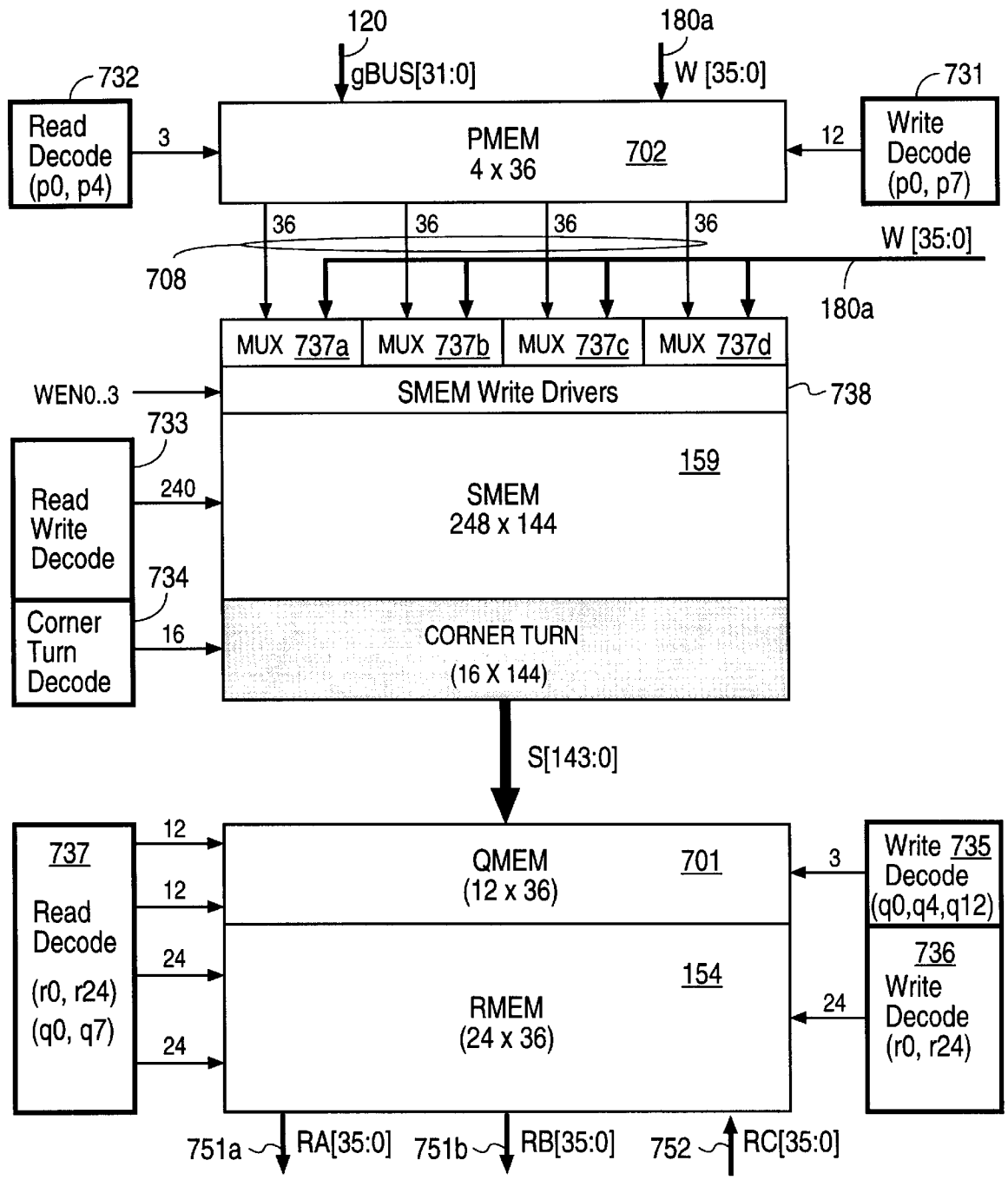
FIG. 7b illustrates in further detail the data flow between P memory 702, QMEM 701, registers R0–R23, and scratch memory 159.
Figure 7C:
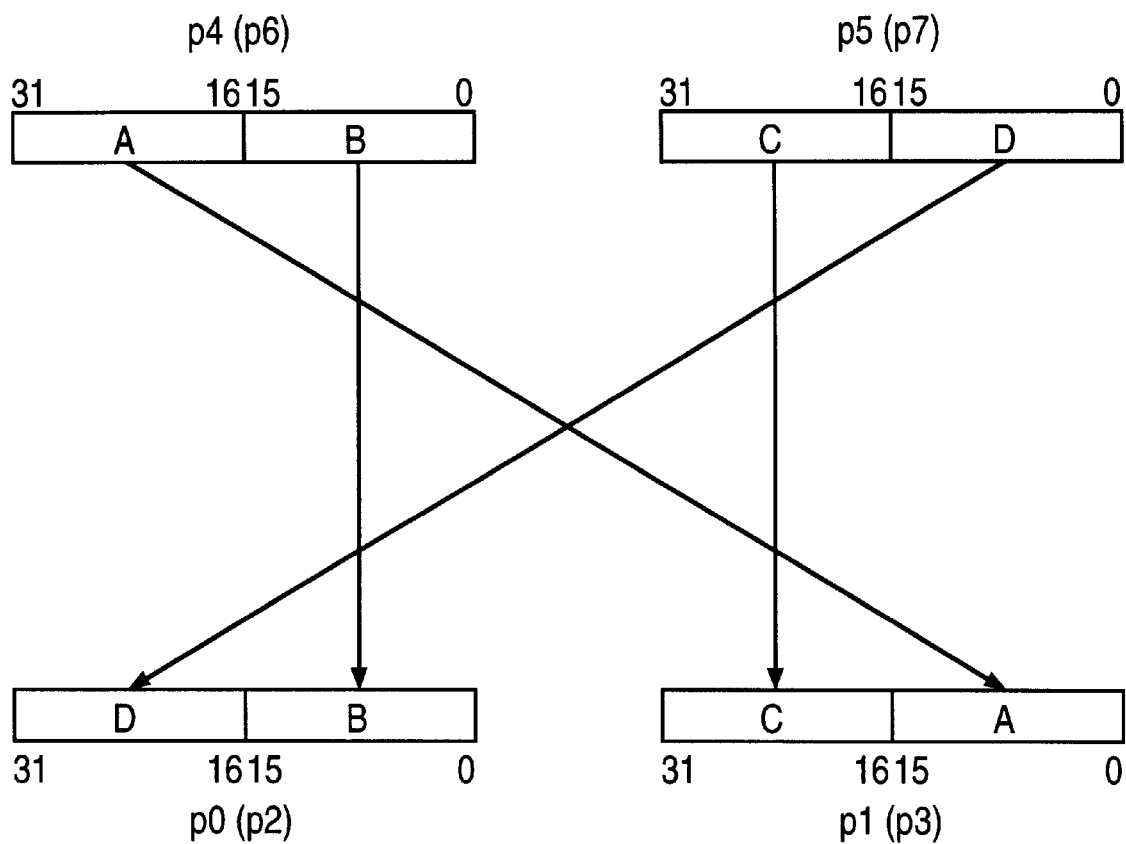
FIG. 7c shows the mappings of registers P4–P7 into the four physical registers corresponding to registers P0–P3.

FIG. 7*b* illustrates in further detail the interrelationships between QMEM 701, PMEM 702, SMEM 159 and registers R0–R31. As shown in FIG. 7*b*, PMEM 702 receives either 32-bit data on global bus 120, or 36-bit data on W bus 180*a*. Write decoder 731 maps the write requests on W-bus 180*a* or global bus 120*a* into one of the eight 36-bit registers P0–P7. Physically, PMEM 702 is implemented by only four actual 36-bit registers. Each of the registers P0–P3 is mapped into one of the four actual registers. The halfwords of each of registers P4–P7 map into two of the four actual registers. FIG. 7*c* shows the correspondence between registers P4–P7 and registers P0–P3, which are each mapped into the four actual registers. As shown in FIG. 7*c*, the higher and lower order halfwords (i.e. bits [31:16] and bits [15:0], respectively) of register P4 are mapped respectively into the lower order halfwords (i.e. bits [15:0]) of register P1 and P0. The higher and lower order halfwords (i.e. bits [31:16] and bits [15:0], respectively) of register P5 are mapped respectively into the higher order halfwords of registers P1 and P0. The higher and lower order halfwords of register P6 are mapped respectively into the lower order halfwords of registers P3 and P2. The higher and lower order halfwords of register P7 are mapped respectively into the higher order halfwords of registers P3 and P2. In this manner, an instruction storing a quad pel (4 by 16-bits) into registers P4 and P5, or registers P6 and P7 would also have transposed the quad pel prior to storing the quad pel into SMEM 159. In conjunction with the "quarter turn" memory (described below), registers P4–P7 provides a means for writing a macroblock of pixels in column or row order and reading the macroblock back in the corresponding row or column order.

PMEM 702 is read only by the StoreP instruction, and stores over bus 708 the four actual registers as a 144-bit word into SMEM 159. The 144-bit word stored into SMEM 159 is formed by concatenating the contents of the four actual registers, in the order of corresponding registers P0–P3.

Thirty-two 36-bit locations in SMEM 159 are each provided two addresses. These addresses occupy the greatest 64 (36-bit word) addresses of SMEM 159's address space. The first set of addresses ("direct addresses"), at hexadecimal 3c0-3df), are mapped in the same manner as the remaining lower 36-bit locations of SMEM 159. The second set of addresses ("alias addresses"), at hexadecimal 3e0-3ff, are aliased to the direct addresses. The mappings between the direct and the alias addresses are shown in FIG. 7*d*. The aliases are assigned in such a way that, if a macroblock is written in row order into these addresses, using the second set of addresses and using registers P4–P7 of PMEM 702, and read back in sequential order using the first (direct) address, the macroblock is read back in column and row transposed order. Since the present embodiment performs 2-dimensional DCT or an IDCT operation on a macroblock in two passes, one pass being performed in row order and the other pass being performed in column order, these transpose operations provide a highly efficient mechanism of low overhead to perform the 2-dimensional DCT or IDCT operation.

As shown in FIG. 7*b*, SMEM 159 can also be written directly from W bus 180*a*, thereby bypassing PMEM 702. Multiplexers 737*a*–737*d* selects as input data to SMEM 159 between the data on bus 708 and W bus 180*a*. Drivers 738 are provided for writing data into SMEM 159. Decoder 733 decodes read and write requests for access to SMEM 159.

An address memory ("AMEM") 706, which is implemented as an 8×10 bit SRAM, stores up to eight memory pointers for indirect or indexed access of SMEM 159 at 36-bit locations. An incrementer 707 is provided to facilitate indexed mode access of SMEM 159.

Zigzag memory 704 and window memory 705 are described below in conjunction with VLC 109 and motion estimator 111.

4. Memory Controller 104

Chip 100 accesses external memory 103, which is implemented by dynamic random access memory (DRAM). Controller 104 supports one, two or four banks of memory, and up to a total of eight megabytes of DRAM.

Memory controller 104 manages the accesses to both external memory 103 and the internal registers. In addition, memory controller 104 also (a) arbitrates requests for the use of global bus 120 and W bus 180*a*; (b) controls all transfers between external memory 103 and the functional units of chip 100, and (c) controls transfers between QG registers ("QGMEM") 810 and SMEM 159. FIG. 8 is a block diagram of memory controller 104. QGMEM 810 is a 128-bit register which is used for block transfer between 144-bit SMEM 159 and 32-bit global bus 120. Thus, for each transfer between QGMEM 810 and SMEM 159, four transfers between global bus 120 and QGMEM 801 would take place. A guard-bit mechanism, discussed below, is applied when transferring data between QGMEM 810 and SMEM 159.

Figure 8A:
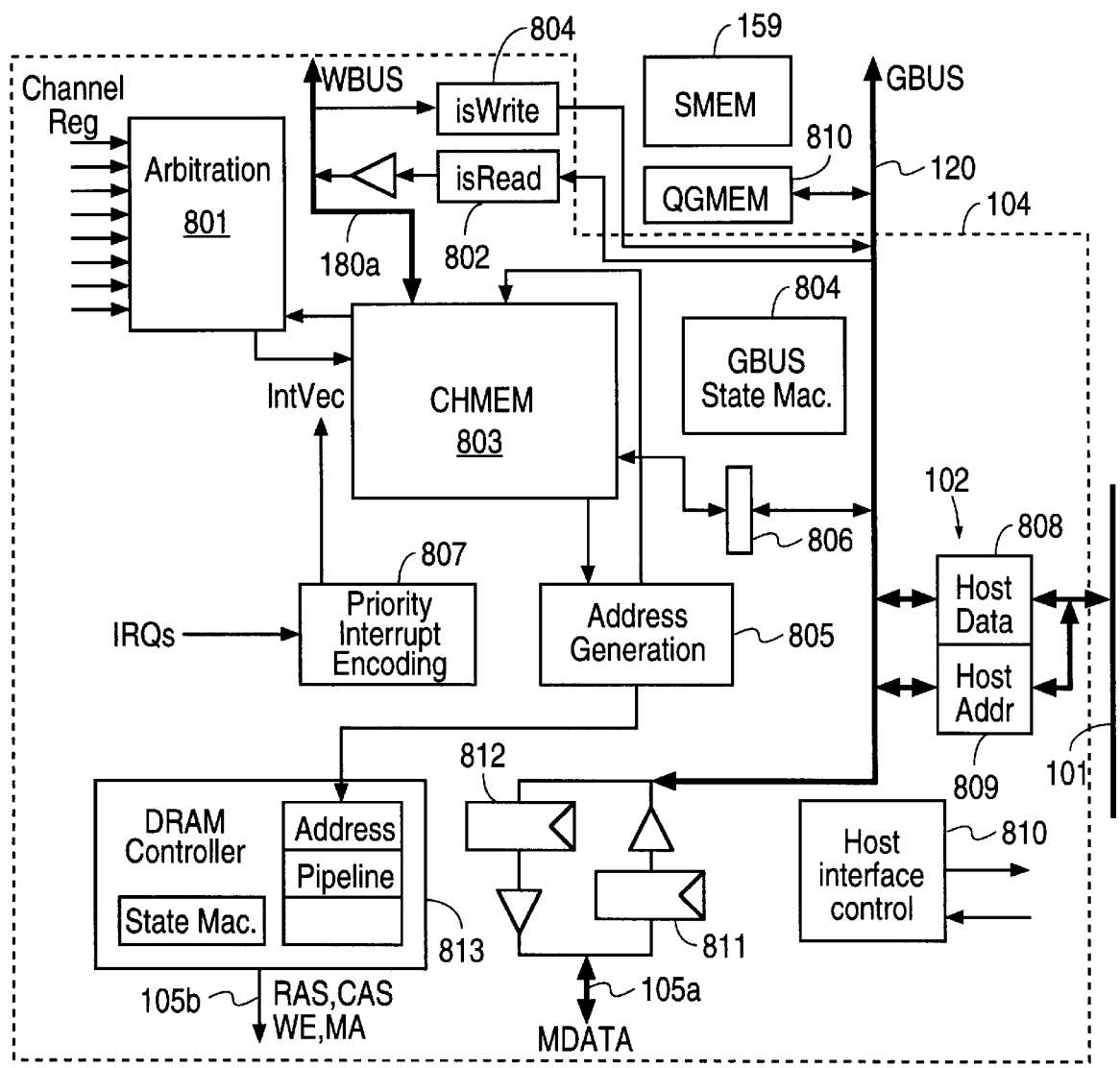
FIG. 8a is a block diagram of memory controller 104, in accordance with the present invention.

As shown in FIG. 8*a*, an arbitration circuit 801 receives requests from functional units of chip 100 for data transfer between external memory 103 and the requesting functional units. Data from external memory 103 are received into input buffer 811, which drives the received data onto global bus 120. The requesting functional units receive the requested data either over global bus 120, or over processor bus (i.e. W bus) 180a in the manner described below. Data to be written into external memory 103 are transferred from the functional units over either w bus 180a or global bus 120. Such data are received into a data buffer 812 and driven on to memory data bus 105a.

W bus 180a comprises a 36-bit data bus 180a-1 and a 6-bit address bus 180a-2. The address and data busses 180a-1 and 180a-2 are pipelined so that the address on address bus 180a-2 is associated with the data on data bus 180a-2 in the next cycle. The most significant bit of address bus 180a-2 indicates whether the operation reads from a register of a functional unit or writes to a register of a functional unit. The remaining bits on address bus 180a-2 identify the source or destination register. Additional control signals on W bus 180a are: (a) isW__bsy (a signal indicating valid data in the isWrite Register 804), (b) Wr__isW (a signal enabling a transfer of the content of data bus 180a-1 into isWrite Register 804), (c) req__W5__stall (a signal requesting W bus 108a 5 cycles ahead), and (d) Ch1__busy (a signal to indicate that channel 1, which is RMEM 154, is busy).

In memory controller 104, a channel memory 802 and an address generation unit 805 control DMA transfers between functional units of chip 100 and external memory 103. In the present embodiment, channel memory has eight 32-bit registers or entries, corresponding to 8 assigned channels for DMA operations. To initiate a DMA access to external memory 103 or an internal control register, the requesting device generates an interrupt to have CPU 150 write, over W bus 180a, a request into the channel memory entry assigned to the requesting device. The portion of external memory 103 accessed by DMA can be either local (i.e. in the address space of the present chip) or remote (i.e. in the address space of another chip).

Figure 8B:
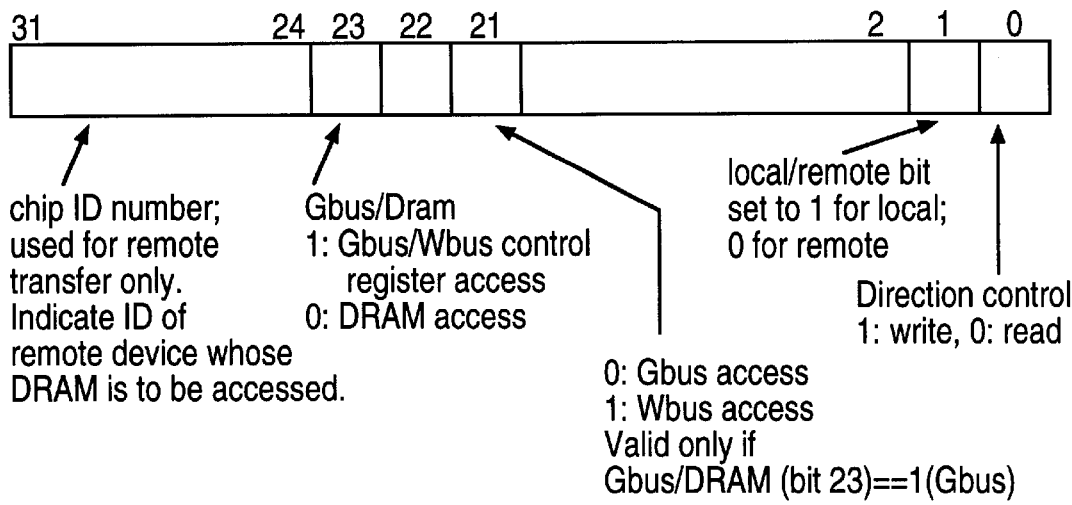
FIG. 8b shows a bit assignment diagram for the channel memory entries of channel 1.
Figure 8C:
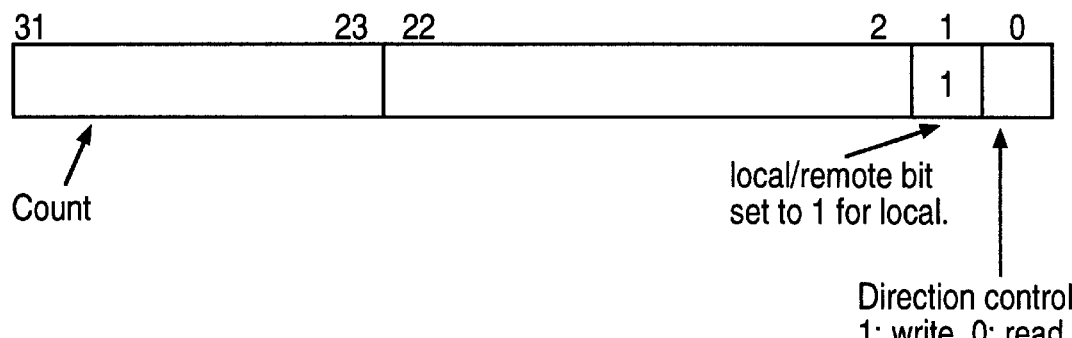
FIG. 8c shows a bit assignment diagram for the channel memory entries of channels 0, and 3–7.
Figure 8D:
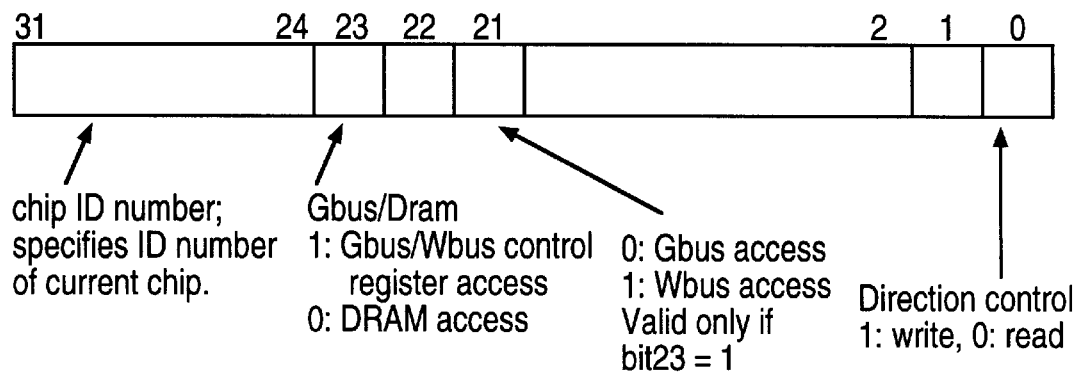
FIG. 8d shows a bit assignment diagram for the channel memory entry of channel 2.

In the present embodiment, channel 0 is reserved for preforming refresh operations of external memory 103. Channel 1 allows single-datum transfer between external memory 103 and RMEM 154. Channel 2 is reserved for transfers between host interface 102 and either external memory 103 or internal control registers. FIGS. 8b and 8d provide the bit assignment diagrams for channel memory entries of channels 1 and 2 respectively. Channels 3–7 are respectively assigned to data transfers between either external memory 103, or internal control registers, and (a) video bus 107, (b) video bus 108, (c) VLC FIFO 703 of VLC 109 and VLD 110, (d) SMEM 159, and (e) instruction memory 152. FIG. 8c provides the bit assignment diagrams of the channel memory entries of channels 0 and 3–7.

For all channel entries, bit 0 indicates whether the requested DMA access is a read access or a write access. In the channel memory entry of channel 1 (FIG. 8b), bits 31:24 are used to specify ID of a "remote" chip, when the address space of the remote chip is accessed. If access to the address space of a remote chip is requested, bit 1 is also set. In the channel memory entry of channel 1, bit 23 indicates whether the DMA access is to external memory 103 or to a control register of either global bus 120 or W bus 180a. When the access is to a control register of W bus 180a, bit 21 is also set. For channels 0, 3–7, bits 31:23 provide a count indicating the number of 32-bit words to transfer. For channels 3 and 4 (video buses 107 and 108), the count is a multiple of 16. For channel 6 (SMEM 159), the count is a multiple of 4.

Referring back to FIG. 8a, external DRAM controller 813 maps the addresses generated by address generation unit 805 into addresses in external memory 103. DRAM controller 813 provides conventional DRAM control signals to external memory 103. The output signals of DRAM controller 813 are provided on memory address bus 105b.

In this embodiment, a word in external memory 103 or on host bus 101 is 32-bit long. However, in most internal registers, and on W bus 180a, a data word is 36-bit long. To save the four bits not transferred to external memory 103, or host bus 101, a guard-bit register stores the data bits 35:32 that are driven onto global bus 120. For data received from a 32-bit data source, the "Inbit" field of the guard bit register supplies the missing four bits.

A priority interrupt encoding module 807 receives interrupt requests from functional units and generates interrupt vectors according to a priority scheme for CPU 150 to service. An interrupt is generated whenever a channel in channel memory 802 is empty and the channel's interrupt enable bit (stored in an interrupt control register) is set. In this embodiment, the interrupt vector is 4-bit wide to allow encoding of 16 levels of interrupt.

Transactions on global bus 120 are controlled by a state machine 804. Global bus 120, which is 32-bit wide, is multiplexed for address and data. Two single-bit signals GDATA and GVALID indicate respectively whether data or address is placed on global bus 120, and whether valid data or address is currently on global bus 120. Additional single-bit control signals on global bus 120 are IBreq (video input port requests access to external memory), OBreq (video output requests access to external memory), VCreq (VLC requests access to external memory), VDreq (VLD requests access to external memory), IBdmd (Video input is demanding access to external memory), and OBdmd (video output is demanding access to external memory).

During a valid address cycle, memory controller 104 drives an address onto global bus 120. In such an address, bit 6 (i.e. the seventh bit from the least significant end) of the 32-bit word is an "read or write" bit, and indicates whether the bus access reads from or write to global bus 120. The six bits to the right of the "read or write" bit constitute an address. By driving an address of a functional unit on to global bus 120, memory controller 104 selects the functional unit for the access. Once a functional unit is selected, the selection remains until a new address is driven by memory controller 104 on to the global bus. While selected, the functional unit drives output data or reads input data, according to the nature of the access, until either the GVALID signal is deasserted, or the GDATA signal is negated. The negated GDATA signal signifies a new address cycle in the next system clock period.

An arbitration scheme allows arbitration circuit 801 to provide fairness between non-real time channels, such as SMEM 159, and real-time channels, such as video ports 107 and 108, or VLC 109. In general, a channel memory request from a functional unit is pending when (a) a valid entry of the functional unit is written in channel memory 802, (a) the mask bit (see below) of the functional unit in an enable register for the request is clear, and (c) the functional unit's request signal is asserted. For channels 3 and 7 (i.e. SMEM 159 and instruction memory 152), a request signal is not provided, and a valid entry in channel memory 802 suffices.

In this embodiment, the real-time channels have priority over non-real time channels. Arbitration is necessary when more than one request is pending, and occurs after memory controller 104 is idle or has just finished servicing the last request. In this embodiment, each non-real time channel, other than RMEM, is provided with a mask bit which is set upon a completion of request, if another non-real time request is pending. All of the non-real time mask bits are cleared when no non-real time request is outstanding. Real time channels are not provided with mask bits. Thus, a real time channel request can always proceed, unless preempted by a higher priority request. DRAM refresh is the highest priority real time channel.

An exception to the rule that priority of a real time channel over a non-real time channel occurs when the mask bit for RMEM operation is clear and an RMEM operation (i.e. load or store operation) becomes pending. Under this exception, memory controller 104 allows an ongoing request to be interrupted in favor of the RMEM operation. If a second RMEM operation becomes pending prior to the completion of the first RMEM operation, the second RMEM operation is also allowed to proceed ahead of the interrupted request. Up to three such preemptive RMEM operations are allowed to proceed ahead of an interrupted request. Thereafter, memory controller 104 sets the mask bit for an RMEM operation, and the interrupted request is allowed to resume and proceed to completion.

IsWrite register 804 and isRead register 805 are registers provided to support store and load operations of internal registers (i.e. registers in RMEM 154) to and from external memory 103. During a load operation, CPU 150 writes over W bus 180a a request into channel 1 of channel memory 802. When memory controller 104 begins to service the requested load operation, memory controller 104 asserts the "req_W5_stall" signal to reserve five cycles ahead a slot for the use of W bus 180a. When the requested data is received from DRAM, the data is driven on to global bus 120. At the same time, channel memory 802 asserts the signal Rd_isR signal, which latches into isRead register 805 the data on global bus 120. In the following cycle, the content of the isRead register 805 is driven onto the W bus 180a and latched into the specified destination in RMEM 154 to complete the load operation.

In a store operation, data from RMEM 154 is driven onto W bus 180a, which is latched by IsWrite register 804. In the following cycle, CPU 150 writes a channel request into channel 1 in channel memory 802 over W bus 180a. Memory controller 104 asserts signal isW_Bsy to indicate valid data in isWrite register 804 and to prevent CPU 150 from overwriting isWrite register 804. When memory controller 104 is ready to service the store request, the isW_Bsy signal is deasserted and the content of isWrite register 804 is driven onto global bus 120 in the following cycle. The data is latched into output buffer 812 for storing into external memory 103 over memory data bus 105a.

Figure 9A:
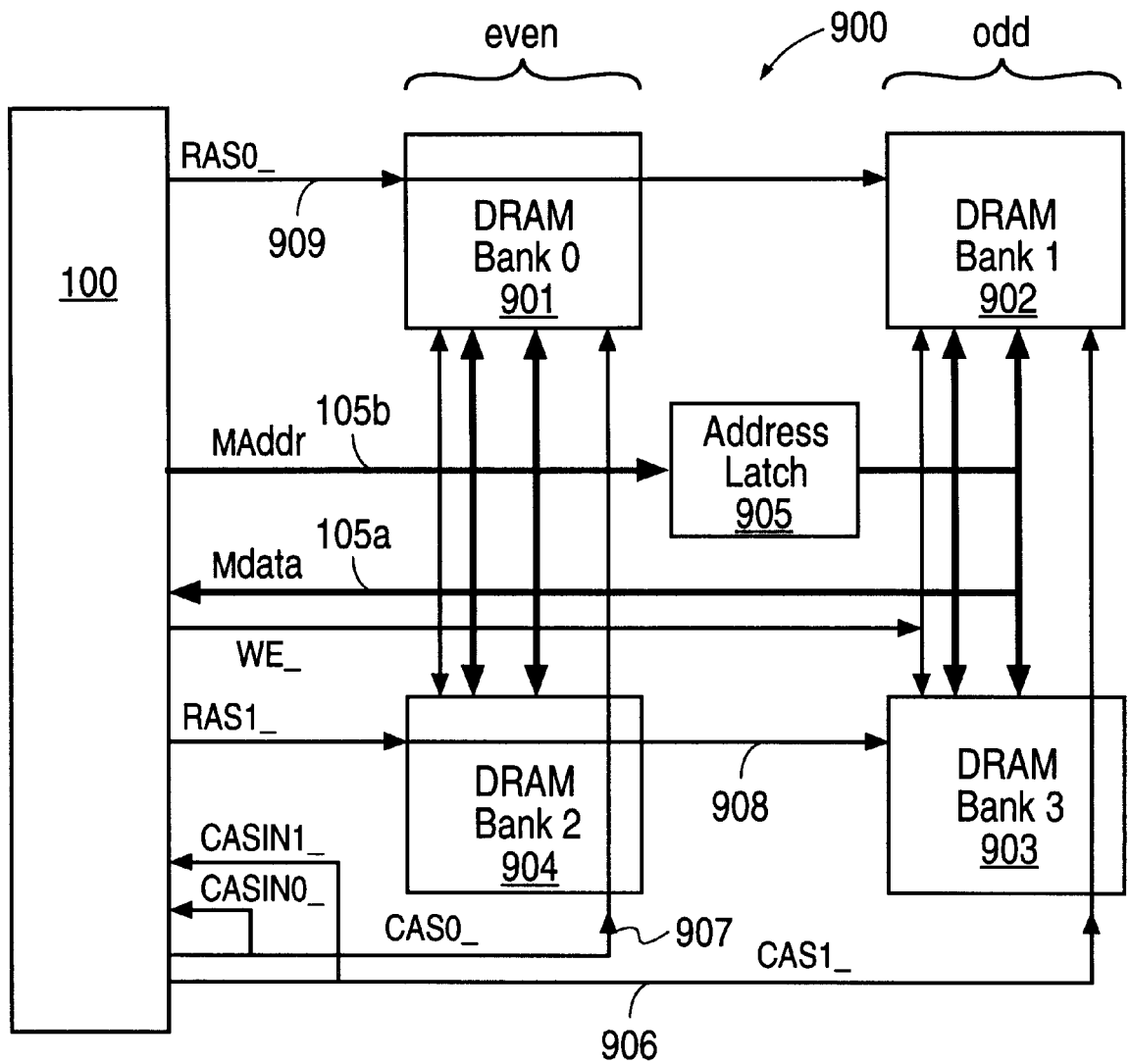
FIG. 9a shows chip 100 interfaced with an external 4-bank memory system 103 in a configuration 900.

The present embodiment supports up to a total of 8 megabytes of external DRAM. FIG. 9a shows a configuration 900 in which external memory 103 is a 4-bank memory interfaced to chip 100. To support this configuration, chip 100 provides two "row address strobe" (RAS) signals 908 and 909, and two column address strobe (CAS) signals 906 and 907. RAS signals 908 and 909, CAS signals 906 and 907 are also respectively known as RAS_1 and RAS_0, and CAS_1 and CAS_0 signals.

Memory bus 105 comprises a 32-bit data bus 105a and an 11-bit address bus 105b. To support scan-line mode accesses, discussed below, two output terminals are provided in chip 100 for word address bit 1 (i.e. byte address 3, or A3). Thus, address bus 105b is effectively 10-bit wide. As shown in FIG. 9a, four banks 901–904 of DRAM are configured such that bank 901 receives address strobe signals RAS0 and CAS0, bank 902 receives address strobe signals RAS_0 and CAS_1, bank 903 receives address strobe signals RAS_1 and CAS_1, bank 904 receives address strobe signals RAS_1 and CAS_0.

External memory 103 supports both interleaved and non-interleaved modes. In non-interleaved mode, only two banks of memory are accessed, using both RAS signals and one (CAS_0) CAS signal. Thus, in non-interleaved mode, banks 902 and 903 are not accessed. Under one mode of interleaved DRAM access, banks 0 and 2, both receiving the signal CAS_0, form an "even" memory bank, while banks 1 and 3, both receiving the signal CAS_1, form the "odd" memory bank. In the present embodiment, address bit 2, which is used to generate the signals CAS_0 and CAS_1, distinguishes between the odd and even banks.

Interleaved access to external memory 103 is desirable because of the efficiency inherent in overlapping memory cycles of the interleaved memory banks. However, the manner in which data is accessed determines whether such efficiency can be achieved. Generally speaking, with respect to the location of pixels on a video image, chip 100 fetches video data in two different orders: "scan-line" mode, or "reference mode". Under scan-line mode, the access pattern follows a line by line access of the pixels of a display. Under reference mode, pixels are accessed column by column. To support scan-line mode, each bank of memory is divided into two half-banks, each half-bank receiving independently the signal on one of chip 100's two terminals for word address bit 1. In scan-line mode, under certain conditions described below, these two terminals may carry different logic levels to result in a different word address being access in each half-bank.

Figure 9B:
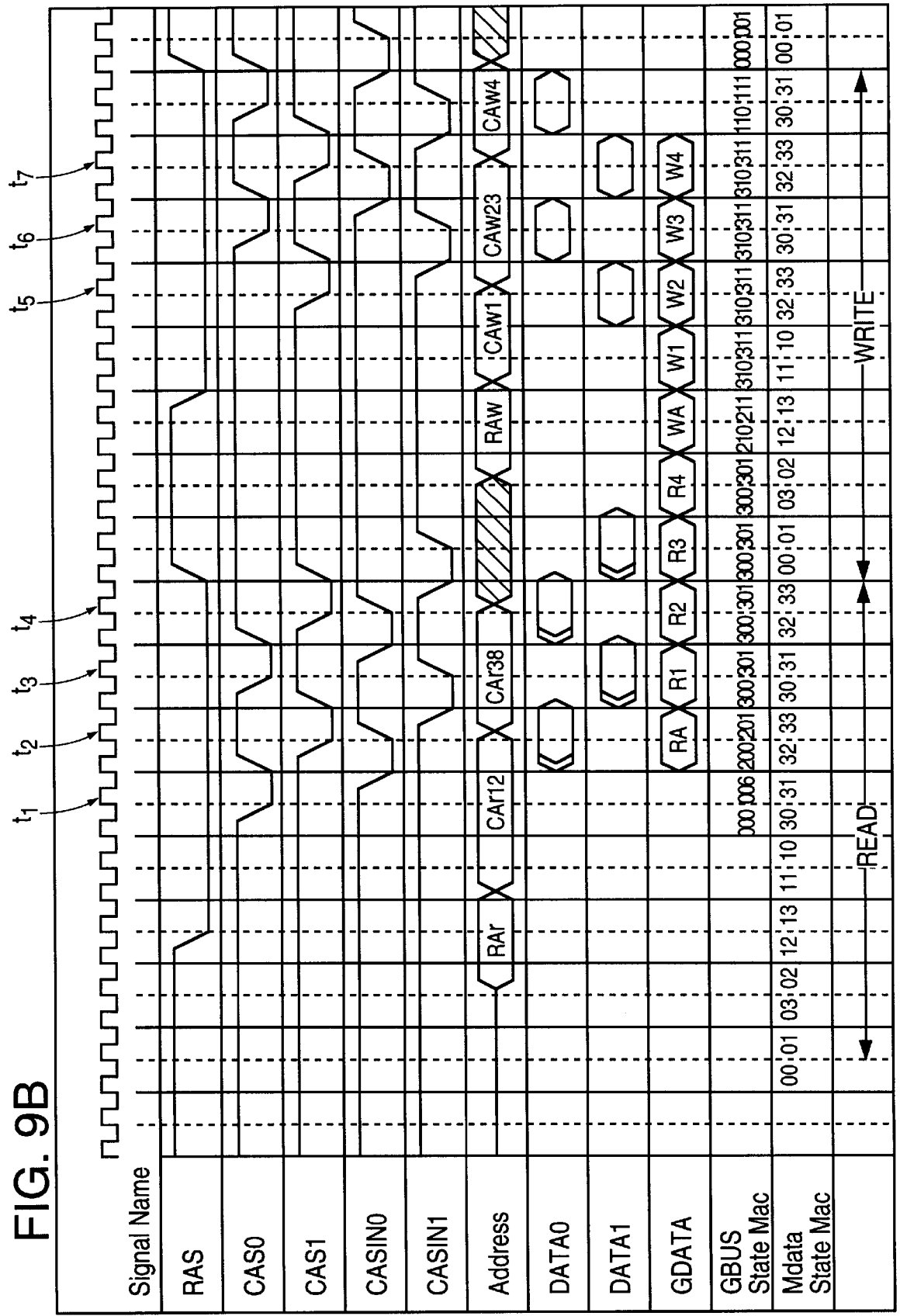
FIG. 9b is a timing diagram for an interleaved access under "reference" mode of the memory system of configuration 900.

FIG. 9b is a timing diagram showing interleaved accesses to data in the odd and even banks of FIG. 9a. In FIG. 9b, two page mode read operations and two page mode write operations are performed in each of the odd and even banks. The protocol shown in FIG. 9b is for reference mode access, and is not suitable for use under scan-line mode. This is because, under interleaved reference mode, the same column address is used to access both the even and odd banks. Consequently, as shown in FIG. 9a, chip 100 generates a single address, which is latched by address latch 905, for both the odd and even banks. However, under interleaved scan-line mode, separate column addresses are generated for the even and odd banks.

In configuration 900, signal CAS_1 turns off address latch 905 to keep the column address stable for the odd memory bank. In FIG. 9b, the bus name "Address" represents the signals on memory address bus 105b. The designation "RAr" "CAr12" and "CAr34" represents respectively (a) a row address, (b) a column address for data R1 and R2 and (c) a column address for data R3 and R4. The arrivals of the data signals at the even and odd banks are illustrated by the signals "DATA0" and "DATA1" respectively.

In the example illustrated by FIG. 9b, the same column address is used to access data words R1 and R2 and a different column address is used to access data words R3 and R4. Column address CAr12 is latched two cycles apart into the even and odd banks at times $t_1$ and $t_2$, respectively. Likewise, column address CAR34 is latched into even and odd memory banks at times $t_3$ and $t_4$ respectively. The address of the destination, and data words R1, R2, R3 and R4 are driven onto global bus 120 (the signals represented by "GDATA") at consecutive cycles in FIG. 9b.

FIG. 9b also shows an interleaved write access, using the same column address "CAw23" (i.e. the column address for data W2 and W3), which is latched at times $t_6$ nd $t_7$ (i.e. separated by two clock cycles), into the even and odd banks of configuration 900. Again, the protocol in FIG. 9b is used under reference mode, but is not suitable for scan-line mode access.

Figure 9C:
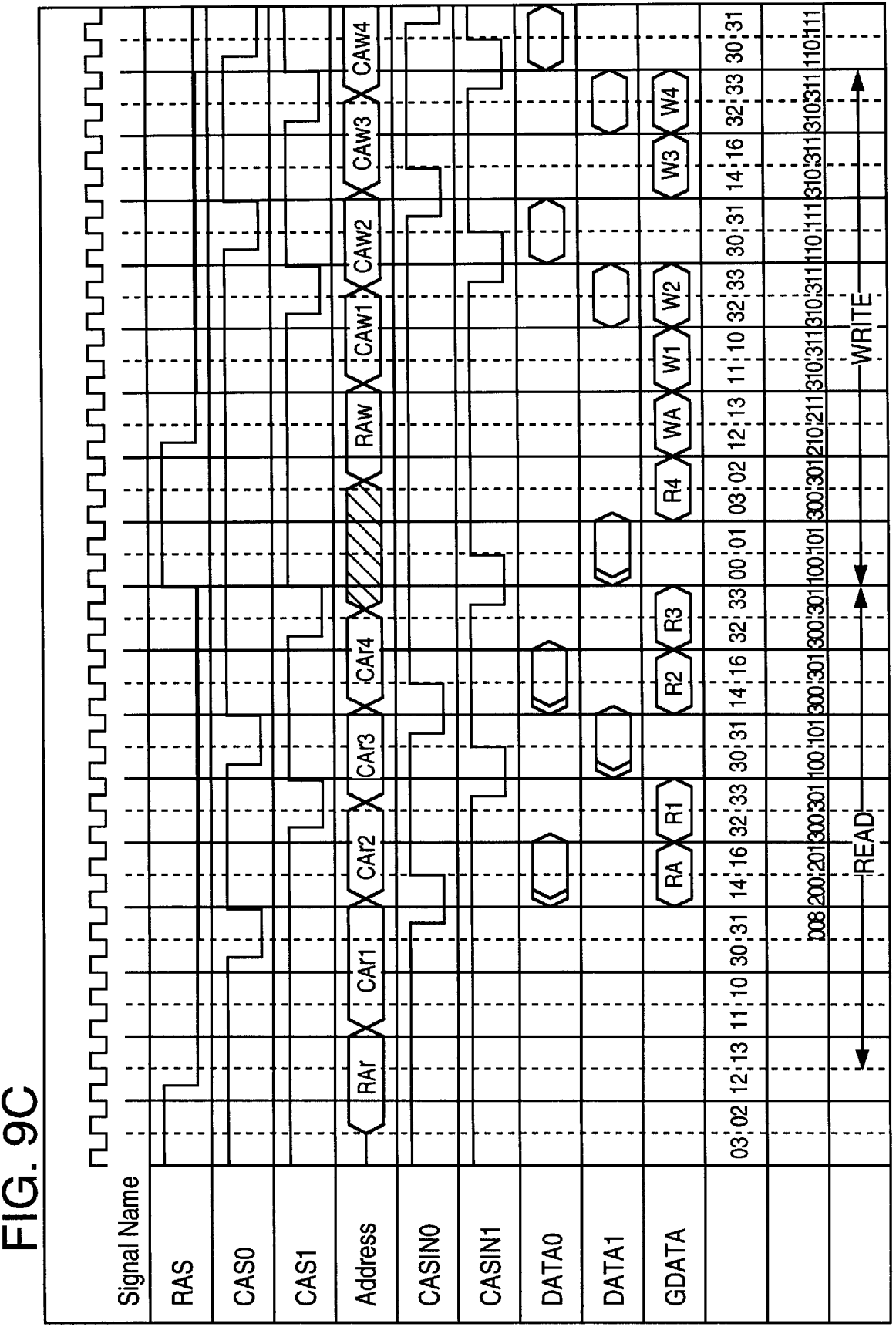
FIG. 9c is a timing diagram for an interleaved access under "scan-line" mode of the memory system of configuration 900.

FIG. 9c is a timing diagram showing interleaved access of the memory system in configuration 900 under scan-line mode, where the column address for consecutive data words are different. In FIG. 9c, the column addresses for data words R1–R4, represented by "CAr1", "CAr2", "CAr3" and "CAr4", are separately provided at least 4 clock cycles apart. Data words R1 and R3 are stored in the odd memory bank, and data words R2 and R4 are stored in the even memory bank. Both column address strobe signals CAS_0 and CAS_1 are asserted once every six clock cycles. The time period between assertions of the signals CAS_0 and CAS_1 is four clock cycles.

Figure 10A:
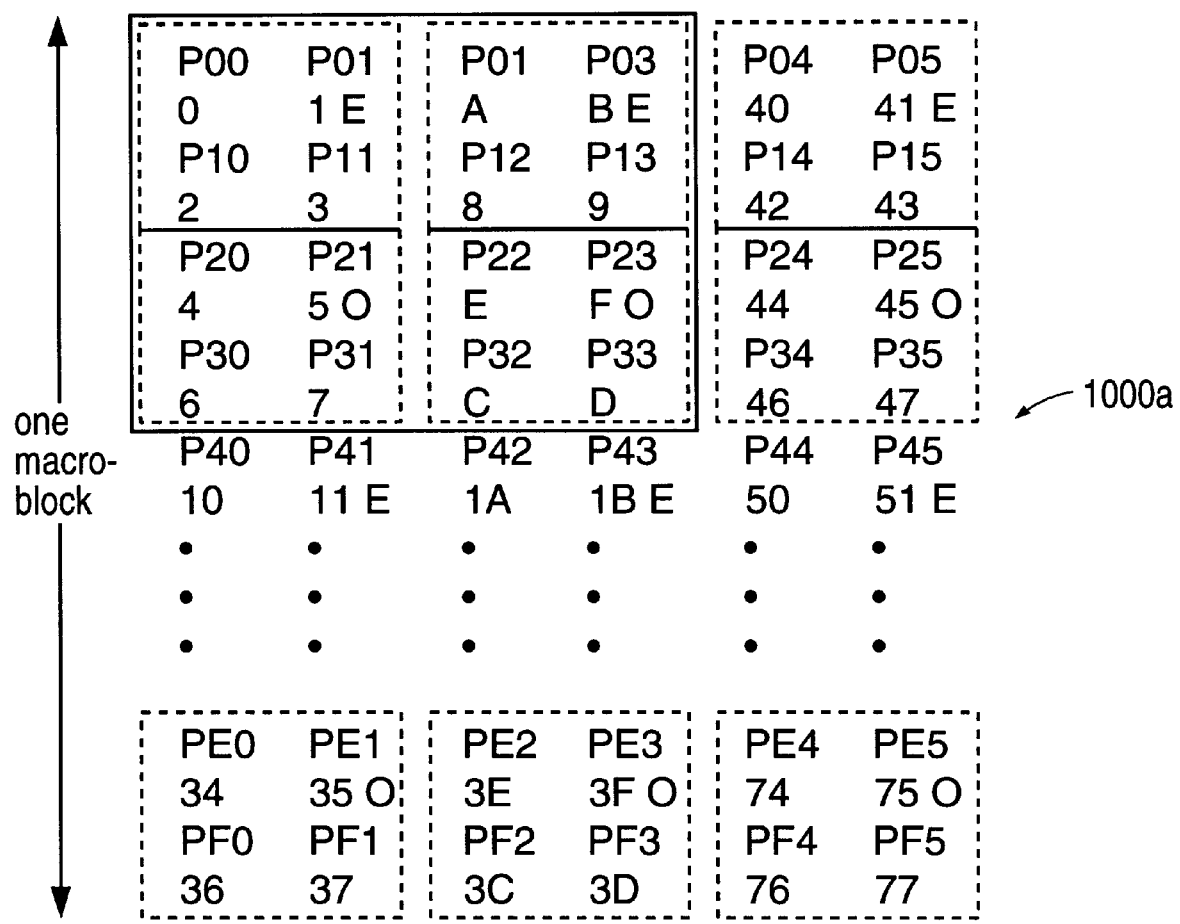

Memory controller 104 generates addresses for accesses to external memory 103. To efficiently support both the fetching of reference frames, during motion estimation, and the scan-line mode operation, during video data input and output, two pixel arrangements are used to stored video data in external memory 103. The first arrangement, which supports scan-line mode operation is shown in FIG. 10a. The second arrangement, which supports reference frame fetching during motion estimation, is shown in FIG. 10b.

FIG. 10a shows an arrangement 1000a which supports scan-line mode operation. In the present embodiment, each access to external memory 103 fetches a 32-bit word comprising four pixels. In external memory 103, a 32-bit data word is used to store four pixels arranged in a "quad pel", i.e. the four pixels are arranged in a 2×2 pixel configuration on the screen. Under scan-line mode, however, the pixels desired are four adjacent pixels on the same scan line. Thus, under scan-line mode, the four pixels fetched are taken from two data words in external memory 103. In FIG. 10a, the pixels, each represented by a symbol Pxy, are labelled according to the positions they appear on a display screen, i.e. 'Pxy' is the label given to the pixel at row x and column y. Under the label Pxy of each pixel is a hexadecimal number which represents the byte address (offset from a base address) of the pixel as it is stored in external memory 103. For example, the quad pel comprising pixels P00, P01, P10, and P11 is stored at word address 0 (hexadecimal), which includes the byte addresses 0–3. As a matter of convention, in the following detailed description, the term "quad pel Pxy" is understood to mean the quad pel in which the upper left pixel is labelled Pxy.

FIG. 10a also illustrates a collective term for a number of pixels called a "tile". A "tile" comprises four quad pels arranged in a 2×2 configuration. For example, the square area defined by quad pels P00, P02, P20 and P22 is a tile. As a matter of convention, in the following detailed description, the term "tile Pxy" is understood to mean the tile in which the quad pel at its upper left hand corner is quad pel Pxy. As mentioned above, under scan-line mode access, four horizontally adjacent pixels are accessed at a time. Again, as a matter of convention, in the following discussion, the term "scan line Pxy" is understood to mean the group of four horizontally adjacent pixels which left most pixel is Pxy.

In arrangement 1000a, each tile is stored in four consecutive words of external memory 103. For example, tile P00 are stored in consecutive memory words which addresses 0, 4, 8 and C (big Endian format). In addition, within each word is stored a quad pel. In the present embodiment, the odd memory bank has addresses which bit 2 has bit value '1' and the even memory bank has addresses which bit 2 has bit value '0'. Thus, for example, both quad pels P00 and P02 are stored in the even bank, and quad pels P20 and P22 are stored in the odd bank.

In arrangement 1000a, the order in which the upper and the lower halves of a quad pel is stored is determined by bit 3 of the memory address. By convention, the upper half of a quad pel refers to the two pixels of the quad pel occupying the "higher" screen positions. For example, since bit 3 of the word address (=0) of quad pel P00 has bit value '0', the upper halfword stores the lower half of quad pel P00 (i.e. pixels P10 and P11), and the lower halfword stores the upper half of quad pel P00 (i.e. pixels P00 and P01). As used here, the upper halfword refers to the half of the data word having the greater byte addresses. However, since bit 3 of the byte address (=8) of quad pel P02 has the bit value '1', the upper halfword (i.e. addresses A and B) stores the upper half of the quad pel P02 (i.e. pixels P02 and P03), while the lower half of quad pel P02 (i.e. P12 and P13) is stored in the lower halfword (addresses 8 and 9). As explained below, this alternative pattern of swapping the upper and lower halves of the quad pel every other memory word supports the scan-line access mode.

In addition, to support scan-line mode, the upper and lower halves of the memory word are independently addressed. Specifically, under scan-line mode, bit 3 in the column address provided to access each half of the memory word is different. This is accomplished by providing a different value on two word address bit 1 output terminals (i.e. A3) of chip 100. For example, when fetching the scan line P00, the upper halfword retrieves from address 8 (i.e. bit 3 of byte address 0 toggled) pixels P02 and P03, and the lower halfword retrieves from word address 0 pixels P00 and P01. In arrangement 1000a, both halfwords in each 4-pixel scan line fetch are retrieved from the same even or odd memory bank.

Memory controller 104 provides the address translation necessary to translate the address from CPU 150 ("logical address" or "LA") to the address actually provided to each halfword in each memory bank ("physical address" or "PA"). Since byte address bits PA[1:0] are not involved in addressing in external memory 103, which receives only word addresses, mapping between logical addresses and physical addresses in these bits are provided by byte swapping in memory controller 104.

Specifically, under arrangement 1000a, when a quad pel is fetched for a non-scan line access, only one address bit is translated to ensure the upper and lower halves of the quad pel are swapped when the logical byte address bit LA[3] is '1'. The mapping memory controller 104 generates maps the logical address to the the physical address according to the following equations:

$$PA[0] = LA[0]$$
$$PA[1] = LA[1] \veebar LA[3]$$
$$PA[9:2] = LA[9:2]$$

where PA[1] is bit 1 of the physical byte address, and LA[3] and LA[1] are the bits 3 and 1of the logical byte address. The $\veebar$ operator is the "exclusive-OR" operator. In this instance, the physcical address provided to both halfwords of the memory bank addressed are the same.

The logical addresses of the pixels under scan-line mode are shown in FIG. 10c. The logic circuit in memory controller 104 generates the physical address according to the following equations:

Thus, under scan-line mode, memory controller 104 (a) accesses (i) in an even scan line (i.e. scan line Pny, where n is even), the left half of the scan line in the $PA[0] = LA[0]$ $PA[1] = LA[2] \vee LA[1]$ $PA[2] = LA[3]$ $PA[3] = LA[1]$ $PA[9:4] = LA[9:4]$ lower halfword, and the right half of the scan line in an upper halfword; (ii) in an odd scan line (i.e. scan line Pny, where n is odd), the left half of the scan line in the upper halfword and the right half of the scan line in the lower halfword; (b) switches, every two scan lines, between accessing the odd memory bank to accessing the even memory bank; (c) accesses, for the right half of a scan line, a halfword which physical byte address is offset by 8 from the physical byte address of the halfword containing the left half of the scan line (i.e. different values for the two address bits A3 of chip 100).

Figure 10D:
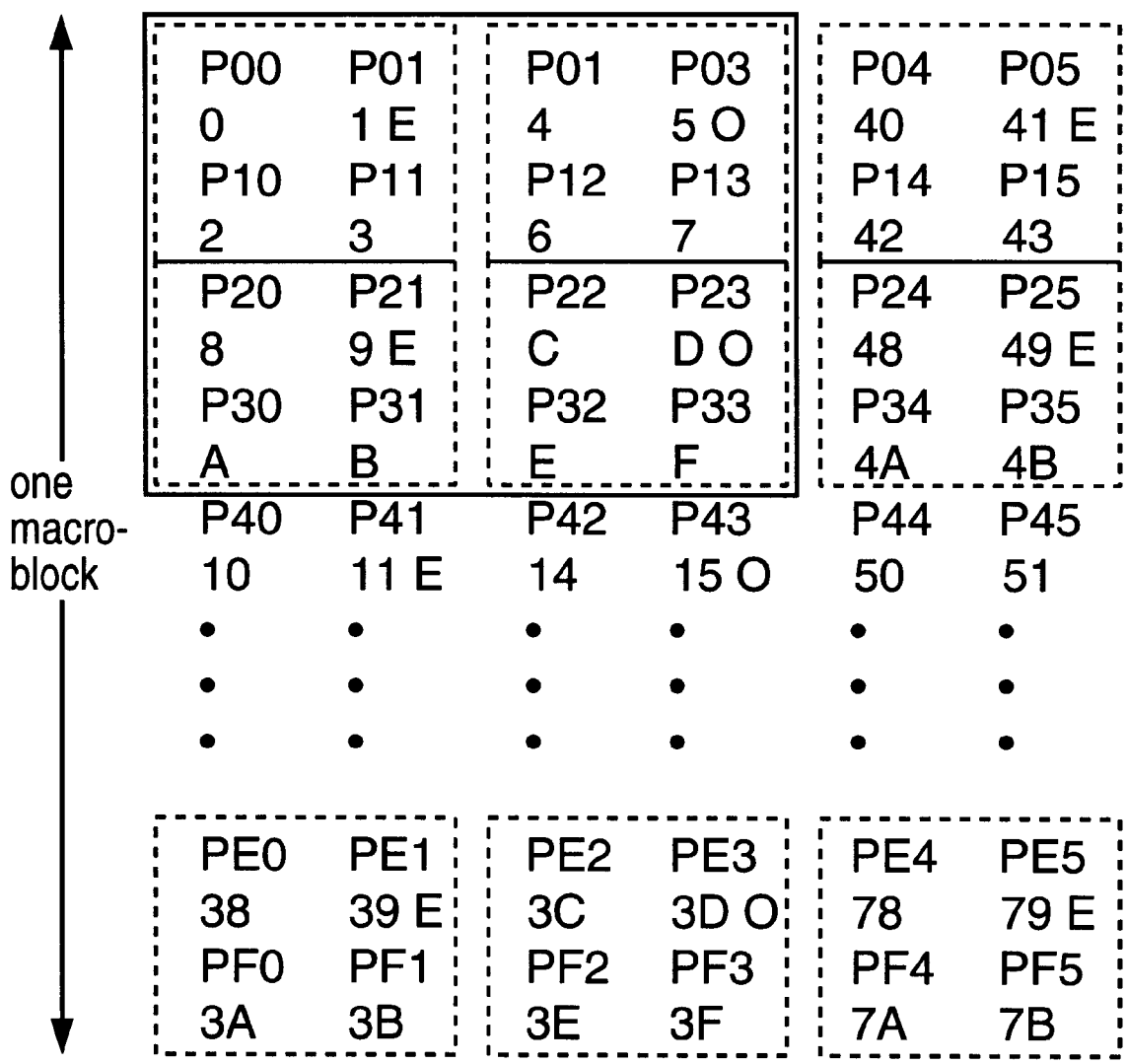
FIG. 10d shows the logical addresses for reference frame fetching.

Arrangement 1000b shown in FIG. 10b supports reference fetch accesses. The logical addresses for a reference frame are shown in FIG. 10d. Under this arrangement, a tile is fetched by fetching the four quad pels in the order of top-left, top-right, bottom-left and bottom-right. In fetching a reference macroblock, tiles are fetched column by column and, within a column, from top to bottom. For example, in FIG. 10b, tile P00 is fetched in the order of quad pels P00, P02, P20 and P22. The reference frame is fetched by fetching tiles P00, P40, P80, PC0, P04, P44, P84, PC4 . . . etc. To take advantage of the efficiencies of memory interleaving and page mode accesses, arrangement 1000b is arranged such that the top-left quad pel and the bottom-left quad pel are located in the even memory bank, and the top-right and bottom-right quad pels are located in the odd memory bank.

To minimize delay due to page crossings during a reference frame fetch, memory controller fetches all the tiles of the reference frame in the upper DRAM page before fetching the tiles in the lower DRAM page. FIG. 10e illustrates a reference frame fetch which crosses a memory page boundary.

FIG. 10e shows four tiles 1050a–1050d of a reference frame. In each quad pel of each tile, the hexadecimal numbers at the four corners of the quad pel are physical byte addresses at which the four pixels of the quad pel are stored. For example, the four pixels of quad pel 1 of tile 1050d are stored at physical byte addresses 7E, 7F, 7C and 7D. In FIG. 10e, the DRAM page boundary is between the upper half-tile and the lower half-tile in each of the tiles 1050c and 1050d shown in FIG. 10e. If a reference fetch starts at address 28, the page boundary is encountered after fetching the quad pel 1 of tile 1050c, which is located at physical byte address 3C. At that point, detecting the page boundary, memory controller 104 generates address 68 rather than x0 to fetch the remaining quad pels of the tiles in the upper DRAM page, rather than crossing over to the lower DRAM page. According to arrangement 1000b of FIG. 10b, in a reference frame access, address 68 is in the same memory bank as address 38 and in the opposite memory bank of address 3C. Consequently, in making the jump from address 3C to address 68, interleaved access is not interrupted.

Figure 11A:
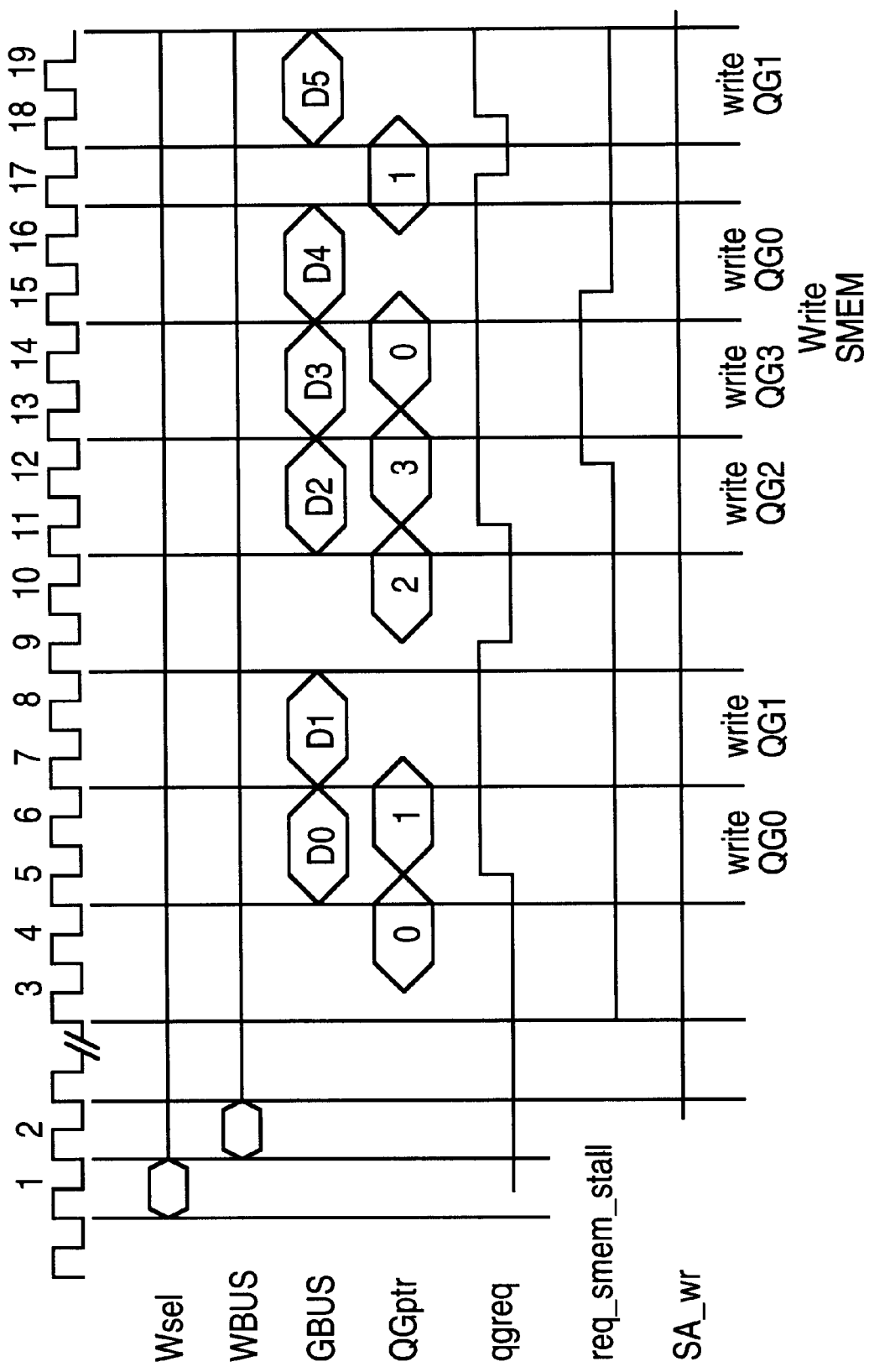
FIGS. 11a and 11b are timing diagrams showing respectively data transfers between external memory 103 and SMEM 159 via QG register 810.
Figure 11B:
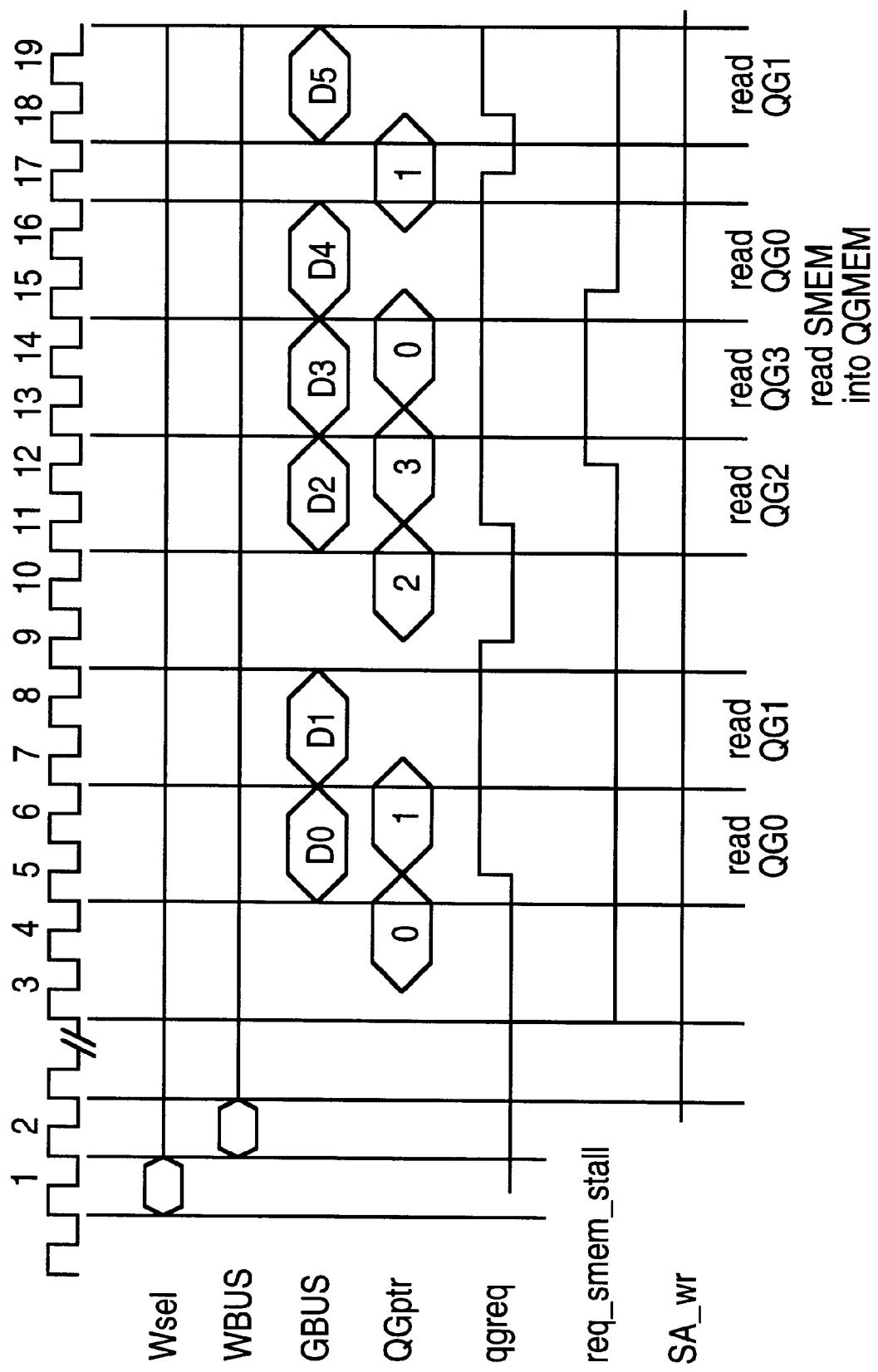

As mentioned above, data transfers between SMEM 159 and external memory 103 take place through QGMEM 810 and global bus 120. FIGS. 11a and 11b are timing diagrams showing respectively the data transfers from external memory 103 to SMEM 159, and from SMEM 159 to external memory 103. As mentioned above, the data bus portion of global bus 120 is 32-bit, and the interface between QGMEM 810 and SMEM 159 is 128-bit. A 2-bit signal bus Qptr is provided to indicate which of the four 32-bit words ("QG registers") in QGMEM 810 is the source or destination of the 32-bit data on global bus 120. A 1-bit signal "req_smem_stall" indicates two cycles ahead an impending access by QGMEM 810 to SMEM 159, to prevent CPU 150 from accessing SMEM 159 while the QGMEM access is performed.

As shown in FIG. 11a, at cycles 1 and 2, a request for DMA data transfer is written into channel memory entry 6 to signal a data transfer from external memory 103 to the SMEM 159. As each 32-bit word is received on memory data bus 105a, memory controller 104 drives the data word onto global bus 120. For example, datum D0 is driven onto global bus 120 during cycles 5 and 6. In this example, the first 32-bit datum is scheduled to be written to the first of four QG registers of QGMEM 810. The destination in QGMEM 810 for datum D0 is indicated in cycles 3 and 4 in the 2-bit Qptr signal bus. The asserted "qgreq" signal enables data on global bus 120 to be written into QGMEM 810. Thus, datum D0 is written into QGMEM 810 during cycles 5 and 6. Datum D1 is likewise written into QG register 810 during cycles 7 and 8. A transfer between QGMEM 810 and SMEM 159 is signalled two cycles ahead by asserting "q_smem_stall", which is usually asserted in an external memory to SREM 159 transfer when QGMEM 810 holds three valid data not already written into SMEM 159, and the fourth datum is currently on global bus 120, e.g. in cycle 14. During cycle 15, all four QG registers of QGMEM 810 are written into SMEM 159.

FIG. 11b shows a transfer between SMEM 159 to external memory 103. During cycles 1 and 2, a transfer request is written into channel memory entry 6 to signal a block memory transfer from SMEM 159 to external memory 103. In this example, the four QG registers of QGMEM 810 have been previously loaded from SMEM 159. The 2-bit QGptr signal selects which of the four QG registers of QGMEM 810 is active. While qgreq is asserted, the data in the 32-bit register of QGMEM 810 corresponding to the value of QGptr are driven onto global bus 120. In this example, data D0 and D1 are driven onto global bus 120 during cycles 5, 6, 7 and 8. A data transfer between QGMEM 810 and SMEM 159 is signalled three cycles ahead by asserting the signal "q_smem_stall", which is usually asserted in an SREM 159 to external memory transfer when QGMEM 810 holds only one datum not already written onto global bus 120, and one datum is currently on global bus 120, e.g. in cycle 11. During cycle 15, the four QG registers of QGMEM 810 are loaded with a 32-bit portion from a 144-bit word of SMEM 159.

To support reference fetch, the 2-bit Qptr signal bus does not always cycle through 0–3 to access all four 32-bit registers of QGMEM 810. Each of the four 32-bit registers of QGMEM 810 provides a "dirty bit" to indicate whether the 32-bit word is valid data. One example in which not all QG registers of QGMEM 810 contain valid data is found in a reference fetch where a page boundary is encountered. Under such condition, as mentioned above, the quad pels in the current page of memory is fetched prior any quad pel in a different page of memory is accessed. For example, referring to FIG. 10e, instead of fetching the quad pel at addresses x0–x3 after the quad pel at addresses 3C to 3F are fetched, memory controller 140 next fetches the quad pel at 68 to 6B. In QGMEM 810, the dirty bits associated with the lower two 32-bit words (i.e. the QG registers containing the values of memory words at addresses 38-3B and 3C–3F) are set. When data words at addresses x0–x3 and x4–x7 are fetched, the dirty bits for the remaining two 32-bit words of QG register 810 are set.

CPU 150

Figure 12:
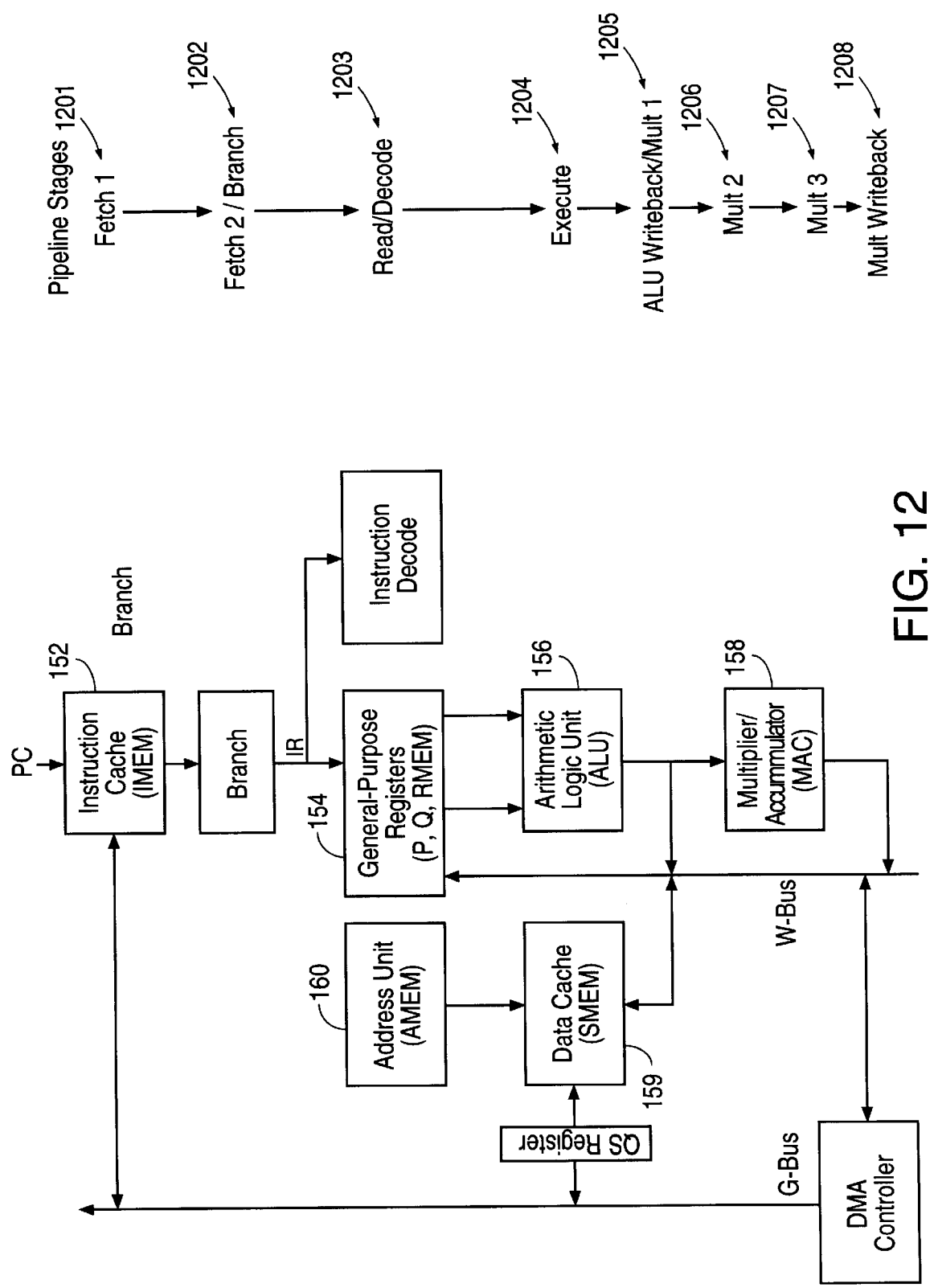
FIG. 12 illustrates the pipeline stages of CPU 150.

As mentioned above, CPU 150 includes instruction memory 152, RMEM 154, byte multiplexor 155, ALU 156, MAC 158, and SMEM 159, which includes AMEM 160. CPU 150 is a pipelined processor. FIG. 12 illustrates the pipeline stages of CPU 150. As shown in FIG. 12, an instruction is fetched during stage 1201 from instruction cache 152. The instruction fetch during stage 1201 is completed during stage 1202. Further, during stage 1202, the instruction decode logic determines if a branch instruction is included as a minor instruction. If a branch instruction is included as a minor instruction, evaluation of the branch instruction is performed. During stage 1203, depending on the nature of the instruction, instruction decode, operand fetch from RMEM 154 and address generation for SMEM 159 can occur.

The decoded instruction to ALU 156 is executed during stage 1204, and the results written into RMEM 154 or PMEM 702 during stage 1205, unless the instruction requires use of multiplier 158. Multiplier 158 is a four-stage pipeline multiplier. A multiply instruction, such as required in DCT or IDCT operations, is performed in MAC 158 in 4 pipelined stages 1204–1207. The result of a multiplication in MAC 158 is written back at stage 1208.

During stage 1204, if the instruction requires data transfer between SMEM 159 and global bus 120, or requires data transfer between SMEM 159 and processor bus 180a, such data transfer is initiated during stage 1204. Data transfer between processor bus 180a and SMEM 159 are completed during stage 1205.

ALU 156 performs 32-bit, 18-bit and 9-bit arithmetic operations and 32-bit logic operations. Since the data path of ALU 156 is 36-bit wide, each 36-bit datum comprises either four 9-bit bytes, two 18-bit halfwords or a 36-bit word (including four guard bits, as explained above). A 36-bit word in CPU 150 can represent the following "extended precision" bytes or halfwords:

Byte[0]=x[35,31:24];
Byte[1]=x[34,23:16];
Byte[2]=x[33,15:8];
Byte[3]=x[32,7:0];
halfword[0]=x[35:34,31:16];
halfword[1]=x[33:32,15:0].

Since external memory 103 is 32-bit wide, load and stores from external memory 103 yields only 32-bit words, 16-bit halfwords and 8-bit bytes.

Each instruction of CPU 150 can contain, in addition to a major instruction, a minor instruction and a condition test. Operands of a major instruction can be specified by a 5-bit immediate value in the instruction, a 14-bit immediate value in the instruction, or references to registers in RMEM 154. A minor instruction can be (a) a load or store instruction to SMEM 159, (b) increments or decrement instruction to AMEM 706, (c) a major instruction modifier (also known as a "post-ALU" instruction), e.g. the "divide-by-two" d2s instruction for dividing the result of an ALU operation by 2, or (d) a branch instruction. A condition test can be specified, if the major instruction's destination register is R0, or the destination register matches the second source register.

In this embodiment, a branch immediate instruction specifies a 9-bit jump target, which includes a 1-bit page change flag. The 1-bit page change flag indicates whether or not the jump is within the same bank of instruction memory 152. In this embodiment, IMEM 152 has four 256-word pages. A branch immediate instruction, other than a branch instruction in page 0, can have a jump target within its own page, or in page zero. However, a branch immediate instruction in page 0 can have a jump target within page 0 and page 1. Jump targets outside of the designated pages can be accomplished by an indirect branch instruction.

FIG. 15a is a block diagram of arithmetic unit 750, including the three M-, W- and Z-bypass mechanisms 1402, 1401 and 1402. These bypass mechanisms allow the results of a previous instructions to be made available to a subsequent instruction without first being written back into the register files. As shown in FIG. 15a, multiplexors 1543 and 1544 each select one of four data sources into the X and Y input terminals of ALU 156. The four data sources are the output data on the M-, W-, and Z-bypasses and the output of byte multiplexors 1541 and 1542. Multiplexor 1543 receives from byte multiplexor 1541 a 36-bit word comprising four 9-bit bytes designated receives from byte multiplexor 1542 a 36-bit word comprising four 9-bit bytes B0, B1, B2 and B4. ALU 156 is an arithmetic logic unit capable of addition, subtraction and logical operations. The output data of ALU 156 can be provided to circuit 1410 for post-ALU operations. The output data from post-ALU operation circuit 1410 can be provided to MAC 158 for further computation involving a multiplication.

Figure 14A:
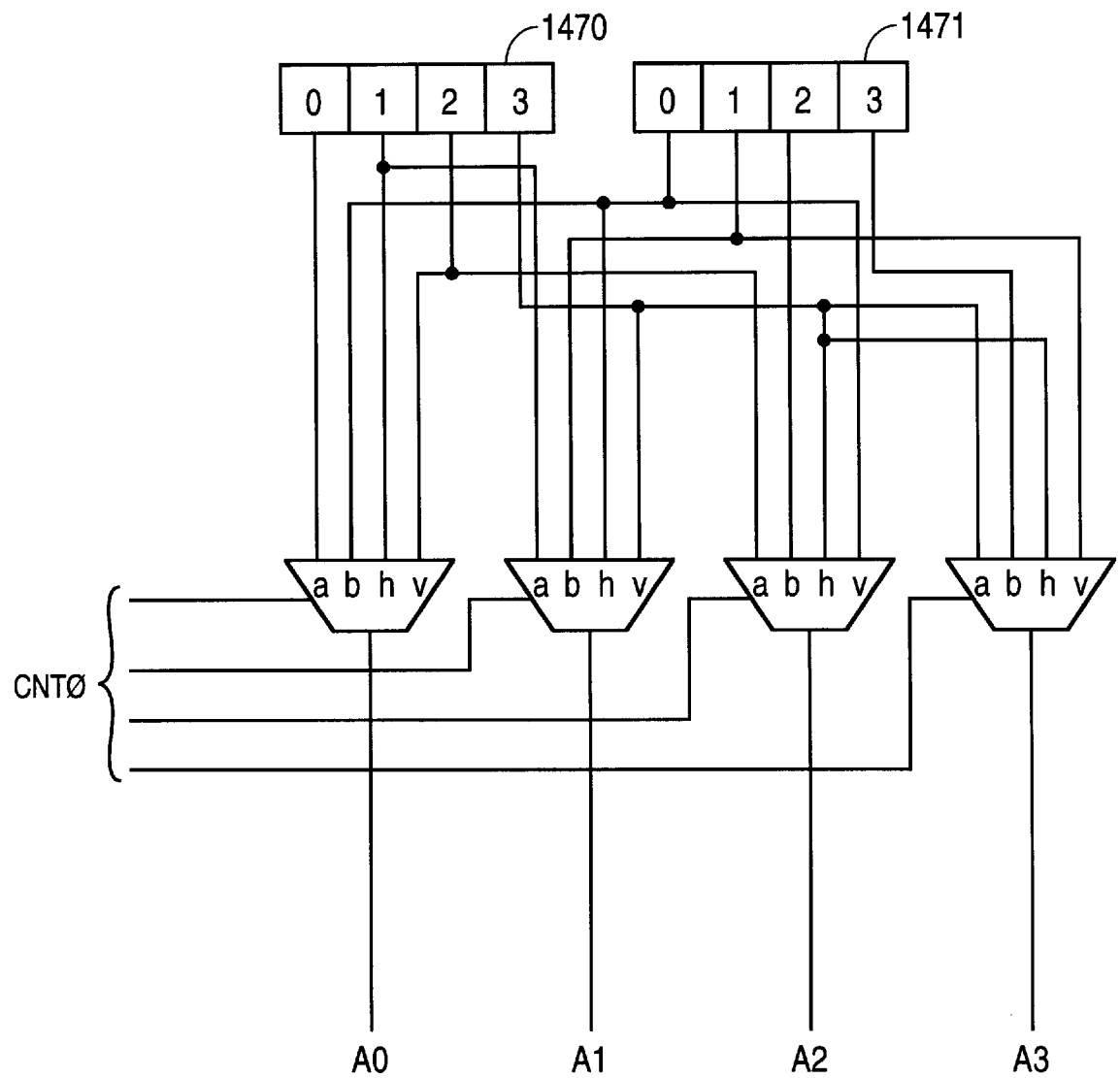
FIGS. 14a and 14b show schematically the byte multiplexors 1451 and 1452 of ALU 156.
Figure 14B:
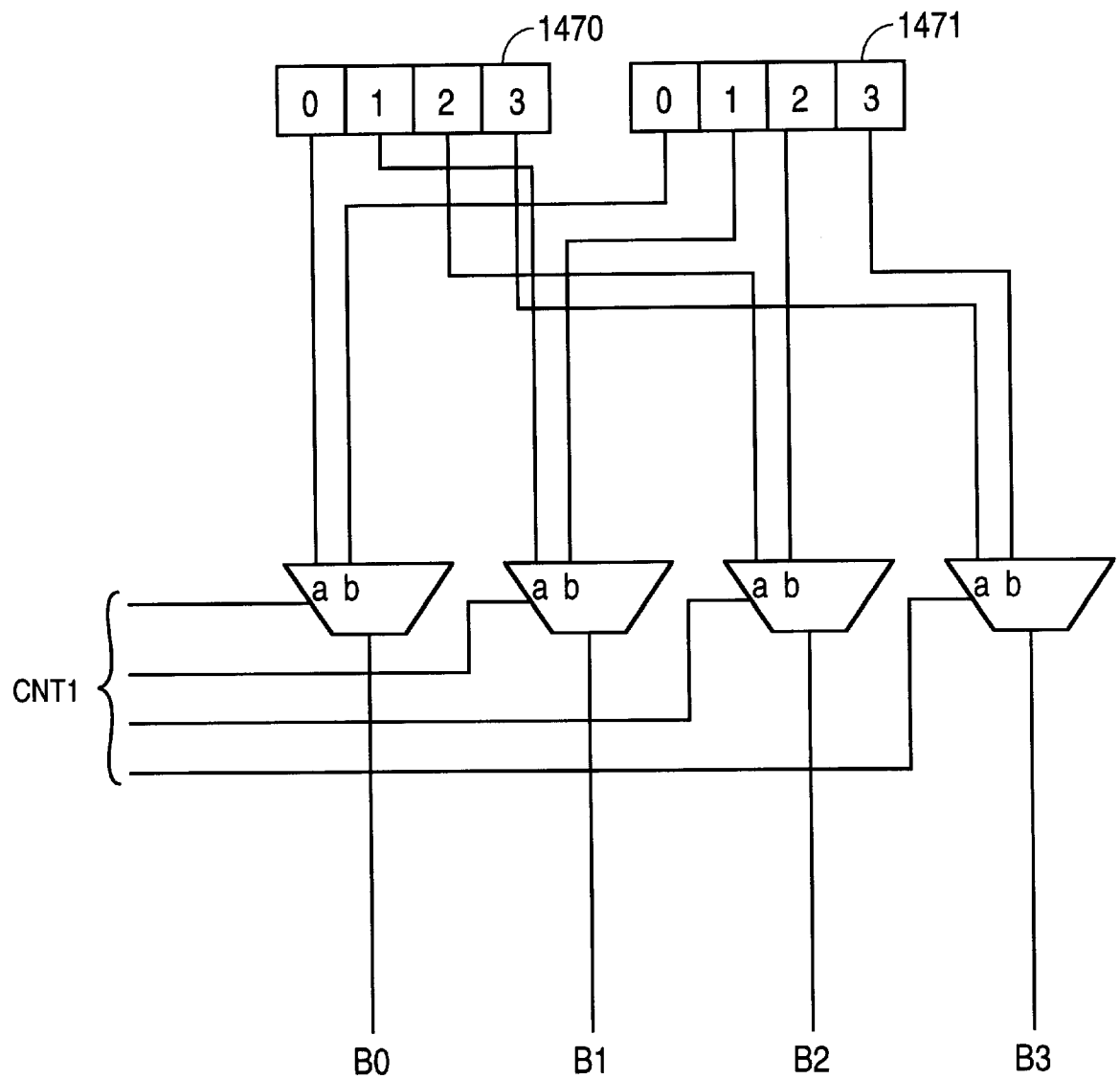

FIG. 14a and 14b shows schematically the byte multiplexors 1541 and 1542 which multiplex source operends each fetched from QMEM 701 or RMEM 154. In FIGS. 14a and 14b, registers 1470 and 1471 reprsent two 36-bit source arguments each from RMEM 154 or QMEM 701 specified as source registers of an ALU instruction. The designations '0', '1', '2' and '3' shown in FIGS. 14a and 14b in each of registers 1470 and 1471 represent respectively the 9-bit bytes 0–3. In the applications of interest, bytes 0–3 represent, respectively, the upper-left, the upper-right, the lower-left and the lowr-right pixels of a quad pel. Each byte multiplexor 1451 and 1452 provide a 36-bit datum output, which includes four 9-bit bytes extracted from the the two 36-bit input data to the byte multiplexor. FIG. 14a shows the four output bytes A0, A1, A2 and A3 of byte multiplexor 1451, and FIG. 14b shows the four output bytes B0, B1, B2 and B3 of byte multiplexor 1452.

In byte multipexer 1452, each output byte is selected from one of the corresponding bytes of the source registers or zero. That is, for byte Bi, byte multiplexer 1452 selects either byte i of register 1470 or byte i of register 1471 or zero. In byte multiplexer 1451, in addition to selecting corresponding bytes from registers 1470 and 1471, each output byte can be selected from two additional configurations, designated "h" and "v" in FIG. 14a. Configuration "h" is designed, when registers 1470 and 1471 contain horizontally adjacent quad pels, to extract the quad pel formed by the right half of the quad pel in register 1470 and the left half of the quad pel in register 1471. Similarly, configuration "v" is designed, when two vertically adjacent quad pels are contained in registers 1470 and 1471, to extract the lower half of the quad pel in register 1470 and the upper half of the quad pel in register 1471. Such byte swapping allows various operations on quad pels to be performed efficiently. In the present embodiment, the following major instructions uses the byte multiplexors 1541 and 1542 to rearrange operands for ALU 156:

DMULH—performs a dequantization multiplication (halfword multiplies) after unpacking the higher order two bytes of each source operand into two halfwords. (major instruction)

DMULL—performs a dequantization multiplication (halfword multiplies) after unpacking the lower order two bytes of each source operand into two halfwords.

HOFF, VOFF—extracts a shifted quad pel from two horizontally or vertically adjacent quad pels; four shift positions: 0, 0.5, 1.0 and 1.5 are available.

HSHRINK, VSHRINK—performs horizontal and vertical 2:1 decimation of quad pel (i.e. half resolution), using adjacent quad pels.

PACK—packs the four halfwords of two 36-bit words into the four bytes of a 36-bit word.

STAT1, STAT2—activity statistics instructions (see below)

Further, minor instructions OFFX, OFFY, SHX, SHY, and STAT each set the byte multiplexors 1541 and 1542 to the configuration used by the HOFF, VOFF, HSHRINK, VSHRINK, and STAT1 or STAT2 instructions respectively. In addition, two minor instructions UNPACKH and UNPACKL each set the byte multiplexors for unpacking bytes into halfwords used by the DMULH and DMULL instructions.

Figures 1, 15D:
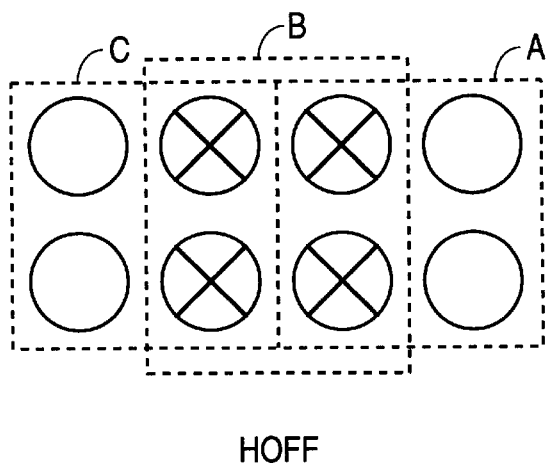
Figures 2, 15D:
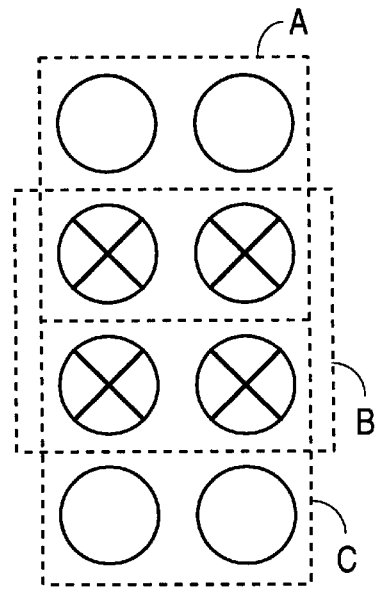
Figures 3, 15D:
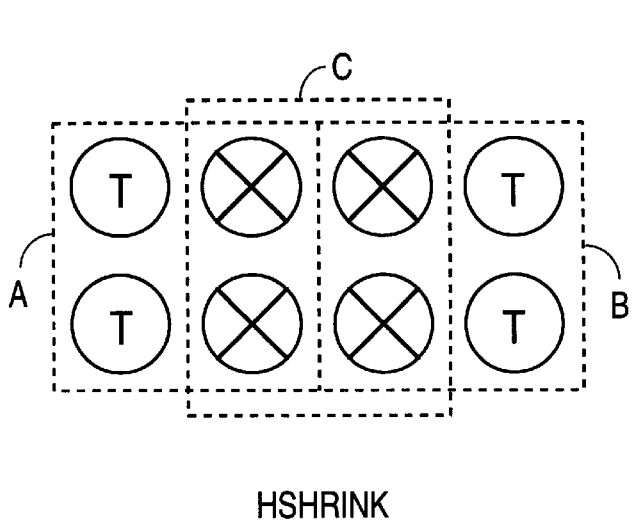
Figures 4, 15D:
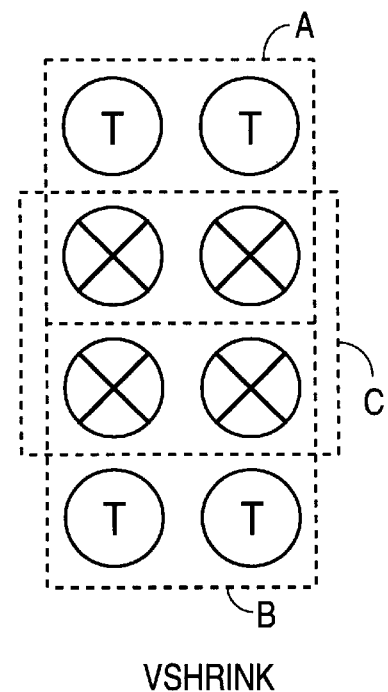

FIG. 15*d*(i) illustrates the operations of the byte multiplexors 1541 and 1542, using one mode of the HOFF instruction. In FIG. 15*d*(i), the input adjacent quad pels A and C are represented by circles. The quad pels A and C are fetched and presented to the byte multiplexors 1541 and 1542. Under this mode of instruction HOFF, all four byte positions of multiplexer 1541 are set to the "h" configuration, and multiplexor 1543 selects the output data of multiplexer 1541 for the X operand input terminals of ALU 156. From the above discussion, it is known that quad pel B is obtained by byte multiplexors 1541 selecting left and right halves of the input quad pels A and C, respectively. The filtered output for this mode of the HOFF instruction is obtained by summing quad pel A with quad pel B. Thus, byte multiplexor 1541 provides at the X operand input terminals of ALU 156 quad pel B, which is given by:

B[byte0]=A[byte1]
B[byte1]=C[byte0]
B[byte2]=A[byte3]
B[byte3]=C[byte2].

For the Y operand input terminals of ALU 156, all four byte positions of byte multiplexor 1542 are set to select quad pel A. The result of ALU 156 is a quad pel Z, given by summing quad pels A and B in four 9-bit additions:

Z[byte0]=A[byte0]+B[byte0];
Z[byte1]=A[byte1]+B[byte1];
Z[byte2]=A[byte2]+B[byte2];
Z[byte3]=A[byte3]+B[byte3];

After modification using a divide by two post-ALU operation, quad pel Z represents a quad pel located 1.5 pixels to the right of the input pixel C. Other modes of the HOFF instruction can be specified by setting two bits in ALU 156's configuration registers. The other modes of the HOFF instruction allow extraction quad pels located 0, 0.5, and 1.0 pixel positions from input pixel C, by providing, respectively, (i) quad pel C to the X input terminals of ALU 156 and four zero bytes in the Y input terminals of ALU 156; (ii) quad pel B (configuration "h") at the X input terminals of ALU 156, and quad pel C at the Y input terminals of ALU 156; and (iii) quad pel B (configuration "h") at the X input terminals of ALU 156, and four zero bytes at the Y input terminals of ALU 156.

An analogous example is illustrated in FIG. 15*d*(ii) by the VOFF instruction. Under the VOFF instruction, the filtered quad pel Z is the sum of quad pels A and B, quad pel B being derived from input quad pel A and C using the byte multiplexor 1541 in the "v" configuration for all byte positions. In this instance, quad pel Z represents a quad pel located 1.5 pixels above quad pel C.

Applications for byte multiplexors 1541 and 1542 of ALU 156 are further illustrated in FIGS. 15*d*(iii) and 15*d*(iv) by one mode in each of the HSHRINK and VSHRINK instructions, respectively. As shown in the specified mode of the HSHRINK instruction of FIG. 15*d*(iii), the HSHRINK instruction provides decimation in the horizontal direction by averaging horizontally adjacent pixels of the input quad pels A and B. Similarly, as shown in the specified mode of the VSHRINK instruction shown in FIG. 15*d*(iv), the VSHRINK instruction provides decimation in the vertical direction by averaging vertically adjacent pixels of the input quad pels A and B. To achieve HSHRINK function in one instruction cycle, the quad pels A and B are presented to byte multiplexors 1541 and 1542. All four byte positions of byte multiplexor 1541 are set to the "h" configuration and multiplexor 1543 selects the output datum (i.e. quad pel "C") of byte multiplexor 1541 as X input operand to ALU 156. Quad pel C is derived from quad pels A and B according to:

C[byte 0]=A[byte 1]
C[byte 1]=B[byte 0]
C[byte 2]=A[byte 3]
C[byte 3]=B[byte 2].

Quad pel C is indicated in FIG. 15*d* by the pixels marked "X". For the Y input operand of ALU 156, byte multiplexor 1542 selects a quad pel D, which is indicated in FIG. 15*d*(iii) by the pixels marked "T". Quad pel D is achieved by setting byte positions 0 and 2 of multiplexor 1542 to select from quad pel A and byte positions 0 and 1 to select from quad pel B. Quad pel D is given by:

D[byte 0]=A[byte 0]
D[byte 1]=B[byte 1]
D[byte 2]=A[byte 2]
D[byte 3]=B[byte 3].

The decimated output is a quad pel Z, which is the result of summing Quad pels C and D in four 9-bit additions, in conjunction with a post-ALU divide by 2 operation. Quad pel Z represents a 2:1 decimation of quad pels A and B.

The operation of VSHRINK instruction is similar to the operation of the HSHRINK instruction.

A schmatic diagram of MAC 158 is shown in FIG. 15*b*. MAC 158 is designed to efficiently implement various functions, including a weighted average ("alpha filter"). As shown in FIG. 15*b*, MAC 158 receives two 36-bit input data, which are respectively labeled "X " and "Z". Input datum Z is taken from the output datum of ALU 156, which can be used to compute the sum or difference of two values. A multiplexer 1502 outputs a datum 1522, being one of the following values: the input datum Z, a factor alpha, or the sign of input datum Z (represented by 1 and −1, for datum Z being greater or equal to zero and less than zero, respectively). Another multiplexor 1501 selects as output datum 1521 either the input datum X or the input datum Z. Data 1521 and 1522 are provided to multiplier 1503 as input data. The output datum 1523 of the multiplier 1503 can be summed in adder 1506 with a datum 1524, which is the output datum of multiplexor 1504. Datum 1524 is one of the following: the output datum of accumulator 1505, a rounding factor for a quantization or dequantization multiplication step, or datum X. The output datum 1525 of adder 1506 is stored in accumulator 1505, if the instruction is a MAC instruction, or provided as a 36-bit output datum W, after shifted (i.e. scaled) and limited by scale and limit circuit 1508.

Multiplier 1503 comprises a 24-bit×18-bit multiplier, an 18-bit×18-bit multiplier and two 9-bit by 9-bit multipliers. Each of these multipliers can be implemented by conventional Booth multipliers. Thus, in the present embodiment, multiplier 1503 can provide one of the following groups of multiplication: (i) a 24-bit×18-bit ("word mode"); (ii) two 18-bit×18-bit multiplications ("halfword mode"), and (iii) four 9-bit×9-bit multiplications ("byte mode"). Corresponding word, halfword and byte mode additions are also provided in adder 1506.

The efficiency of MAC 158 is illustrated by an example of alpha filtering in a mixing filter which is used in combining two fields in a deinterlacing operation. FIG. 15c(i) shows a filter coefficient "alpha" as a function of an absolute difference between input values A and B. As applied to the deinterlacing operation, A and B denote the values of corresponding pixels (luma or chroma) in the odd and even fields of an image. In this filter, the deinterlaced image has a combined pixel value obtained by (i) equally weighting the values of A and B, when the difference between A and B does not exceed a first threshold Ti; (ii) according value B a variable weight between 0.5 and 1.0, when the difference between A and B is between the first threshold T1 and a second threshold T2; and (iii) selecting value B when the difference between A and B is greater than the second threshold T2. Physically, averaging corresponding pixels using equal weights is appropriate only if an object formed by these pixels is relatively stationary between the fields (i.e. as provided by a small difference x-y). If an object moves rapidly between the fields, the corresponding pixels would have a large difference. Thus, when a large difference is seen, a larger weight should be accorded to the more recent image.

In the mixing filter illustrated in the FIG. 15c(i), the difference x-y between corresponding chromas (x, y) in the odd and even fields are computed to determine the value a of alpha (scaled by 256 to allow integer multiplication). The value a of alpha is provided by specifying two parameters m and n. Specifically, $$a = \text{limit}(127, 2*m*|x-y|+16*(n+1), 255)$$

FIG. 15c(ii) shows a circuit 1550 for computing the value a of alpha in this embodiment. In circuit 1550, circiut 1551 computes the 8-bit (unsigned) absolute difference of an 9-bit difference A-B (corresponding to the difference x-y). A shifter circuit 1552 shifts to the left the absolute difference of a number of bit positions specified by a 2-bit value. This shifting operation is equivalent to multiplying the absolute difference obtained in circuit 1551 by the aforementioned parameter m. The allowable values of m are 2, 4, 8, and 16. The shifted absolute difference is then added in circuit 1553 to one of seven values of the aforementioned parameter n selected by a 3-bit value. The allowable values of n are 16, 32, 48, 64, 80, 96, 116, 128. These values of n can be achieved by incrementing the 3-bit value by 1 and left shifting by 4 bit positions. In this embodiment, only the most significant 8 bits of the sum are retained. A limiter circuit 1554 limits the output value of alpha to between 128 and 256. The output of limiter 1554 is inverted to obtain an approximate value of negative alpha, which is provided to output bus 1522 (FIG. 15b), when selected by multiplexer 1502.

The values of alpha corresponding to various values of m and n are shown in FIG. 15c(iii).

This value a and the difference x-y are provided to multiplier 1503 as input data 1522 and 1521 respectively. Multiplier 1503 is programmed to right shift by 8 bits (divide by 256) to scale of the value a of alpha. The value x is provided as input datum X to MAC 158 and passed through multiplexor 1504 to adder 1506 as input 1524 to be summed with the output datum 1523 of multiplier 1503.

Thus, the equation:

$$w = x - a(x-y) = ay + (1-a)x$$

which is the basic alpha-filtering equation, is achieved in one MAC latency period. Further, since the 36-bit input data x and y may be a quad pel, alpha filtering of four pixels can be performed simultaneously under byte mode operations.

Since the value of a is limited to between 0.5 and 1, the thresholds T1 and T2 are given by the following equations:

$$T1(n, m) = \frac{64 - 8(n+1)}{m}$$

$$T2(n, m) = \frac{128 - 8(n+1)}{m}$$

Another example of alpha filtering is an adaptive temporal noise filter which blends a pixel of a previous frame with the corresponding pixel of the current frame. One implementation of the temporal noise filter is provided by the equation:

$$Y_{t+1} = aY_t + (1-a)X_{t-1} = X_{t+1} + a(Y_t - X_{t+1})$$

where $X_{t+1}$, $Y_{t+1}$, and $Y_t$ are respectively the input pixel value for time t+1, the filtered pixel value for time t+1, and the filtered pixel value for time t. The alpha a in this equation can also be a non-linear alpha, similar to the alpha a of the mixing filter discussed above. Thus, the temporal noise filter can be implemented in the same manner as the mixed filter discussed above. Physically, the temporal noise filter eliminates sudden jumps in the pixel values between frames. The temporal noise filter can be used in decompression to reduce noise generated by the coding process. The temporal filter can also be used during compression to reduce source noise.

Figures 1, 15E:
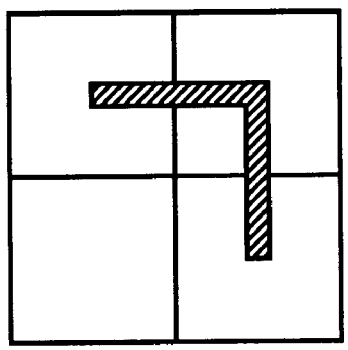
FIG. 15e shows the pixels involved in computing activities of quad pels A and B as input to a STAT1 or STAT2 instruction.
Figures 2, 15E:
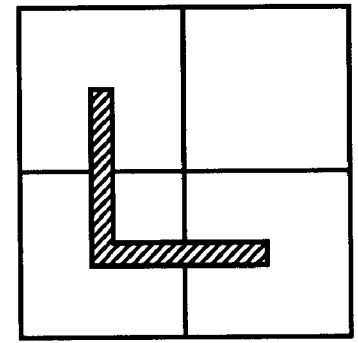

The STAT1 and STAT2 instructions each provide a measure of the "activity" of adjacent pixels, using both byte multiplexors 1541 and 1542, and MAC 158. FIG. 15e shows, the pixels of two quad pels A and B used in either a STAT1 or a STAT2 instruction. In FIG. 15e, each pixel is represented by a square, and a thick line joining two pixels represents a difference computed between the pixels. Byte multiplexors 1541 and 1542 are used to configure the X and Y input data to ALU 156, such that:

| | |
|---|---|
| X[byte0] = A[byte1]; | Y[byte0] = A[byte0]; |
| X[byte1] = A[byte3]; | Y[byte1] = A[byte1]; |
| X[byte2] = B[byte0]; | Y[byte2] = B[byte2]; |
| X[byte3] = B[byte2]; | Y[byte3] = B[byte3]; |

Thus, in a STAT1 instruction, a byte mode difference operation in ALU 156 computes simultaneously in the four bytes of output datum Z the differences of the adjacent pixels in each of the quad pels A and B shown in FIG. 15e:

Z[byte0]=A[byte1]−A[byte0];
Z[byte1]=A[byte3]−A[byte1];
Z[byte2]=B[byte0]−B[byte2];
Z[byte3]=B[byte2]−B[byte3].

The datum Z is passed to MAC 158, which multiplies the appropriate sign to each byte of Z to obtain the absolute value of the difference computed in ALU 156 between the adjacent pixels connected by the lines of FIG. 15e. Thus, four absolute differences between adjacent pixels are computed in a STAT1 instruction.

Alternatively, instead of the absolute difference computed in a STAT1 instruction, in a STAT2 instruction, multiplier 1503 squares each byte of the datum Z using byte mode multiplies, appropriately setting multiplexors 1503 and 1501 to provide the Z datum at both terminals 1521 and 1522 of multiplier 1503. Thus, four square errors between adjacent pixels are computed under a STAT2 instruction.

Figure 15F:
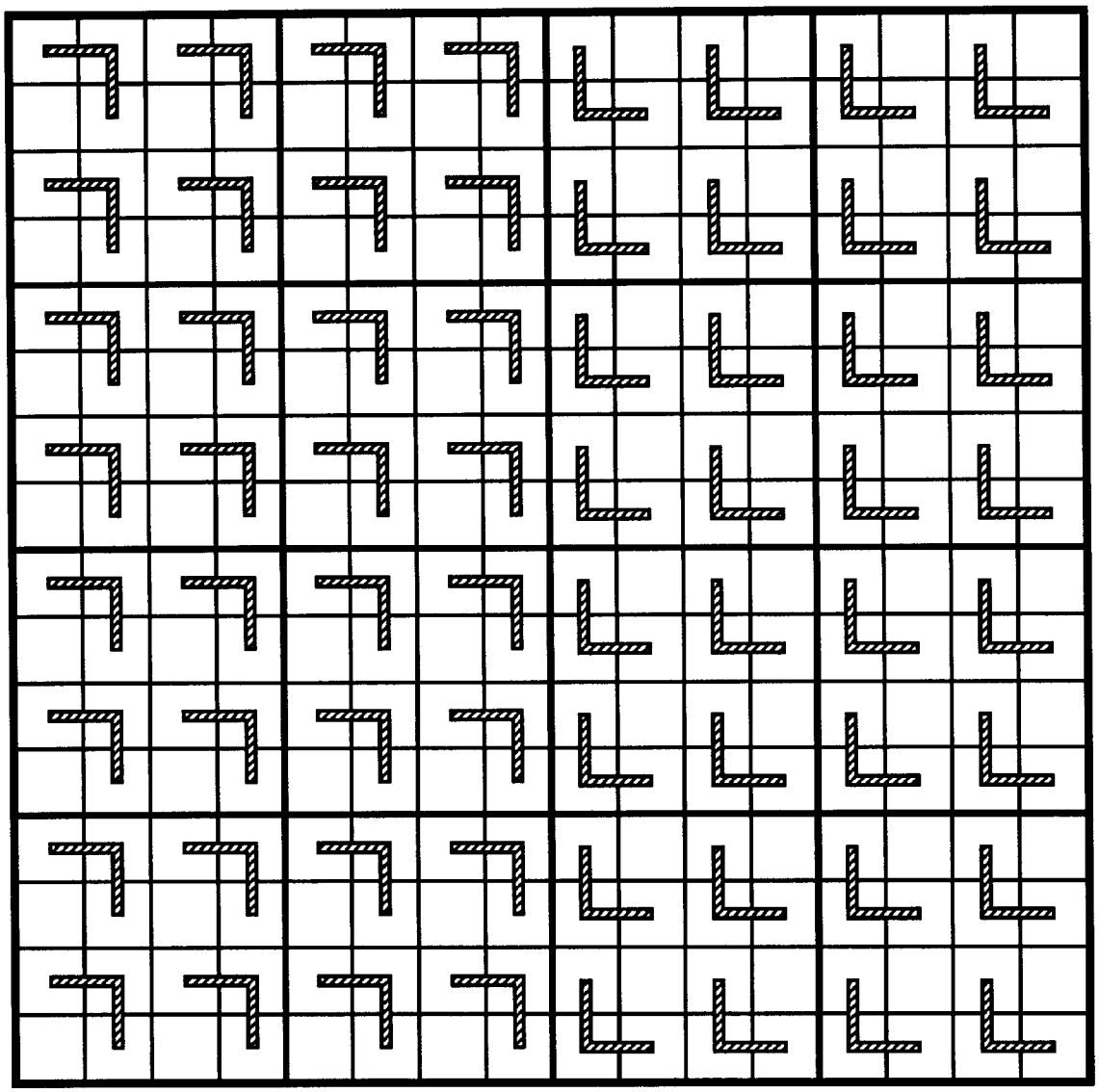
FIG. 15f shows a macroblock of luminance data for which a measure of activity is computed using repeated calls to a STAT1 or a STAT2 instruction.

In either STAT1 or STAT2 instructions, the absolute differences or the square errors computed are accumulated in accumulator 1505. Consequently, multiple calls to STAT1 or STAT2 can be used to compute the activities of an area of an image. Specifically, as shown in FIG. 15f, in one embodiment of the present invention, a measure of activity is computed by accumulating over a macroblock (16×16 pixels) of luminance data absolute differences or square errors, using repeated calls to either a STAT1 or STAT2 instruction. The measure of activity is a metric for determining quantization step sizes. Hence, adaptive control of quantization step sizes based on an activity measure can be implemented to increase the compression ratio.

The choice of quantization constants affect the compression ratio, the quality of the resulting picture, as well as the rate at which the encoder can process the incoming video signals. For intra-coded blocks (i.e. I-Picture), the following activity statistics are computed: (a) the sum of the absolute values of the AC coefficients of in each of the four 8×8 blocks of the macroblock, (b) the maximum AC coefficient of each of the four 8×8 blocks of the macroblock, (c) the average of the four DC coefficients of the macroblock, and (d) the variance of the four DC coefficients of the macroblock. For non-intra coded blocks, the activity statistics computed are (a) as shown above, the sum of absolute differences between the luminance of adjacent pixels (STAT2), (b) the difference between the greatest and the smallest luminance value of the block, (c) the average of the four DC coefficients of the macroblock, and (d) the variance of the four DC coefficients of the macroblock.

One choice for the energy function is the sum of the squares of the filtered pixel values. However, a non-linearity is introduced by the sum of squares approach. Another choice for the energy function is a counting function that counts the number of filtered pixels each having an absolute value above a preset threshold. This latter energy function is linear.

For video signals originating from a telecin converter[2], a large compression ratio can be realized by eliminating redundancy inherent in such video signals. In such video signals, a high likelihood exists that adjacent fields of such video signals are identical. To identify such redundancy, in this embodiment, a vertical [1, −1] filter (the instruction FILM), which is implemented by byte multiplexors 1541 and 1542 aligning the corresponding pixels values in the vertical direction is provided. MAC 158 computes an "energy" function of the filtered image. The pair of fields resulting in a low energy function is a candidate for field elimination.

[2] A telecin converter converts frames of a motion picture, which is played at 24 frames per second, into video signals, which are played at 30 frames a second and comprising in each frame odd and even fields. The conversion is achieved by duplicating movie frames into odd and even fields of the video signal according to the sequence 2:3:2:3 . . . . However, since the video signals are often edited after the telecin conversion, redundancy cannot be eliminated merely eliminating duplicated frames according to the sequence.

Figure 13A:
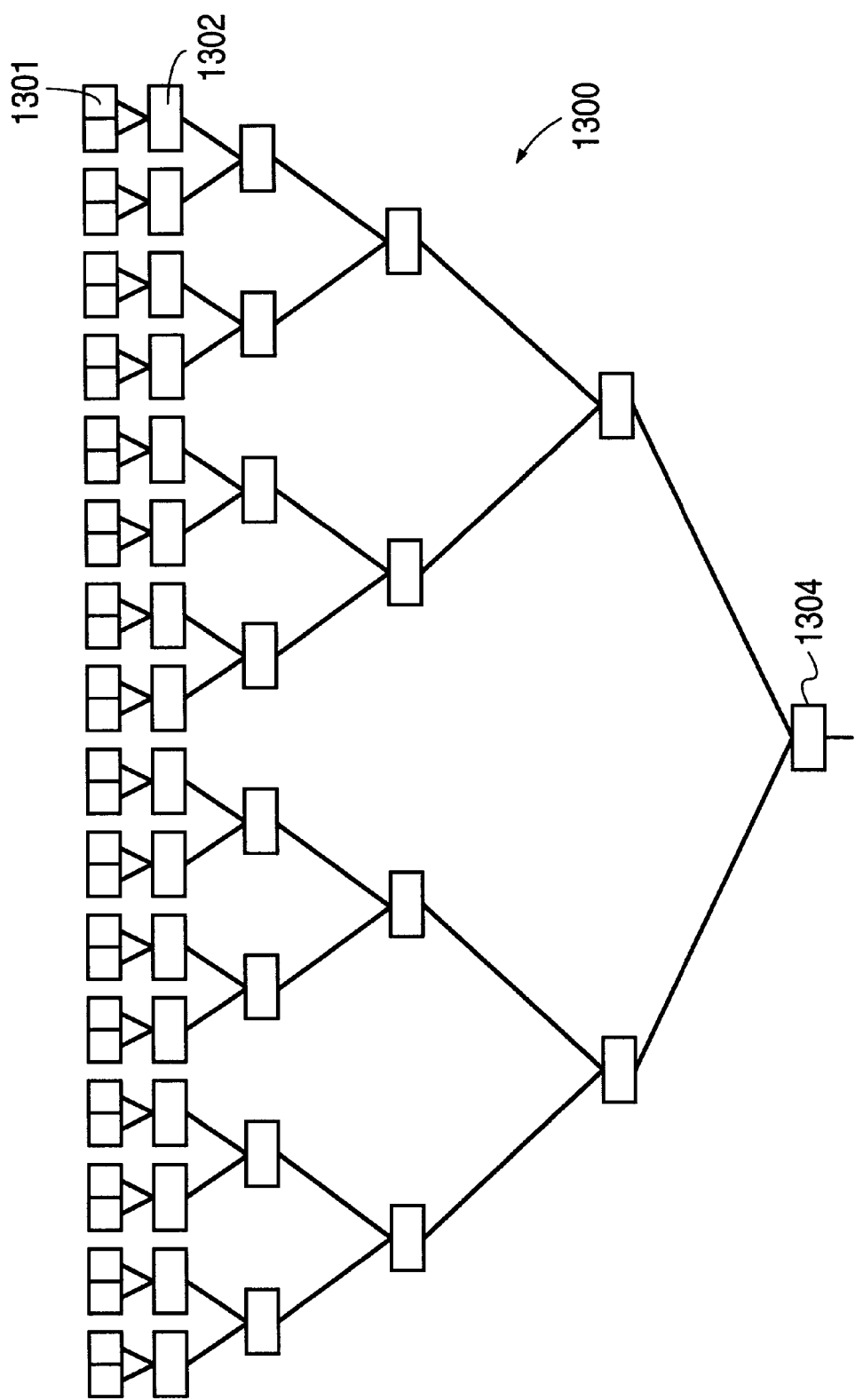
FIG. 13a shows a 32-bit zero-lookahead circuit 1300, comprising 32 generator circuits 1301 and propagator circuits.

In the present embodiment, a fast zero-lookahead circuit 1300, shown in FIG. 13a, is provided for arithmetic unit 750. Zero-lookahead circuit detects a zero-result condition for an arithmetic operation, such as an "add" operation involving two operands. Circuit 1300 comprises two types of circuits, labelled 1301 ("generator circuit") and 1302 ("propagator circuit"), and schematic represented in FIG. 13a by a square and a rectangle respectively.

Figure 13B:
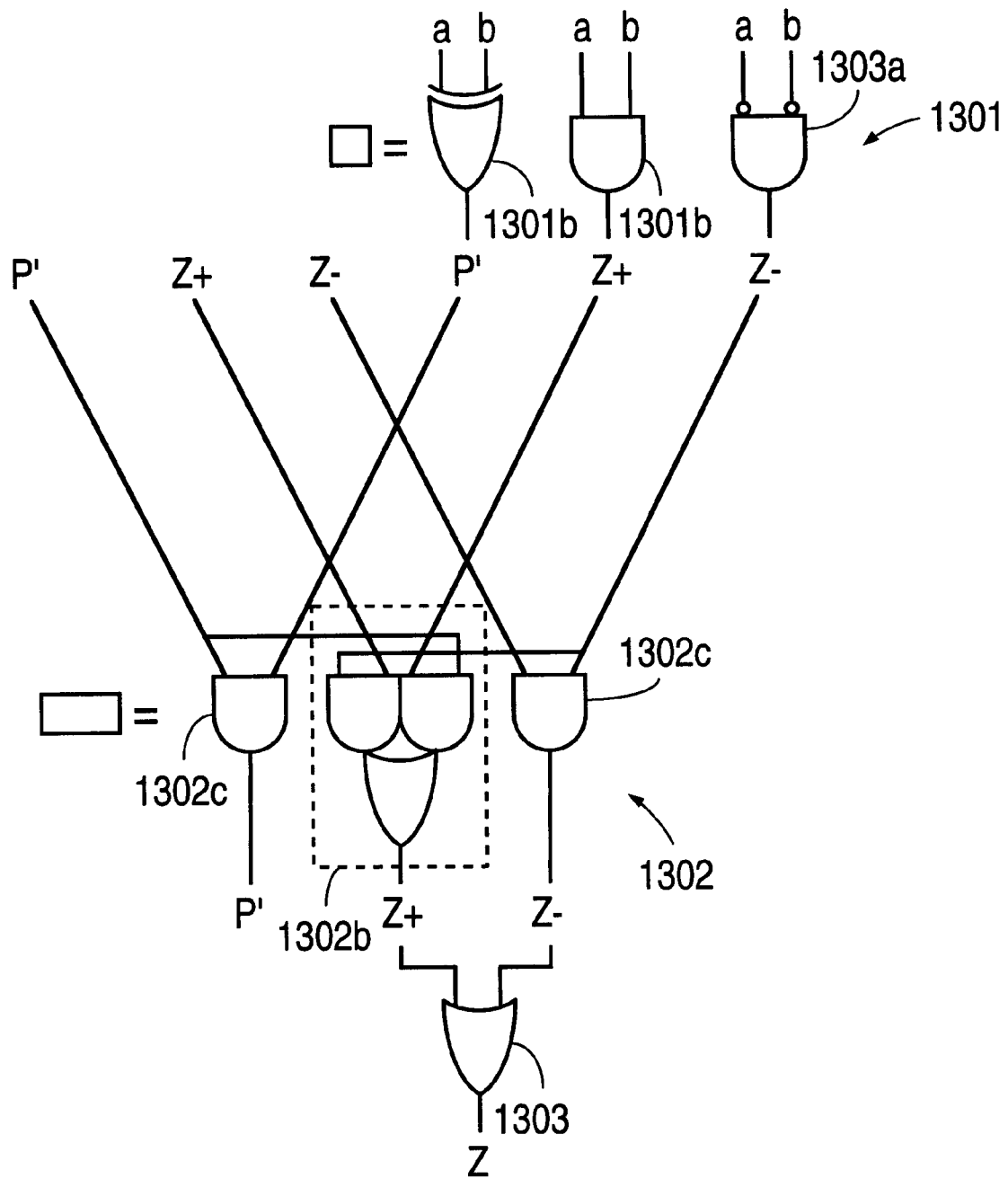
FIG. 13b shows the logic circuits for generator circuit 1301 and propagator circuit 1302.

In circuit 1300, there are 32 generator circuits and 31 propagator circuits. As shown in FIG. 13b, each generator circuit comprises a NOR gate 1301a, an AND gate 1301b, and an exclusive-OR gate 1301c. Each of logic gates 1301a–1301c receives as input 1-bit operands "a" and "b". The operands a and b of these logic gates 1301a–1301c are corresponding bits from the input operands of a 2-operand operation in arithmetic unit 750.

The generator circuit 1301 each generates three signals P', Z+ and Z−, corresponding respectively to signals representing a "zero-propagator", a "small zero" and a "big zero".[3] These output signals P', Z+ and Z− are combined in a propagator circuit 1302 shown in FIG. 13b. As shown in FIG. 13b, propagator circuit 1302 provides signals P', Z+ and Z−. The signals from each propagator circuit of zero lookahead circuit 1300 are combined with corresponding signals from another propagator circuit in a binary tree of propagator circuits. As shown in FIG. 13a, in the propagator circuit at the root of the binary tree of propagator circuits, indicated by reference numeral 1304, the signals Z+ and Z− of propagator circuit are input to an OR gate 1303 to generate the zero condition.

[3] A "zero-propagator" indicates a zero condition caused by a carry from the next lower order bit. A "small zero" indicates a zero condition cause by the sum of two zero operands. A "big zero" indicates a zero condition resulting from at least one non-zero operand.

Compared to conventional zero-detection circuits, zero-lookahead circuit 1300 detects a zero result in a very small number of gate delays.

The present embodiment provides support for DCT and IDCT computation by "butterfly" instructions. The present embodiment implements the following equation:

$$BFLY(a, b, c, p, d, m, t, sav) = \begin{cases} p = (a+b)/c; \\ c = ((a-b)*\cos(m)) - t/d; \\ acc = sav \end{cases}$$

Other suitable butterfly instructions which can be used to implement the butterfly instructions of the present embodiment are the "dmac" and "cmac" instructions disclosed in a copending application ("Copending Application") entitled, "A Decoder for Compressed Video Signals", by D. Galbi et al, Ser. No. 07/891,507, filed May 28, 1992, assigned to C-Cube Microsystems, Inc. The disclosure of Copending Application is hereby incorporated by reference in its entirety.

Quantization, during encoding, and dequantization, during decoding are also supported in ALU 150.

The Motion Estimator

Figure 16A:
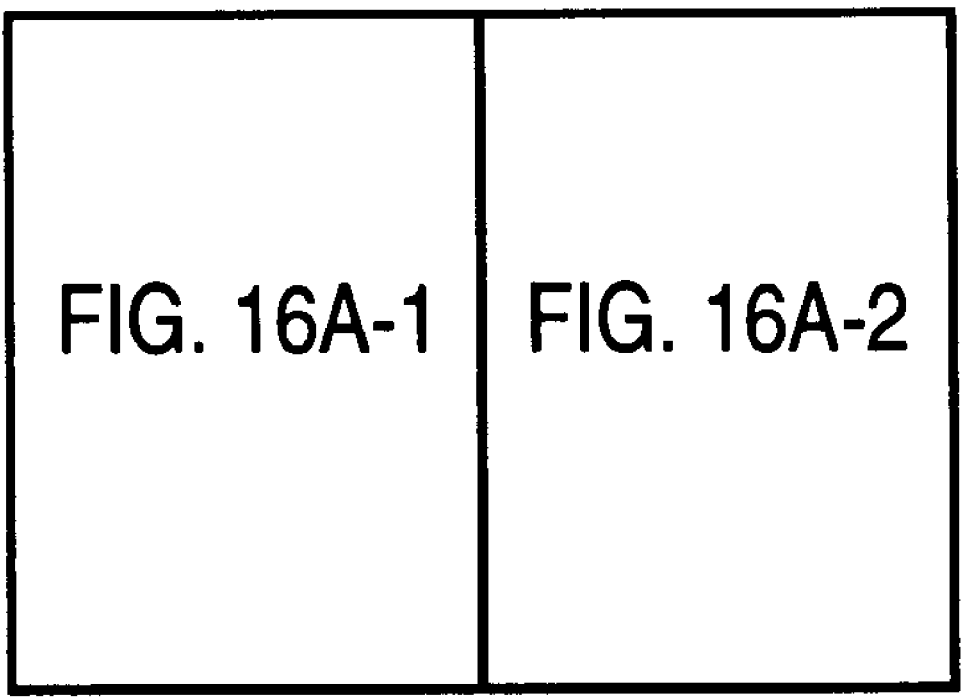
FIGS. 16a (comprising of FIGS. 16a-1 and 16a-2) and 16b are respectively a block diagram and a data and control flow diagram of motion estimator 111.
Figures 1, 16A:
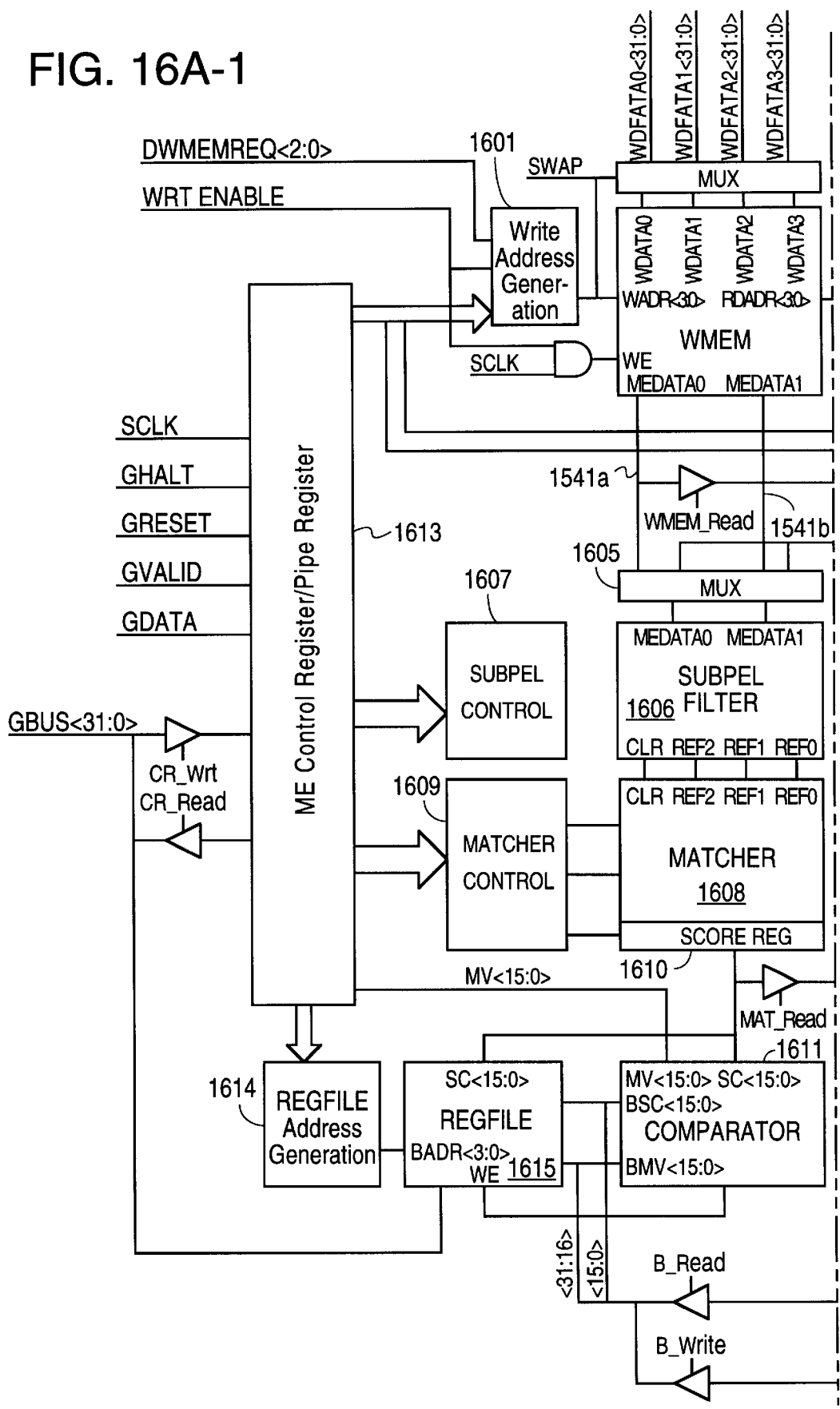
Figures 2, 16A:
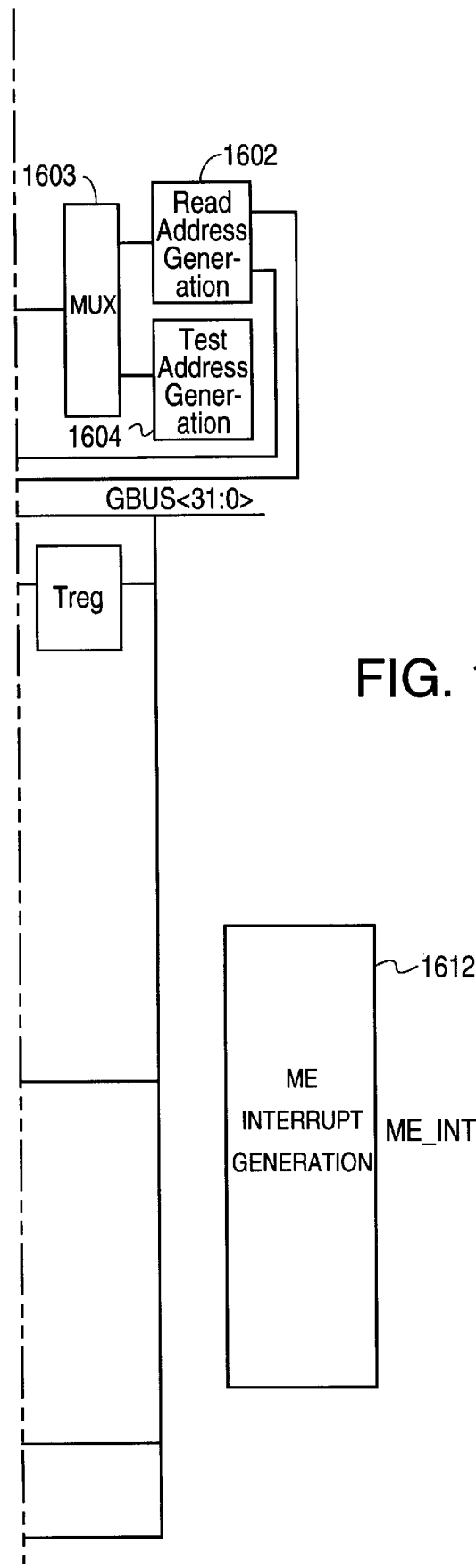

Motion estimator unit 111 is a pipelined coprocessor for computing motion vectors during encoding. FIG. 16a is a block diagram of the motion estimator 111. At any given time, the macroblocks of pixels to be coded are referred to as "current" macroblocks and the macroblocks of pixels relative to which the current macroblocks are to be coded is known as the "reference frame". The reference frame encompasses macroblocks which are within the range of allowable motion vectors and which are earlier or later in time than the current macroblocks.

As shown in FIG. 16a, overall control for motion estimator 111 is provided by motion estimator control unit 1613.

In addition, subpel filter 1606 is controlled by subpel control logic 1607, register file 1610 is controlled by register file control unit 1614, and matcher 1608 is controlled by matcher control unit 1609.

Read and write address generations for window memory 705, which is a 48×128-bit SRAM, are independently provided by read address generator 1602 and write address generator 1601. A test address generator 1604 is provided to for accessing window memory 705 for test purposes. Multiplexor 1603 is provided to enable a test access. Internally, as discussed in the following, window memory 705 is divided into two banks with an addressing mechanism provided to allow efficient retrieval of pairs of quad pels from a tile. In this embodiment, motion estimation is provided for both P-(predictive) frames and B-(bidirectional) frames, completed by either a 2-stage or a 3-stage motion estimation process, each stage using a different resolution. A subpel filter 1606, controlled by subpel filter control 1607, allows calculation of pixel values at half-pixel locations.

In the implementation shown in FIG. 16*a*, matcher 1608, which comprises 16 difference units, computes a "partial score" for each of eight motion vector candidates. These partial scores for the motion vectors evaluated are accumulated in the accumulators 1610. When these motion vectors are evaluated with respect to all pixels in a macroblock, the least of these partial scores becomes the current completed score for the macroblock. This current completed score is then compared to the best motion vector computed for the current macroblock using other refrence frame macroblocks. If the current completed score is lower than the best completed score of the previous best motion vector, the current completed score becomes the best completed score and the current motion vector becomes the best motion vector. Interrupts to CPU 150 are generated by interrupt generator 1612 when matcher 1608 arrives at the current completed score when the requested search area is fully searched.

Figure 16B:
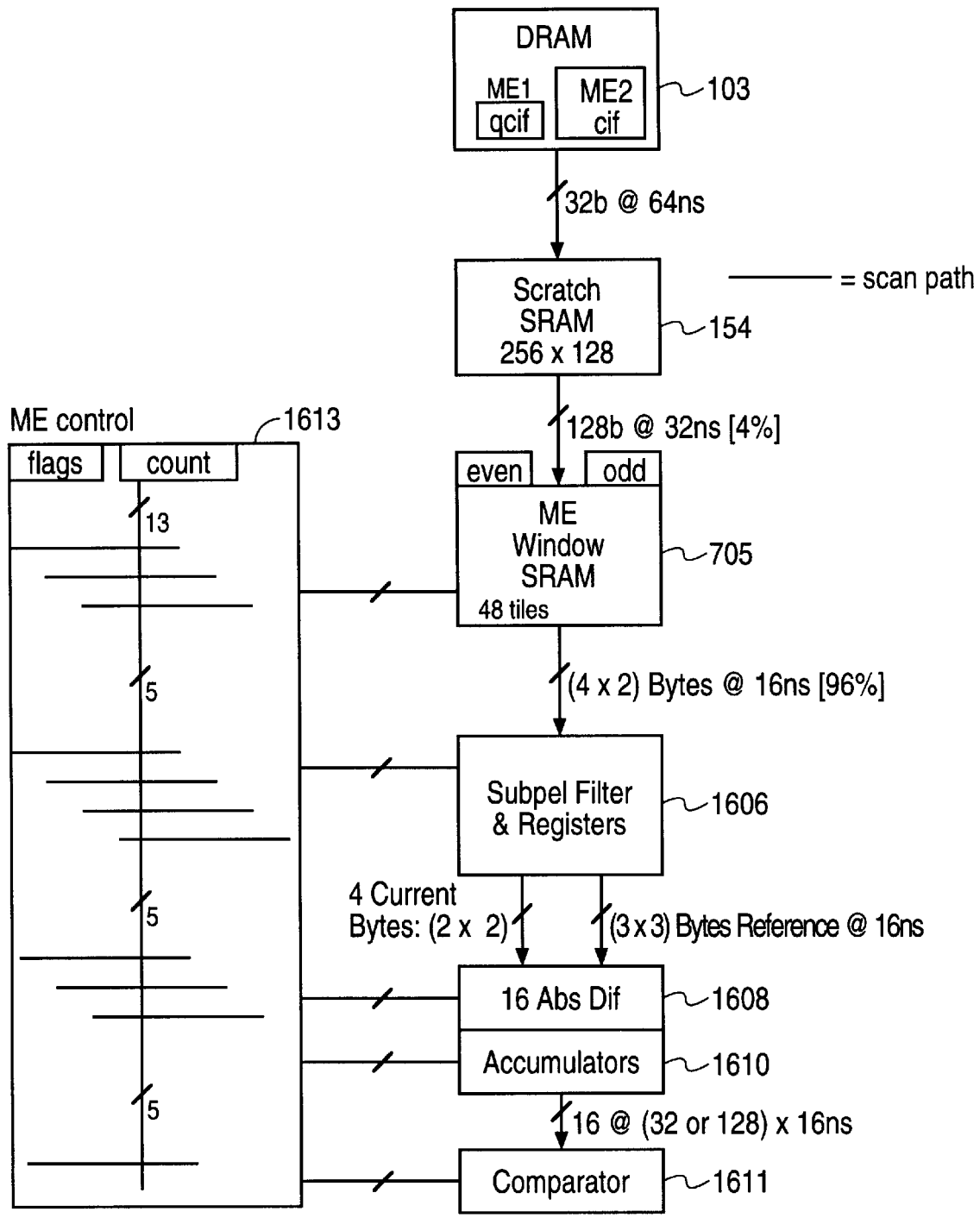
FIG. 16c is a block diagram of window memory 705, showing odd and even banks 705a and 705b.
FIG. 16d shows how, in the present invention, vertical half-tiles of a macroblock are stored in odd and even memory banks of window memory 750.

FIG. 16*b* is a data and control flow diagram of motion estimator 111. As shown in FIG. 16*b*, current macroblocks and macroblocks in the reference frame are fetched at the rate of 32 bits every 64 ns from external memory 103 and into SMEM 159. In turn, the current and reference macroblocks are fetched at the rate of 128 bits every 32 ns into window memory 705. Every 16 ns, two 32-bit words, each containing four pixels, are fetched from window memory 705 into the subpel filter and associated registers. The subpel filter provides every 16 ns a quad pel and a 3×3 pixel reference area for evaluation of sixteen absolute differences in matcher 1608. These absolute differences are used to evaluate the scores of the eight motion vectors. The best score are temporarily stored in a minimization register within comparator 1611. Comparator 1611 updates the best score in the minimization register, if necessary, every 16 ns. Control of the data flow is provided by control unit 1613.

Figure 16C:
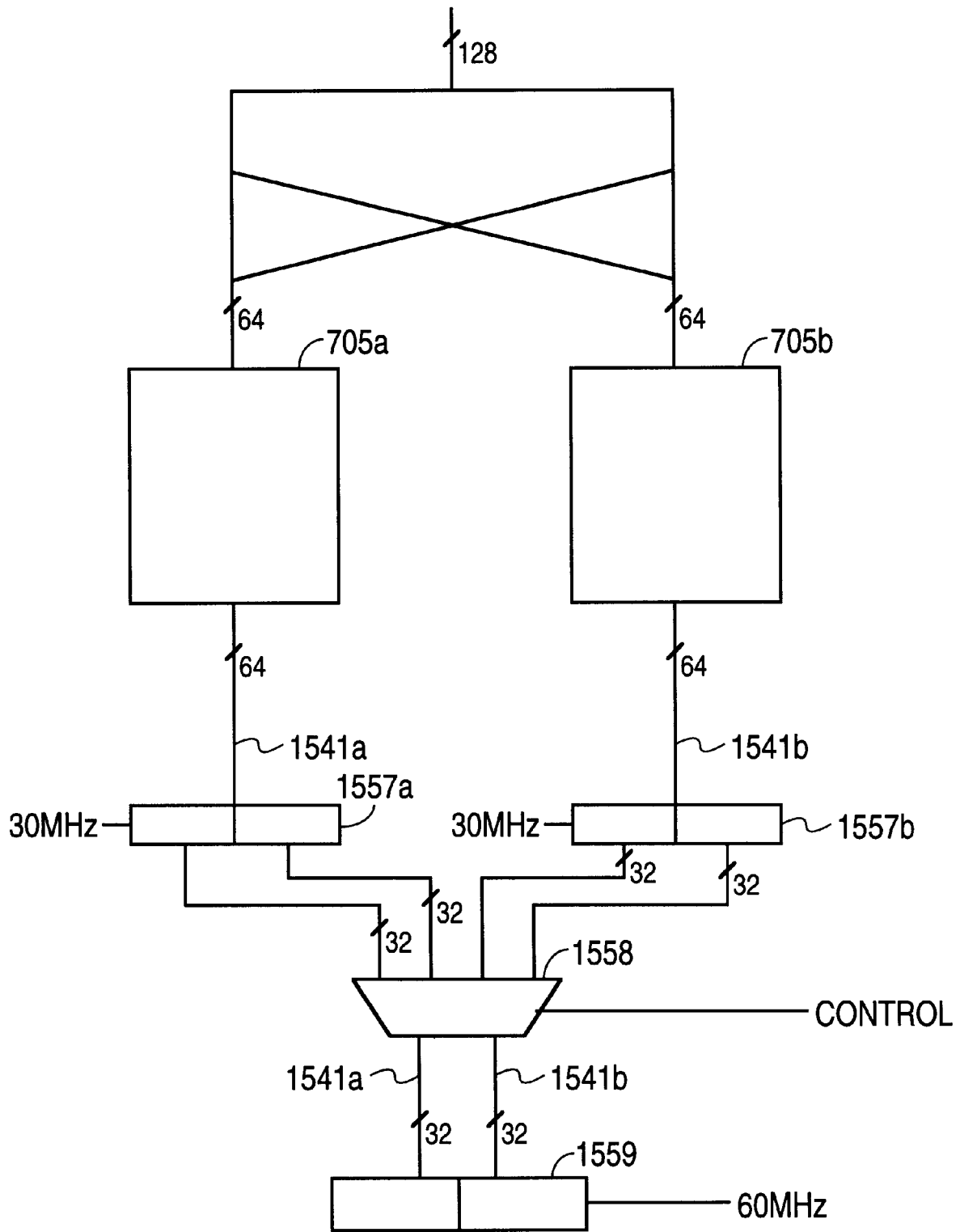

Window memory 705, which is shown in FIG. 16*c*, comprises an even bank 705*a* and an odd bank 705*b*, each bank being a 48×64-bit SRAM with an input port receiving output data from SMEM 159 over output busses 751*a* and 180*b*. The even and odd banks of window memory 705 output data onto 64-bit output port 1541*a* or 1541*b*, respectively. Registers 1557*a* and 1557*b* each receive 64-bit data from the respective one of even memory bank 705*a* and odd memory bank 705*b*. Registers 1557*a* and 1557*b* are clocked at a 30 Mhz clock. Multiplexors 1558 select from the contents of registers 1557*a* and 1557*b* a 64-bit word, as the output of window memory 705. Register 1559 receives this 64-bit word at a 60 Mhz clock rate.

Figure 16D:
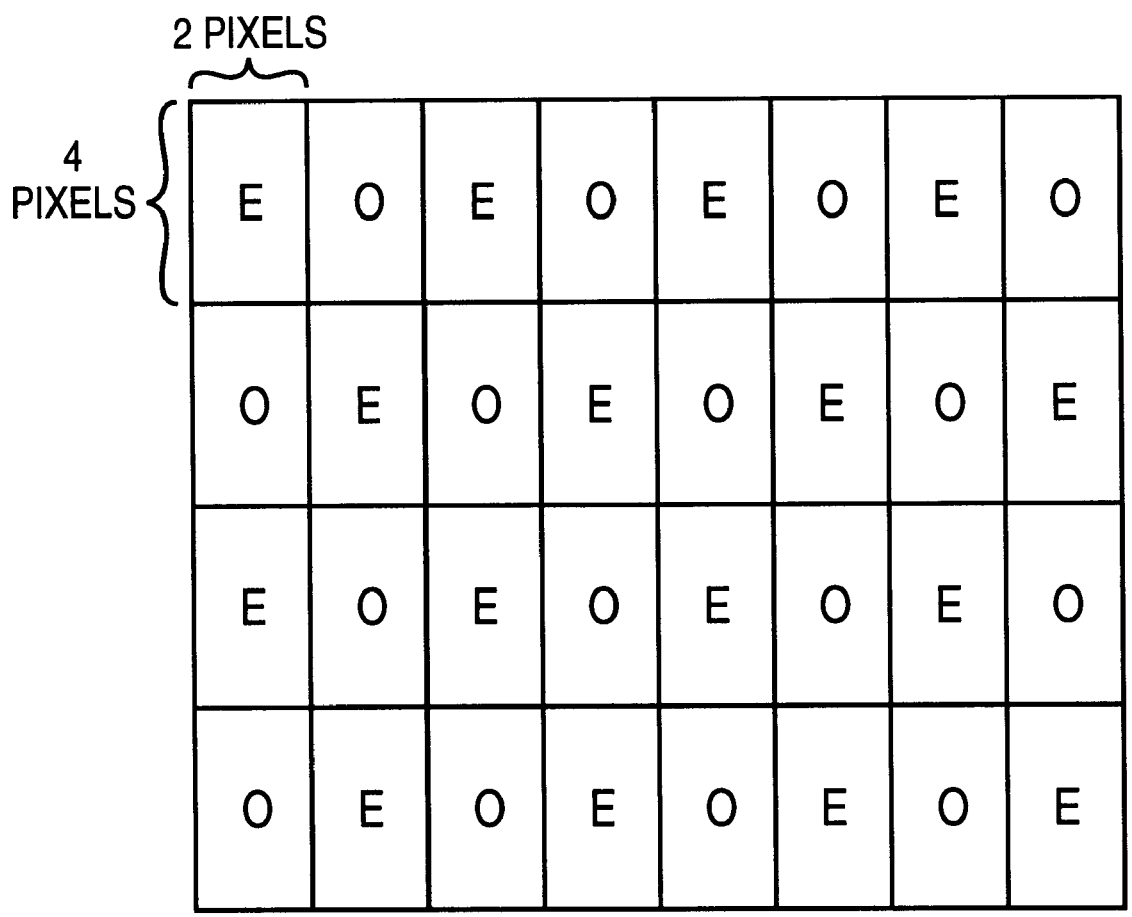

Each 64-bit word in window memory 705 represents a "vertical" half-tile (i.e. a 2×4 pixel area). Window memory 705 stores both current macroblocks and reference macroblocks used in motion estimation. As shown below, matcher 1608 evaluates motion vectors by matching a 2×8 pixel area of a current macroblock against a 4×12 pixel area of one or more reference macroblocks. In this embodiment, the 2×8 pixel area of a current macroblock are fetched as two vertically adjacent vertical half-tiles. Reference macroblocks, however, are fetched as "horizontal" half-tiles (i.e. 4×2 pixel reference areas). To support efficient fetching of 2×8 pixel areas of a marcoblock, vertically adjacent vertical half-tiles are stored in alternate banks of window memory 705, so as to take advantage of 2-bank access. When fetching of a horizontal half-tile of a reference macroblock, two vertical half-tiles are fetched. Thus, to take advantage of memory interleaving, these vertical half-tiles are preferably stored in alternate memory banks. FIG. 16*d* shows an example of how the vertical half-tiles of a macroblock can be stored alternately in even ("E") and odd ("O") memory banks 705*a* and 705*b*. The arrangement shown in FIG. 16*d* allows a 2×8 pixel areas of a current macroblock to be fetched by accessing alternatively odd memory bank 705*b* and even memory bank 705*a*. In addition, to fetch an upper or lower horizontal half-tile, even memory bank 705*a* and odd memory bank 705*b* are accessed together, and multiplexors 1558 are set to select, for output to register 1559 as a 64-bit output datum, a 32-bit halfword from register 1557*a* of even memroy bank 705*a* and a 32-bit halfword from register 1557*b*.

The present embodiment can be programmed to implement a hierarchical motion estimation algorithm. In this hierarchical motion estimation algorithm, the desired motion vector is estimated in a first stage using a lower resolution and the estimation is refined in one or more subsequent stages using higher resolutions. The present embodiment can be programmed to execute, for example, a 2-stage, a 3-stage, or other motion estimation algorithms. Regardless of the motion estimation algorithm employed, motion vectors for either the P (i.e. predictive) type or B (i.e. bidirectional) type frame can be computed.

Figure 17:
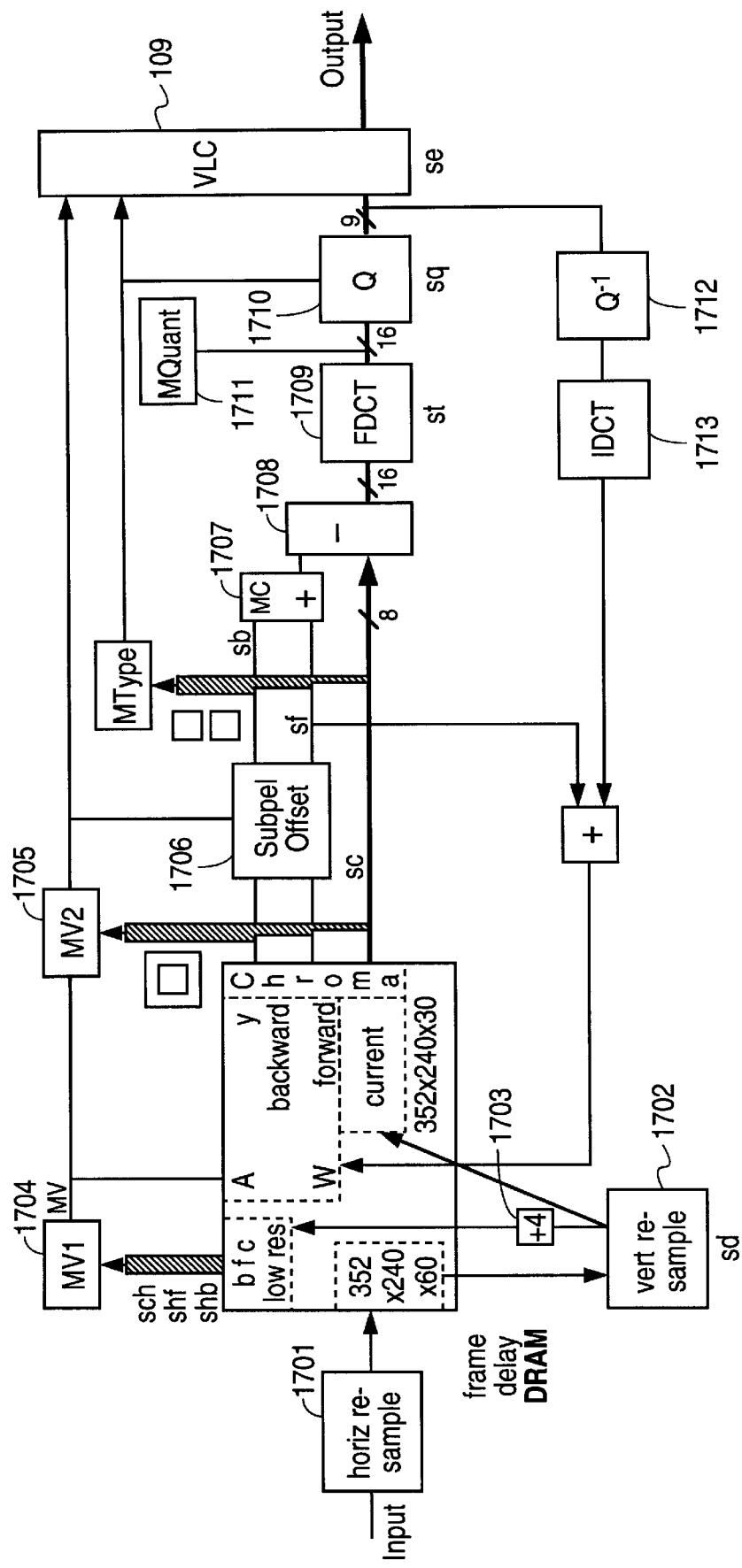
FIG. 17 illustrates a 2-stage motion estimation algorithm which can be executed by motion estimator 111.

A 2-stage motion estimation algorithm is illustrated in FIG. 17. As shown in FIG. 17, input video data is received and, if necessary, resampled and deinterlaced in steps 1701 and 1702 horizontally, vertically and temporally to a desired resolution, such as 352×240×60, or 352×240×30 (i.e. 352 pixels horizontally, 240 pixels vertically, and either 60 or 30 frames per second). The input video data is stored as current macroblocks in external memory 103 temporarily for motion estimation. In step 1703, the current macroblocks are decimated to provide a lower resolution. For example, a 16×16 full resolution macroblock can be decimated to a 8×8 macroblock covering the same spatial area of the image (quarter-resolution).

Only luminance data are used in motion estimations. In the first stage of the 2-stage motion estimation, represented by step 1704, the low resolution current macroblock is compared to a correspondingly decimated reference frame to obtain a first estimate of the motion vector. In the present embodiment, the motion vector positions evaluated in this first stage can range, in full resolution units of pixels, (a) for P frames, ±46 horizontally and ±22 vertically; and (b) for B frames, ±horizontally and ±14 vertically. This approach is found to be suitable for P frames within three frames of each other.

The motion vector estimated in the first stage is then refined in step 1705 by searching over a (3/2, 3/2) area around the motion vector evaluated in Stage 1. The second stage motion vector is then passed to VLC 109 for encoding in a variable-length code.

The reference frame macroblocks (P or B frames) are resampled in step 1706 to half-pel positions. Half-pel positions are called for in the MPEG standard. Step 1707 combines, in a B frame, the forward and backward reference macroblocks. The current macroblock is then subtracted from the corresponding pixels in the resampled reference frame macroblocks in step 1708 to yield an error macroblock for DCT in step 1709. Quantizations of the DCT coefficients are achieved in step 1710. Since quantization in the present embodiment is adaptive, the quantization step-sizes and constants are also stored alongside the motion vector and the error macroblock in the variable-length code stream. The quantized coefficients are both forwarded to VLC 109 for variable-length code encoding, and also fed back to reconstruct reference macroblocks to be used in subsequent motion estimation. These reconstructed reference macroblocks are reconstructed by dequantization (step 1712), inverse discrete cosine transform (step 1713), and added back to the current macroblock.

Blocks can be encoded as intra, forward, backward or average. The decision to choose the encoding mode is achieved by selecting the mode which yields the smallest mean square error, as computed by summing the values of entries in the resulting the error macroblock. According to the relative preference for the encoding mode, a different bias is added to each mean square error computed. For example, if average is determined to be the preferred encoding mode for a given application, a larger bias is given the corresponding mean square error. A particularly attractive encoding outcome is the zero-delta outcome. In a zero-delta outcome, the motion vector for the current block is the same as the motion vector of the previous block. A zero-delta outcome is attractive because it can be represented by a 2-bit differential motion vector. To enhance the possibility of a zero-delta outcome in each encoding mode, in addition to the first bias added to provide a preference for the encoding mode, a different second bias value is added to the mean square error of the encoding mode. In general, the first and second bias for each encoding mode are determined empirically in each application.

Figure 18A:
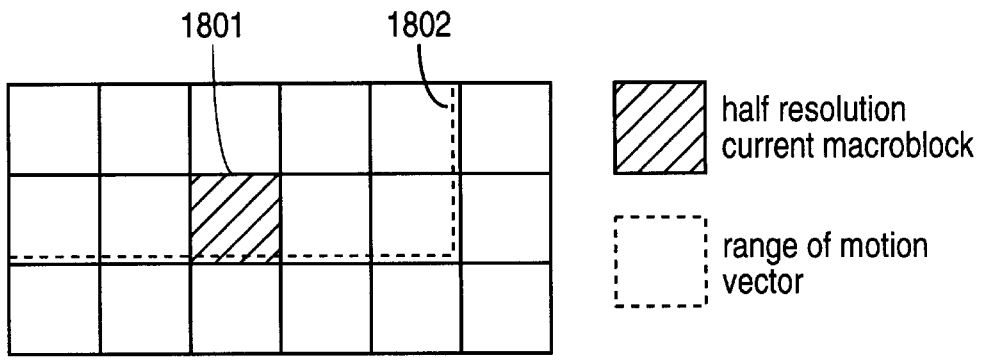
FIGS. 18a and 18b show, with respect to reference macroblocks, a decimated current macroblock and the range of a motion vector having an origin at the upper right corner of the current macroblock for the first stage of a B frame motion estimation and a P frame motion estimation respectively.
Figure 18B:
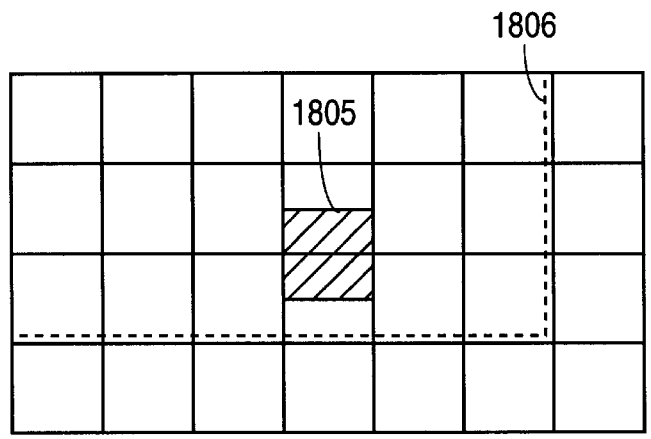

FIGS. 18*a* shows a decimated macroblock and the reference frame macroblocks within the range of the first stage motion vector under a B frame encoding mode. In FIG. 18*a*, a decimated macroblock (¼ resolution) 1801 is shown within the range 1802 of a motion vector having an origin at the upper left corner of macroblock 1801. FIG. 18*b* shows a decimated macroblock and the reference frame macroblock within the range of the first stage motion vector under a P frame encoding mode. In FIG. 18*b*, the decimated macroblock 1805 is shown within the range 1806 of a motion vector having an origin at the upper left corner of macroblock 1805.

Figure 18C:
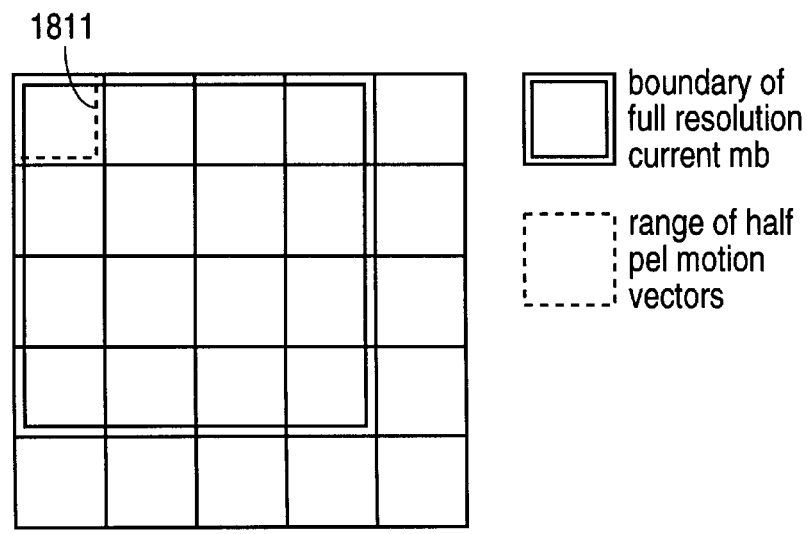
FIG. 18c shows, with respect to reference macroblocks, a full resolution current macroblock and the range of a motion vector having an origin at the upper right corner of the current macroblock for the second stage of motion estimation in both P-frame and B-frame motion estimations.
Figure 18D:
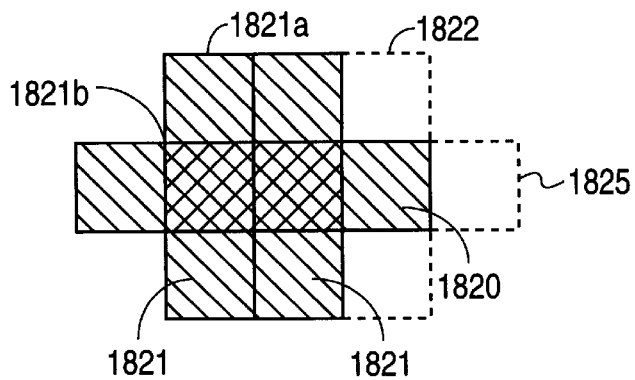
FIG. 18d shows the respectively locations of current and reference macroblocks in the first stage of a B frame motion estimation.

In the second stage of motion estimation, full resolution is used in both P frame and B frame encoding. The range of the motion vector computed in the second stage of the two-stage motion estimation is 1.5 pels. FIG. 18*c* shows a full resolution macroblock and the range 1811 of the motion vector of this second stage of motion estimation of both the P and B frames. To achieve efficient use of window memory 705, in a B frame motion estimation, a 4×1 region ("strip") of current macroblocks is evaluated with respect to a 2×3 macroblock region of the reference frame. The locations 1820 and 1821 of the current and the reference regions, respectively, are shown in FIG. 18*d*. To minimize the number of times data is loaded from external memory 103, the evaluation of motion vectors covering the reference macroblocks and the current macroblocks in window memory 705 are completed before a new strip of current macroblocks and reference memory are loaded. In the configuration shown in FIG. 18*d*, a new current macroblock (macroblock 1825) and a new slice (1×3) of reference macroblocks (i.e. the 1×3 macroblocks indicated in dotted lines by reference numeral 1822) are brought in when evaluation of the leftmost current macroblock (1820*a*) of 4×1 macroblock strip 1820 is complete. The loading of the new current macroblock and the new reference frame macroblocks is referred to as a "context switch." At this context switch, the leftmost current macroblock has completed its evaluation over the entire range of a motion vector, the remaining current macroblocks, from left to right, have completed effectively ¾, ½ and ¼ of the evaluation over the entire range of a motion vector.

Figure 18E:
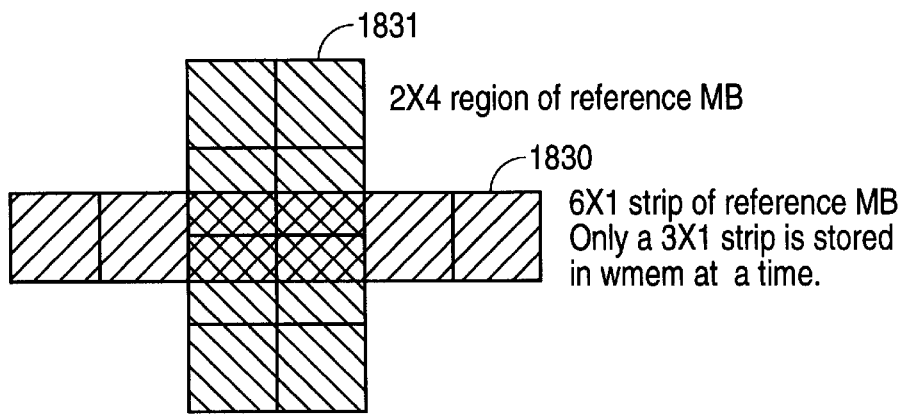
FIG. 18e shows the respective locations of current and reference macroblocks in the first stage of a P frame motion estimation.

In a first stage P frame motion estimation, since the search range is larger than that of the corresponding B frame motion estimation, a 2×4 reference macroblock region and a 6×1 strip of current macroblocks form the context for the motion estimation. FIG. 18*e* show a 6×1 strip 1830 of current macroblocks and a 2×4 region 1831 of the reference macroblocks forming the context for a P frame motion estimation. In this embodiment, for a P frame estimation, only one-half of the 6×1 region of current macroblocks, i.e. a 3×1 region of current macroblocks, is stored in window memory 705. Thus, in a P frame estimation, the 2×4 region, e.g. region 1831, is first evaluated against the left half of the 6×1 region (e.g. region 1830), and then evaluated against the right half of the 6×1 region before a new current macroblock and a new 1×4 reference frame region are brought into window memory 705.

Figures 1, 2, 18F:
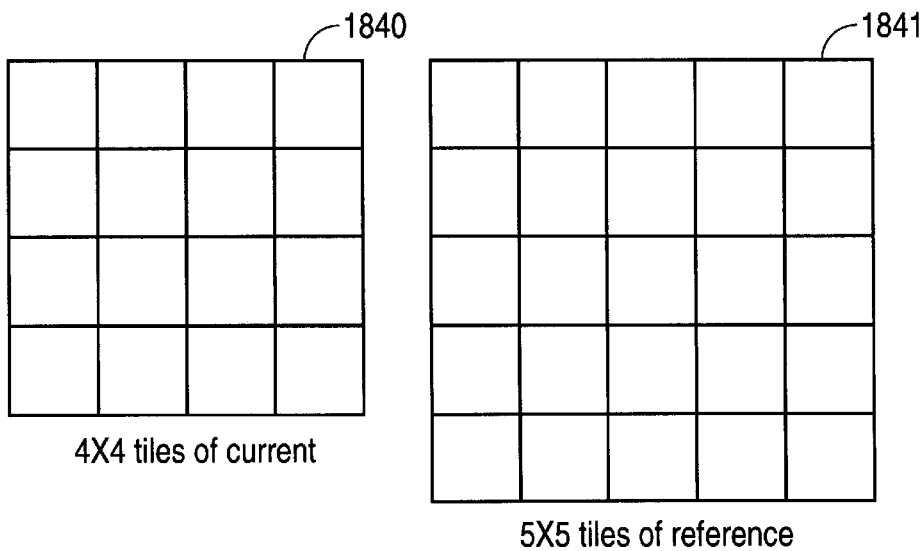
FIG. 18f shows both a 4×4 tile current macroblock 1840 and a 5×5 tile reference region 1841 in the second stage of motion estimation.

For the second stage motion estimation, a 4×4 tile region (i.e. 16×16 pixels), forming a full resolution current macroblock, and a 5×5 tile region of the reference macroblocks covering the range of the second stage motion estimation are stored in window memory 705. The reference macroblocks are filtered in the subpel filter 1606 to provide the pixel values at half-pel locations. FIG. 18*f* shows both a 4×4 tile current macroblock 1840 and a 5×5 tile reference region 1841.

As mentioned above, the present embodiment also performs 3-stage motion estimation. The first stage for a P or a B frame motion estimation under a 3-stage motion estimation is identical to the first stage of a B frame motion estimation under a 2-stage motion estimation. In the present embodiment, the range of the motion vectors for a first stage motion estimation (both P and B frames) is, in full resolution, ±124 in the horizontal direction, and ±60 in the vertical direction.

The second stage of the 3-stage motion estimation, however, is performed using half-resolution current and reference macroblocks. These half-resolution macroblocks are achieved by a 2:1 vertical decimation of the full resolution macroblocks. In the present embodiment, the range of motion vectors for this second stage motion estimation is ±6 in the horizontal direction and ±6 in the vertical direction. During the second stage of motion estimation, a half-resolution current macroblock and a 2×2 region of half-resolution macroblocks are stored in window memory 705.

The third stage of motion estimation in the 3-stage motion estimation is identical to the second stage of a 2-stage motion estimation.

Figure 18G:
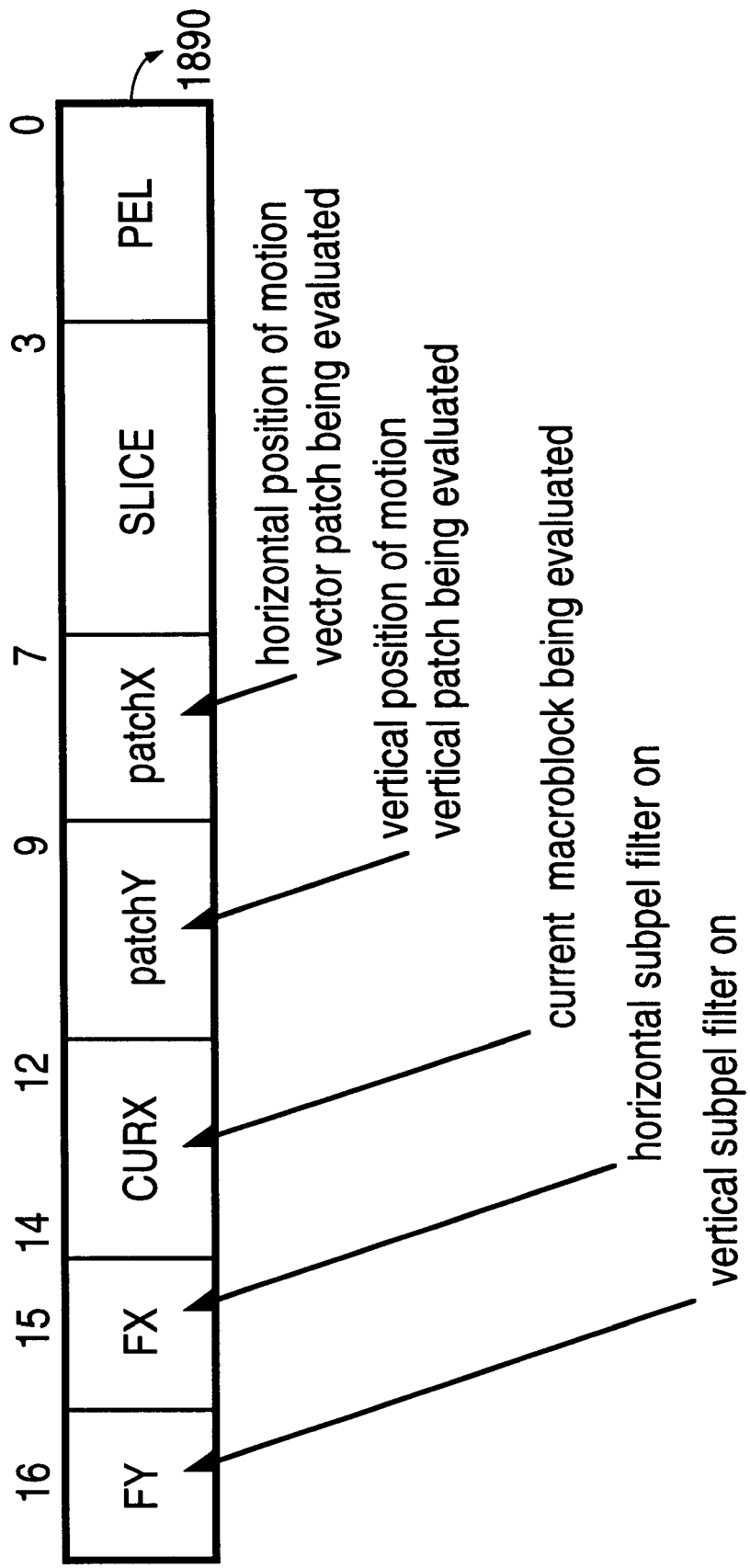
FIG. 18g shows the fields of a state counter 1890 having programmable fields for control of motion estimation.

In the present embodiment, matcher 1608 matches a "slice"—a 2×8 pixels configuration—of current pixels (luma) against a 3×11 pixel reference area to evaluate eight candidate motion vectors for the slice's macroblock. The 3×11 pixel reference area is obtained by resampling a 4×12 pixel reference area horizontally and vertically using subpel filter 1606. As explained below, the 2×8 slice is further broken down into four 2×2 pixel areas, each of which is matched, in 2 phases, against two 3×3 pixel reference areas within the 3×11 pixel reference area. The eight motion vectors evaluated is referred to as a "patch" of motion vectors. The patch of eight vectors comprises the motion vectors (0,0), (0,1), (0,2), (0,3), (1,0), (1,1), (1,2) and (1,3). In this embodiment, eight bytes of data are fetched at a time from window memory 705 to register file 1610, which forms a pipeline for providing data to subpel filter 1606 and matcher 1608. The control of motion estimation is provided by a state counter. FIG. 18g shows the fields of the state counter 1890 for motion estimation in this embodiment. As shown in FIG. 18g, the fields of state counter 1890 are (a) 1-bit flag Fx indicating whether horizontal filtering of the reference pixels is required, (b) a 1-bit flag Fy indicating whether vertical filtering of the reference pixels is required, (c) a 3-bit counter CURX indicating which of the current macroblocks in the 4×1 or 6×1 strip of current marcoblocks is being evaluated, (d) a 2-bit counter PatchX indicating the horizontal position of the patch of motion vectors being evaluated, e) a 3-bit counter PatchY indicating the vertical position of the patch of motion vectors being evaluated, (f) a 4-bit counter SLICE indicating which one of the sixteen slices of a macroblock is being evaluated, and (g) a 3-bit counter PEL indicating one of the eight phases of matcher 1608.

The fields FY, FX, CURX, PatchX, and PatchY are programmable. The fields FY and FX enables filtering subpel filter 1606 in the indicated direction. Each of the counters CURX, PatchX, PatchY, SLICE, and PEL counts from an initial value (INIT) to a maximum value (WRAP) before "wrapping around" to the INIT value again. When a WRAP value is reached, a "carry" is generated to the next higher counter, i.e. the next higher counter is incremented. For example, when PEL reaches its WRAP value, SLICE is incremented. When CURX reaches its WRAP value, a new current macroblock and new reference macroblocks are brought into window memory 705.

The range of motion vectors to be searched can be restricted by specifying four "search parameters" $Mx_{min}$, $My_{min}$, $MX_{max}$, and $My_{max}$. In addition, the frame boundary, i.e. the boundary of the image defined by the reference macroblocks, restricts the range of searchable motion vectors. Both the search parameters and the frame boundary affect the INIT and WRAP values of state counter 1890. In this embodiment, the search parameters are user programmable to trade-off search area achievable to encoding performance.

In the present embodiment, when some but not all motion vectors are outside of the frame boundary, the scores of the patch are still evaluated by matcher 1608.

Figures 1, 18H:
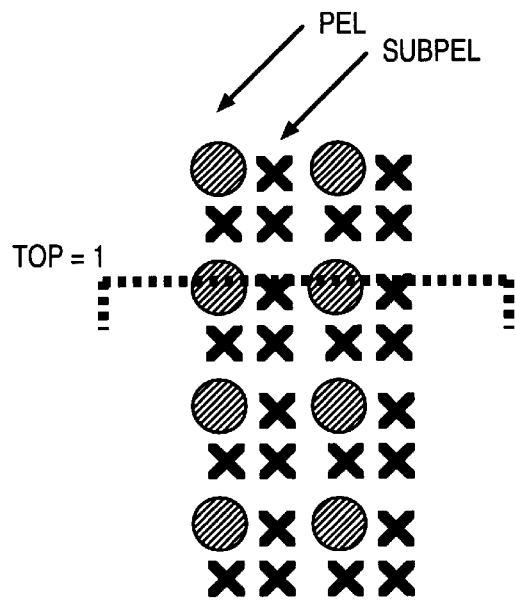
FIG. 18h shows the four possibilities by which a patch of motion vectors crosses a reference frame boundary.
Figures 2, 18H:
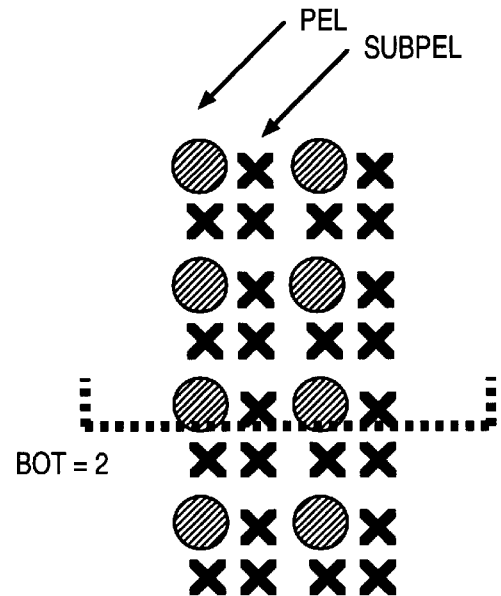
Figures 3, 18H:
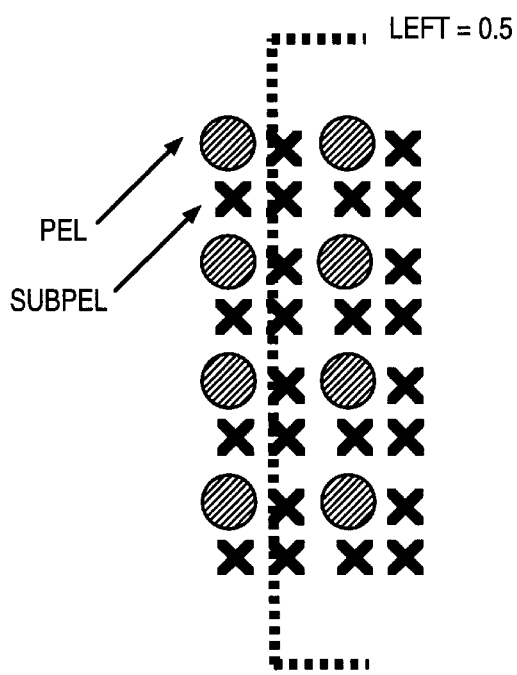
Figures 4, 18H:
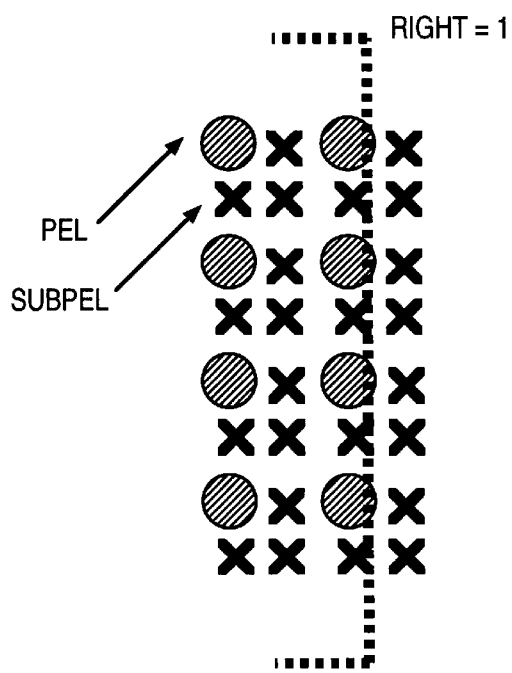
Figure 18I:
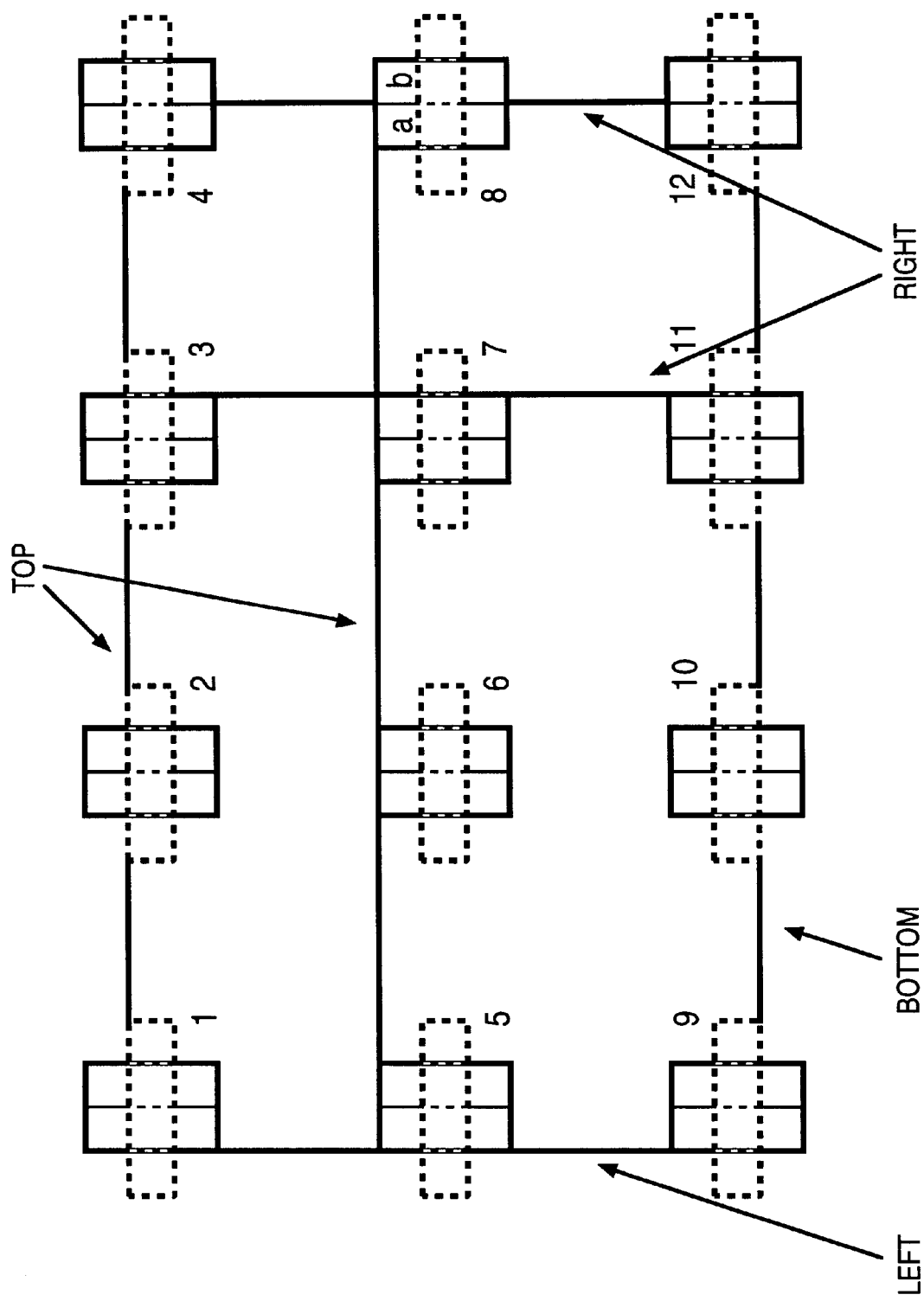
FIG. 18i shows the twelve possible ways the reference frame boundary can intersect the reference and current macroblocks in window memory 705 under the first stage motion estimation for B-frames.
Figure 18K:
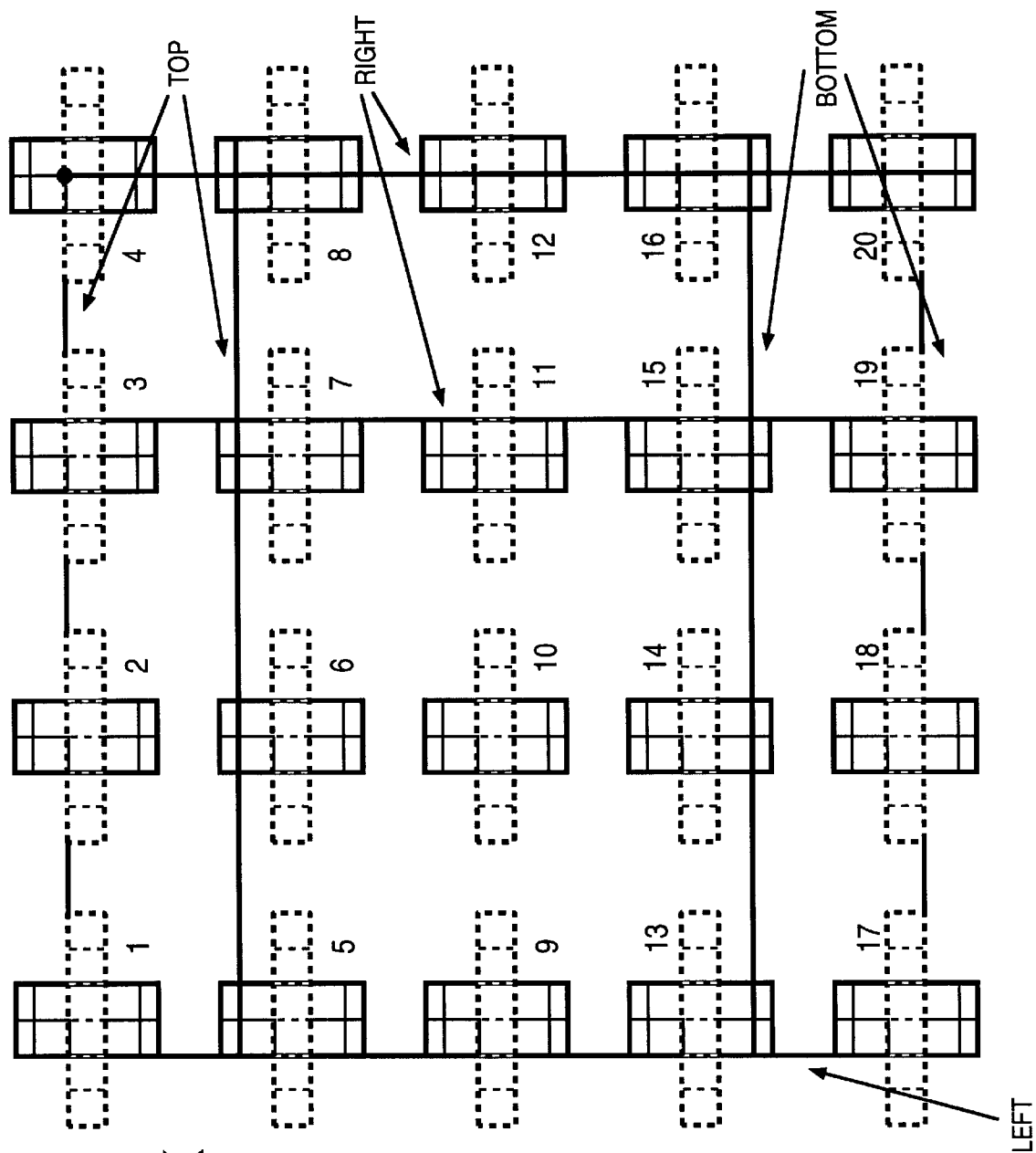
FIG. 18k shows the twenty possible ways the reference frame boundary can intersect the current and reference macroblocks in window memory 705.
Figures 1, 18M:
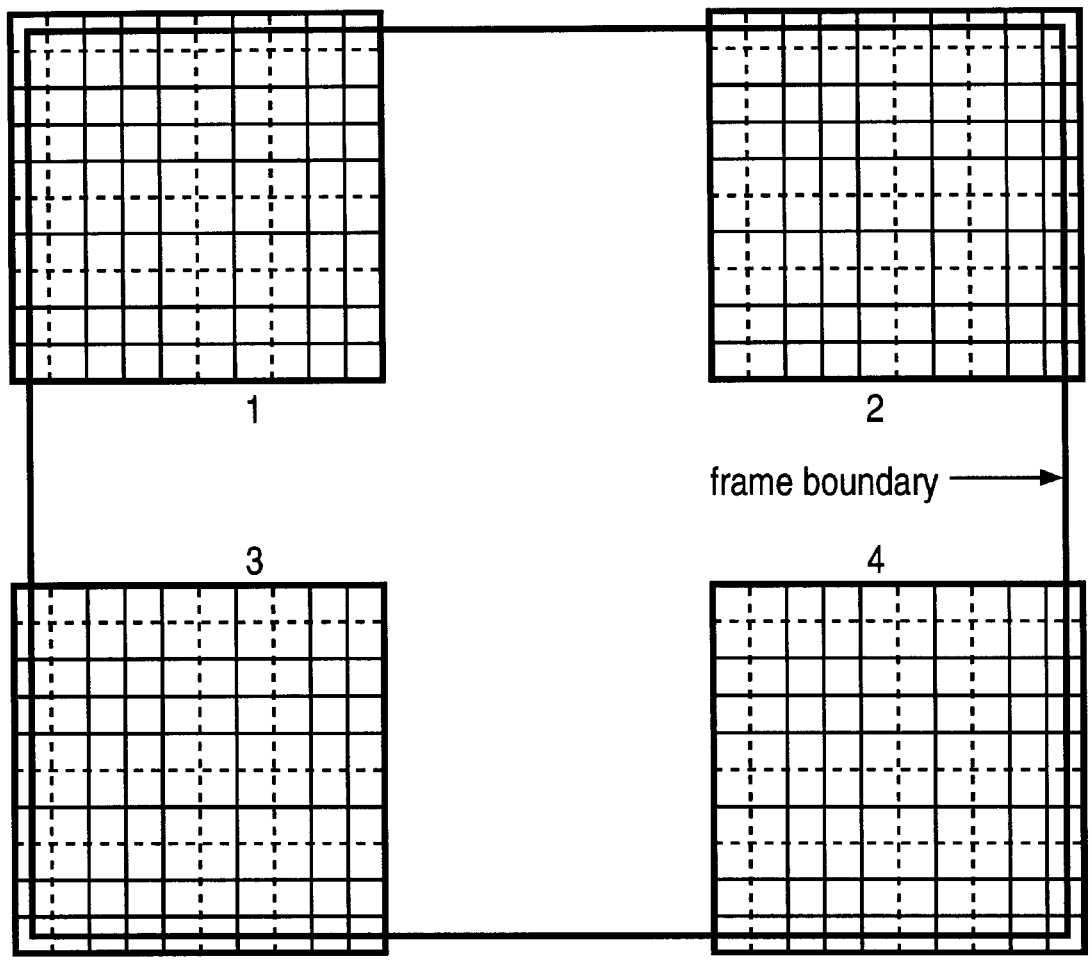
Figures 2, 18M:
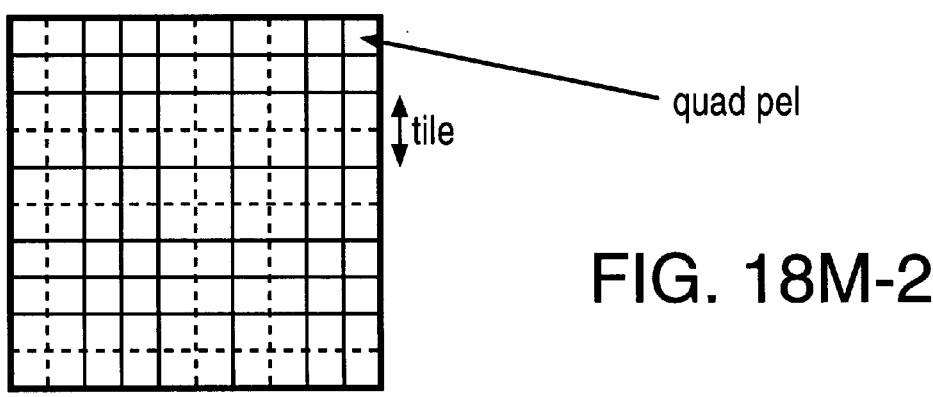
Figures 3, 18M:
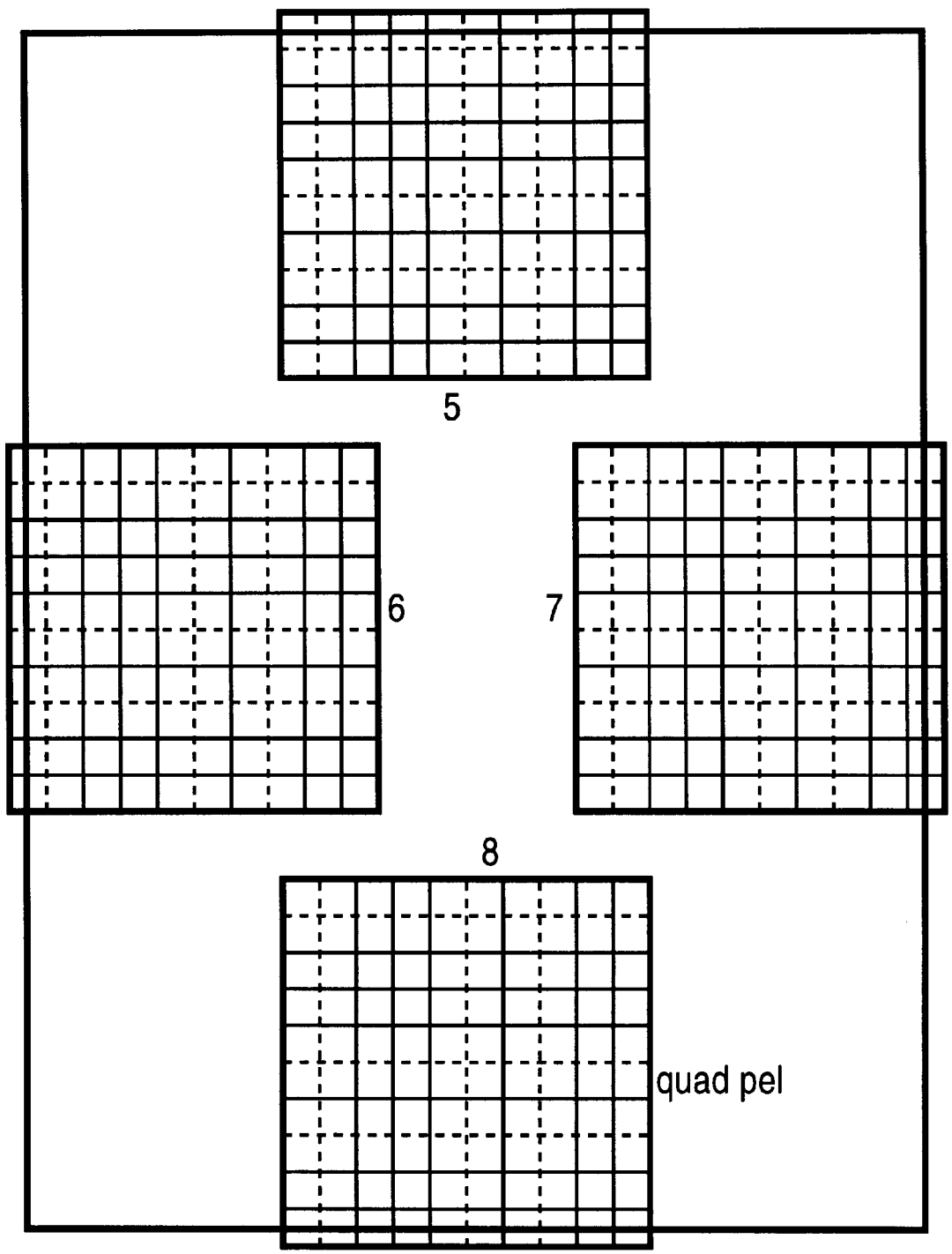

However, the scores of these invalid motion vectors are not used by comparator 1611 to evaluate the best scores for the macroblock. FIG. 18h shows the four possible ways a patch can cross a reference frame boundary. In FIG. 18h, the dark color pel or subpel positions indicate the positions of valid motion vectors and the light color pel or subpel positions indicate the positions of invalid motion vectors. If a patch lies entirely outside the reference frame, the patch is not evaluated. The process of invalidating scores or skipping patches is referred to as "clipping." FIG. 18i shows the twelve reference frame is between reference frame macroblocks a and b. FIG. 18j shows, for each of the 12 cases shown in FIG. 18i, the INIT and WRAP values for each of the fields CURX, PatchX, and PatchY in state counter 1890. The valid values for fields SLICE and PEL are 0–3 and 0–7 respectively. FIG. 18k shows the twenty possible ways a reference frame boundary can intersect the current and reference macroblocks in window memory 705 under the first stage of a P frame 2-stage motion estimation FIG. 18l shows, for each of the twenty cases shown in FIG. 18k, the corresponding INIT and WRAP values for each of the fields of state counter 1890. Likewise, FIGS. 18m-1 and 18m-2 show the clipping of motion vectors with respect to the reference frame boundary for either the second stage of a 2-stage motion estimation, or the third stage of a 3-stage motion estimation. FIG. 18n provides the INIT and WRAP values for state counter 1890 corresponding to the reference frame boundary clipping shown in FIGS. 18m-1 and 18m-2.

Figure 19A:
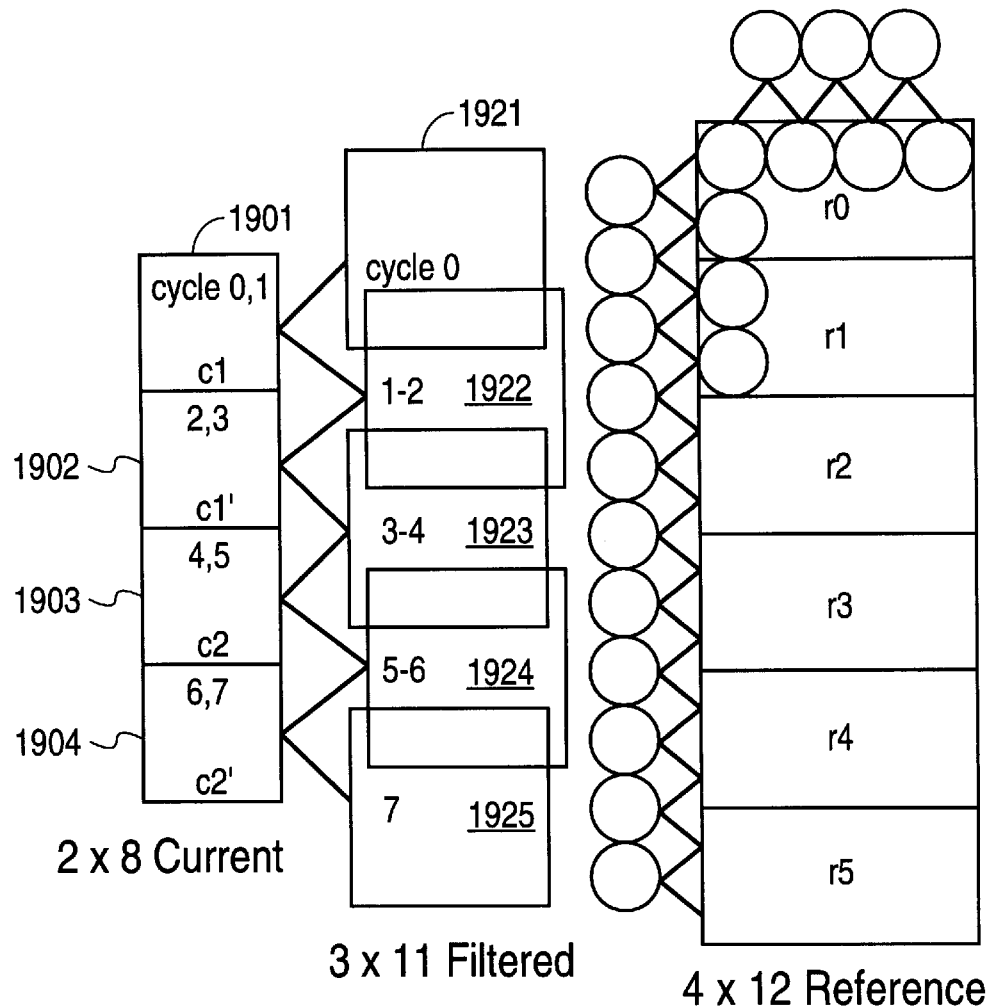
FIG. 19a illustrates the algorithm used in matcher 1606 for evaluate eight motion vectors over eight cycles.
Figure 19B:
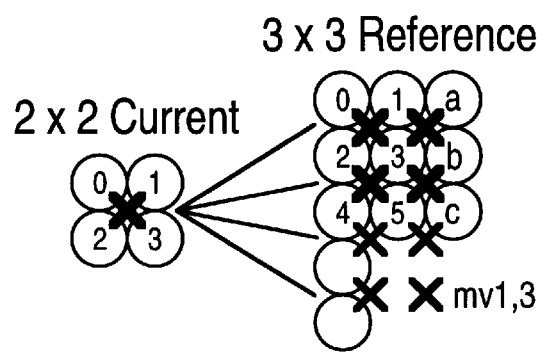
FIG. 19b shows the locations of the "patch" of eight motion vector evaluated for each slice of current pixels.
Figure 19C:
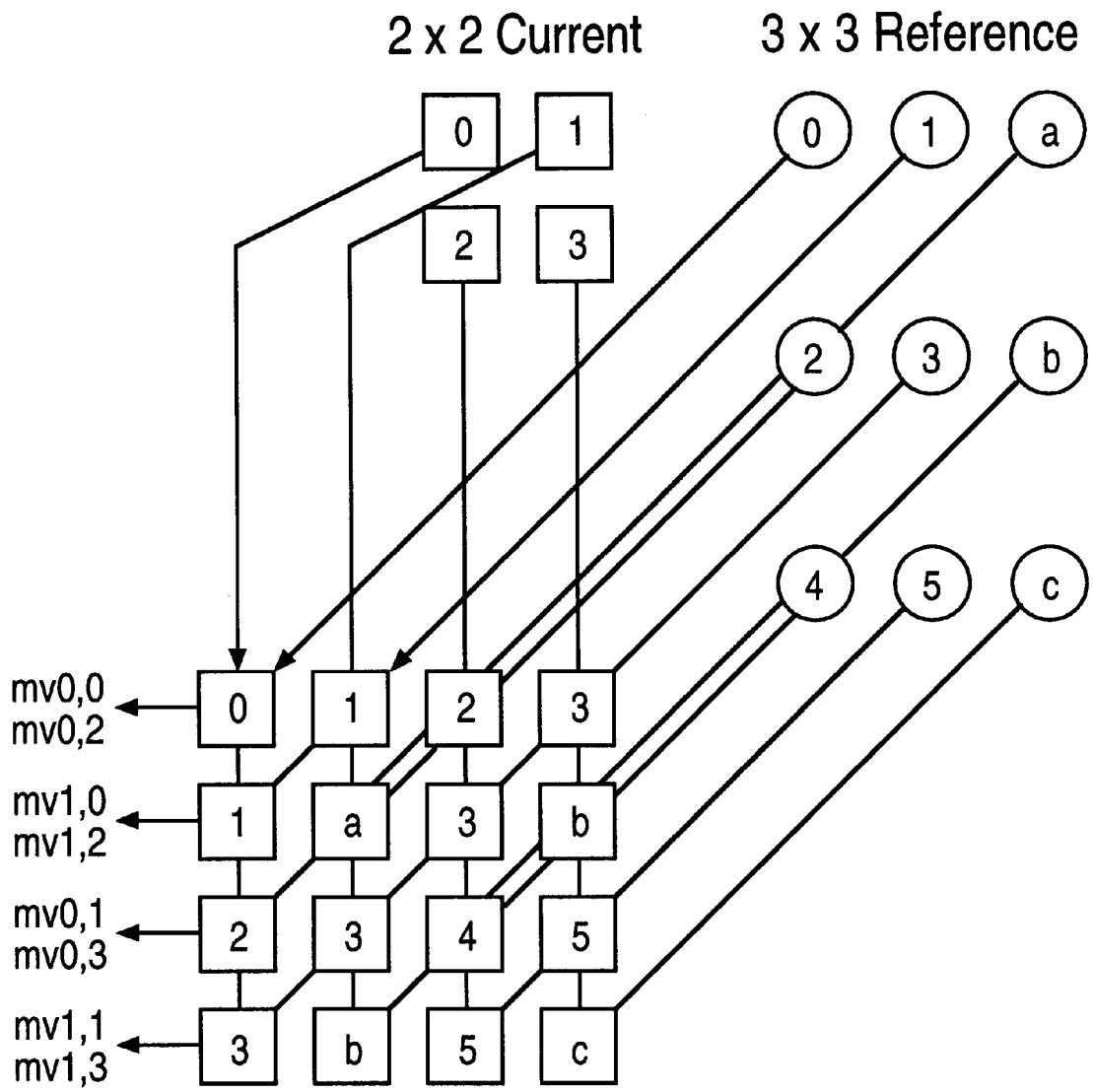
FIG. 19c shows the structure of matcher 1608.

The basic algorithm of matcher 1608 is illustrated by FIGS. 19a–19c. Matcher 1608 receives a 2×8 slice of current pixels and a 4×12 area of reference pixels over eight clock cycles. As illustrated by FIG. 19b, the area of reference pixels are provided to matcher 1608 as half-tiles r0, r1, r2, r3, r4 and r5 Subpel filter 1606 can be programmed to sub-sample the reference area using a two-tap 1-1 filter in either the vertical or the horizontal direction, or both (i.e. the neighboring pixels are averaged vertically, as well as horizontally), The resulting 3×11 pixel filtered reference area is provided as five 3×3 pixel overlapping reference areas. As shown in FIG. 19a, each 3×3 reference area is offset from each of its neighboring 3×3 reference area by a distance of two pixels. Alternatively, the 1-1 filter in either direction can be turned off. When the 1-1 filter in either direction is turned off, the 3×11 pixel reference resulting 3×11 pixel filtered reference area is provided as five 3×3 pixel overlapping reference areas. As shown in FIG. 19a, each 3×3 reference area is offset from each of its neighboring 3×3 reference area by a distance of two pixels. Alternatively, the 1-1 filter in either direction can be turned off. When the 1-1 filter in either direction is turned off, the 3×11 pixel reference area is obtained by discarding a pixel in the direction in which averaging is skipped. In matcher 1608, the 2×8 slice of current pixels is divided into four 2×2 pixel areas C1, C1', C2 and C2'. Each of the four 2×2 areas of current pixels is scored against one or two of the five 3×3 reference areas. For each 2×2 pixel current area and 3×3 pixel reference area matched, four motion vectors are evaluated. These motion vectors are indicated in FIG. 19b by the "X" markings in the 3×3 reference area. These motion vectors have an origin in the 2×2 current area indicated by "X" marking.

Referring back to FIG. 19a, in cycle 0, 2×2 pixel area 1901 is matched in matcher 1608 against 3×3 reference area 1921 to evaluate motion vectors (0,0), (1,0), (0,1) and (1,1). In cycle 1, the 3×3 reference area 1921 is replaced by reference area 1922 and the motion vectors (0,2), (1,2), (0,3) and (1,3) are evaluated. In cycle 2 and subsequent even cycles 4 and 6, the 2×2 current pixel area is successively replaced by 2×2 current pixel areas 1902, 1903 and 1904. In each of the even cycles, motion vectors (0,0), (1,0), (0,1) and (1,1) are evaluated against 3×3 reference pixel areas 1922, 1923 and 1924. In cycle 3 and subsequent odd cycles and 7, the 3×3 reference pixel area is successively replaced by 3×3 reference pixel areas 1922, 1923 and 1924. In each of the odd cycles, the motion vectors (0,2), (1,2), (0,3) and (1,3) are evaluated.

Figure 19D:
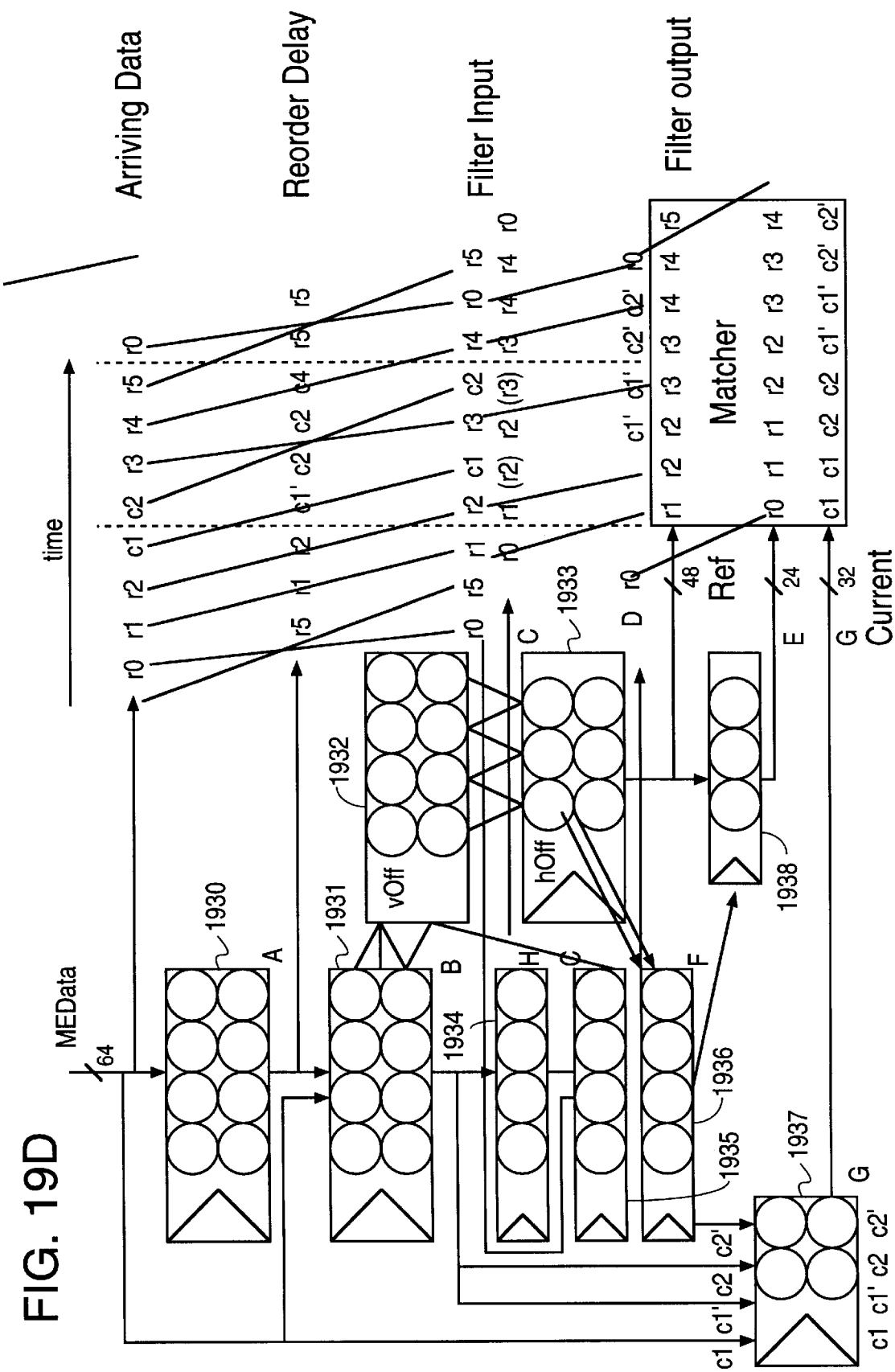
FIG. 19d shows the pipeline in the motion estimator 111 formed by the registers in subpel filter 1606.

Matcher 1608 evaluates the four motion vectors in each cycle by computing sixteen absolute differences. The computation of these sixteen absolute differences is illustrated in FIG. 19c. Matcher 1608 comprises four rows of four absolute difference circuits. To illustrate the motion vector evaluation process, the 2×2 current pixels and the 3×3 reference pixels are labelled (0–3) and (0–5 and a–c) respectively. As shown in FIG. 19*c*, the four rows of matcher 1608 computes the four absolute differences between the pixels in (a) current quad pel 0 and reference quad pel 0; (b) current quad pel 0 and reference quad pel 1; (c) current quad pel 0 and reference quad pel 2; and (d) current quad pel 0 and reference quad pel 3, respectively. At the end of each cycle, the four absolute differences of each row are summed to provide the "score" for a motion vector. The sums of absolute differences in the four rows of difference circuits in matcher 1608 represent the scores of the motion vectors (0,0), (1,0), (0,1) and (1,1) during even cycles, and the scores of the motion vectors (0,2), (1,2), (0,3) and (1,3) during odd cycles. The four evaluations of each motion vector are summed over the macroblock to provide the final score for the motion vector. The motion vector with the minimum score for the macroblock is selected as the motion vector for the macroblock. As discussed above, 64 bits of pixel data are fetched from window memory 705. Pipeline registers in subpel filter 1606 are used in motion estimator 111. The pipeline is shown in FIG. 19*d*. In FIG. 19*d*, the data flow through the input of motion estimator 111, register 1930, register 1931, register 1932, and register 1935 are shown on the right hand side as time sequences of half-pixel data. For example, as shown in FIG. 19*d*, the sequence in which the 2×8 slice of current pixels and the 4×12 reference frame pixels arriving at the motion estimator unit 111 is r0, r1, r2, c1, c2, r3, r4 and r5. (The 2×2 pixel areas c1 and c1', c2 and c2' are fetched together).

At every clock cycle, a 64-bit datum is fetched from window memory 705. Quad pel c1 is extracted from half-tile c1 and provided to the register 1937. In this embodiment, to provide the reference half-tiles r0 and r3 to matcher 1606 in time, reference areas r0 and r3 bypass register 1930 and join the pipeline at register 1931. Reference area r0 of the next reference area used for evaluation of the next patch of motion vectors is latched into register 1931 ahead of reference area r5 used for evaluation of the current patch of motion vectors. Also, reference area r3 for evaluation of the current patch of motion vectors is latched into register 1931 prior to quad pel C2. Thus, a reordering of the reference half-tiles is accomplished at register 1931.

The filtered reference areas r0–r5 pass through register 1932 for vertical filtering and pass through register 1933 for horizontal filtering. Quad pel c1' and quad pel c2 are extracted from the output terminals of register 1931 to be provided to register 1937 at the second and the fourth cycles of the evaluation of the slice. Quad pel c2' passes through register 1935 and 1936 to be provided to register 1937 at the fifth cycle of the evaluation of the slice. Reference area r0 is reordered to follow the reference area r5 in the evaluation of the previous patch. The reference areas r0–r5 are latched in order into registers 1933 and 1938 for matcher 1606.

VLC 109 and VLD 110

VLC 109 encodes 8×8 blocks of quantized AC coefficients into variable length codes with zero-runlength and non-zero AC level information. These variable length codes are packed into 16-bit halfwords and written into VLC FIFO 703, which is a 32-bit wide 16-deep FIFO Memory. Once VLC FIFO 703 is 50% full, an interrupt is generated to memory controller 104, which transfers these variable length codes from VLC FIFO 703 under DMA mode. Each such DMA transfer transfers eight 32-bit words.

Figure 20A:
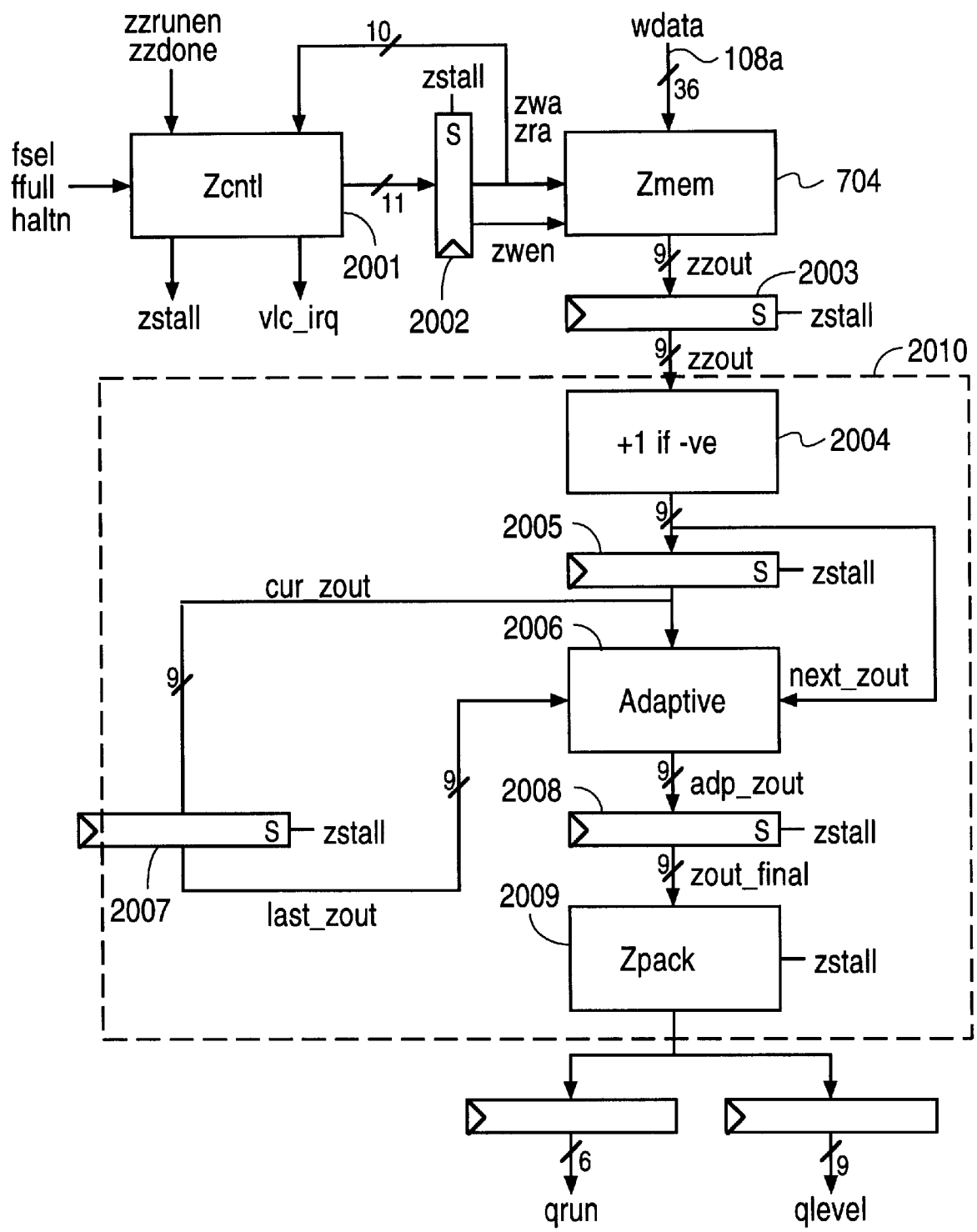
FIGS. 20a and 20b together form a block diagram of VLC 109.
Figure 20B:
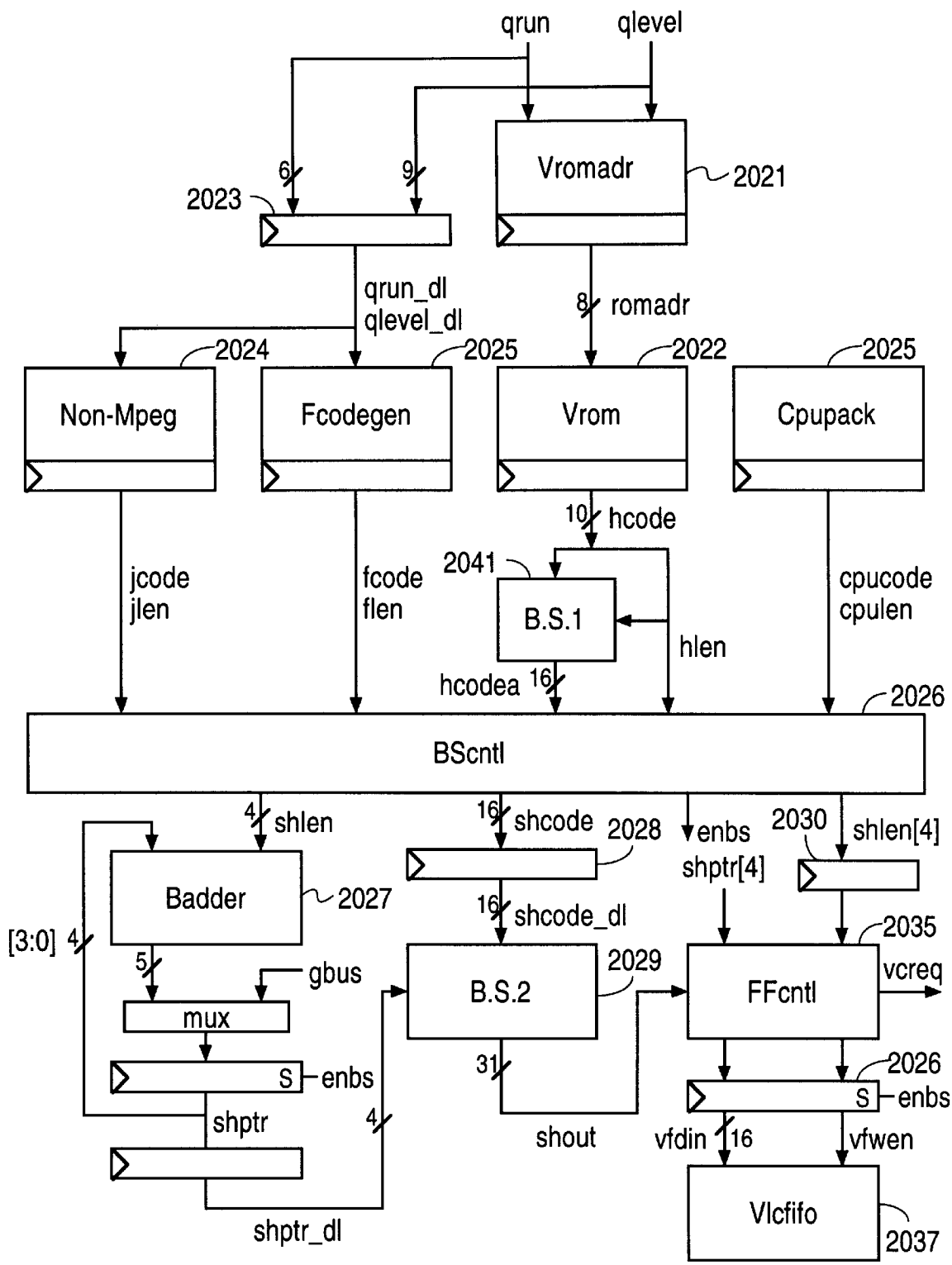

FIGS. 20*a* and 20*b* form a block diagram of VLC 109. As shown in FIG. 20*a*, Zmem 704 receives from processor bus 108*a* 36-bit words. Zmem 704, includes two FIFO memories, which are implemented as a 16×36 bits dual port SRAM and a 64×9 bits dual port SRAM, for DCT and IDCT coefficients during encoding and decoding respectively. The two ports of Zmem 704 are: (a) a 36-bit port, which receives data words from processor bus 108*a* during encoding, and (b) a 9-bit read port, which provides data to a zero-packer circuit 2010 during encoding.

Zmem controller 2001 generates the read and write addresses ("zra" and "zwa") and the control signals of Zmem 704. The Zmem write enable signal "zwen" is generated by Zmem controller 2001 when a write address "zwa" is provided during a write access. Within Zmem controller 2001, a binary decoder and a "zig-zag" order decoder are provided respectively for accessing the 36-bit port and the 9-bit port respectively. During encoding, the binary decoder accesses the Zigzag memory 704 in binary order to allow the 8×8 blocks of DCT coefficients to be received into Zmem 704 as a series of quad pels. For zero packing operations during encoding, the zig-zag order decoder accesses Zig-zag memory 704 in zig-zag order. The start of a 8×8 block is signalled by Zcontroller 2001 receiving the "zzrunen" signal and completes when the "zzdone" signal is received. When VLC FIFO 703 is full, indicated by signal "ffull" or, for any reason, the "haltn" signal is asserted by the host computer, the VLC pipeline is stalled by Zmem controller 2001 asserting the control signal "zstall".

Zero packer circuit 2010 comprises programmable adaptive threshold circuit 2006 which sets an AC coefficient to zero when (i) the AC coefficient is less than a user programmable threshold and (ii) the immediately preceding and the immediately following AC coefficients are zero. When a negative or a negative non-intra AC coefficient is received in zero packer circuit 2010, incrementer 2004 increments the AC coefficient by 1. This increment step is provided to complete a previous quantization step. The AC coefficients immediately preceding and immediate following the current AC coefficient received at adaptive threshold circuit 2006 are held at registers 2005 and 2007. If the current AC coefficient is less than a predetermined threshold stored in the VLC control register (not shown), and the preceding and following AC coefficients are zero, the current AC coefficient is set to zero. By setting the current AC coefficient to zero when the immediately preceding and the immediately following AC coefficients are zero, a longer zero run is created, at the expense of one sub-threshold non-zero coefficient. In the present embodiment, this adaptive threshold can be set to any value between 0–3. In addition, to preserve the values of lower frequency AC coefficients, the user can also enable adaptive threshold filtering for AC coefficients beginning at the 5th or the 14th AC coefficient of the 8×8 block.

Zero packer 2009 provides as output data a pair of values, representing the length of a run of zeroes, and a non-zero AC coefficient. The output data of zero packer 2009 are provided to a read-only memory (rom) address generator 2021 (FIG. 20*b*), which generates addresses for looking up MPEG variable length codes in rom 2022. In this embodiment, not all combinations of runlength-AC value are mapped into variable length codes, the unmapped combinations are provided as 20-bit or 28-bit fixed length "escape" values by fixed length code generator 2025. The present embodiment can generate non-MPEG fixed length codes using non-MPEG code circuit 2024. Framing information in the variable length code stream are provided by packing circuit 2025.

MPEG rom 2022 generates a 6-bit non-zero code and a 4-bit length code. The final variable length code is provided by barrel shifter 2041, which zero-stuffs the 6-bit non-zero code according to the value of the 4-bit length code. Barrel shifter control logic 2026 controls both barrel shifter 2041 and barrel shifter 2029, code generator 2025, non-MPEG code circuit 2024 and packing circuit 2026.

The variable length codes, whether from MPEG rom 2022, fixed length code generator 2025, non-MPEG code circuit 2024 or packing circuit 2025, are shifted by barrel shifter 2029 into a 16-bit halfword, until all bits in the halfword are used. The number of bits used in the halfword in Barrel shifter 2029 is maintained by adder 2027. 16-bit outputs of barrel shifter 2029 are written into VLC FIFO 703 under the control of FIFO controller 2035. VLC FIFO 703, which is implemented as a 16×32-bit FIFO, receives a bit stream of 16-bit halfwords and is read by controller 104 over processor bus 108*a* as 32-bit words. FIFO controller 2035 sends a DMA request to memory controller 104 by asserting signal VC_req when VLC FIFO 703 2037 contains 8 or more 32-bit words. A stall condition (signal "ffull" asserted) for VLC 109 is generated when address 'a' (hexadecimal) is exceeded. The stall condition prevents loss of data due to an overflow of VLC FIFO 703.

Decoding by VLD 110 can be achieve by a decoder such as discussed in the MPEG decoder of the aforementioned Copending Application.

Conclusion

The present embodiment provides a high performance video signal encoder/decoder on a single integrated circuit. However, the principles, algorithms and architecture described above are applicable to other implementations, such as a multi-chip implementation, or a system level implementation. Further, although the present invention is illustrated by an implementation under the MPEG standard, the present invention may be used for encoding video signals under other video encoding standards.

The above detailed description is provided to illustrate the specific embodiment of the present invention and is not intended to be limiting. Many variations and modifications are possible within the scope of the present invention. The present invention is set forth in the following claims.

We claim:

1. A structure for performing motion estimation in the compression of video data, said video data comprising macroblocks of pixels in a current frame and macroblocks of pixels in a reference frame, said structure comprising:

a memory for storing said macroblocks of said current frame and said macroblocks of said reference frame;

a filter receiving a first group of pixels from said memory for resampling said first group of pixels, said first group of pixels being pixels from said macroblocks of said reference frame;

a matcher receiving said resampled first group of pixels and a second group of pixels, said matcher matching said second group of pixels to said resampled first group of pixels, for deriving a set of scores each corresponding to one of a predetermined group of motion vectors between said current frame and said reference frame, said second group of pixels being pixels from a macroblock of a current frame and each of said scores being a measure of the differences between said second group of pixels and said resampled first group of pixels under a corresponding motion vector within said predetermined group; and means receiving said set of scores for selecting, among said predetermined group of motion vectors, a motion vector for said macroblock of said current frame.

2. A structure as in claim 1, wherein said means for selecting a motion vector comprises:

a register file for storing, for each motion vector of said predetermined group of motion vectors, the best score for said motion vector over the pixels of said macroblock of said current frame, said best score representing the least difference for said motion vector derived by said matcher;

a comparator for comparing, for each motion vector of said predetermined group of motion vectors, said best score in said register file against the corresponding score derived by said matcher; and means for storing into said register file said corresponding score in lieu of said best score, when said corresponding score represents a lesser difference between said first and second group of pixels for said motion vector than said best score.

3. A structure as in claim 1, wherein said first group of pixels includes a m×n configuration of reference pixels resampled to a (m−1)×(n−1) configuration of pixels, and wherein said second group of pixels comprises a p×q configuration of pixels, where m, n, p and q are integers.

4. A structure as in claim 3, wherein said resampled first group of pixels are provided to said matcher in smaller groups over a predetermined number of clock cycles, each of said smaller groups including an (m−1)×(m−1) configuration of pixels.

5. A structure as in claim 4, wherein each (m−1)×(m−1) configuration of pixels overlaps the immediately following (m−1)×(m−1) configuration of pixels in a subsequent clock cycle over an (m−1)×1 area.

6. A structure as in claim 5, wherein in each clock cycle, an (m−1)×(m−1) configuration of pixels from said resampled first group are matched against a p×p configuration of pixels from said second group of pixels.

7. A structure as in claim 6, wherein in said p×p configuration of pixels are non-overlapping with other p×p configuration of pixels provided to said matcher throughout said predetermined number of clock cycles.

8. A structure as in claim 1, wherein m, n, p and q have values 4, 12, 2, and 8 respectively.

9. A structure as in claim 1, further comprises means for detecting a boundary of said reference frames, said means for detecting disables matching between said resampled first group of pixels and said second group of pixels for motion vectors which translate a macroblock of said resampled first group of pixels beyond said boundary detected.

10. A structure as in claim 9, wherein said means for detecting a boundary disregards scores for motion vectors which renders a portion of a macroblock of said resampled first group of pixels beyond said boundary.

11. A structure as in claim 1, wherein said memory comprises:

an odd memory bank;

an even memory bank;

a first input bus;

a second input bus; and a first multiplexing structure connecting between said first and second input busses and said odd and even memory banks, to allow access to either one of said memory banks from either one of said first and second input busses.

12. A structure as in claim 11, further comprising:

a first output bus;

a second output bus;

a second multiplexing structure connecting said first and second memory banks to said first and second output busses, to allow output data from either one of said odd and even memory banks to be routed to either one of said first and second output busses.

13. A structure as in claim 12, further comprises:

first and second registers each receiving an n-bit output datum from the corresponding one of said odd and even memory banks, each of said first and second registers being clocked by opposite phases of a first clock signal having a first clock rate;

a multiplexor receiving said n-bit data from said first and second registers to extract an n-bit output datum from said n-bit data of said first and second memory banks; and a third register receiving said n-bit output datum of said multiplexor, said third register being clocked by a second clock signal having a clock rate twice said first clock rate.

14. A method for performing motion estimation for a video signal, said video signal comprising a first group of pixels from a current frame and a second group of pixels in a reference frame, said method comprising:

resampling said first and second groups of pixels to obtain a third group of pixels and a fourth group of pixels, said third and fourth groups of pixels being representations of said video signal at a first reduced resolution;

performing a first reduced resolution motion estimation based on a said third and fourth groups of pixels to obtain a first motion vector;

performing a second motion estimation using said first group of pixels, translated by said first motion vector, and a subset of said second group of pixels to obtain an incremental motion vector, said subset of said second group of pixels being pixels within a predetermined distance of the target position of said first motion vector; and providing as output a motion vector equalling the sum of said first motion vector and said incremental motion vector.

15. A method as in claim 14, wherein said step of performing a first reduced resolution motion estimation comprises the steps of:

resampling said third and fourth groups of pixels to obtain a fifth group of pixels and a sixth group of pixels, said fifth and sixth groups of pixels being representations of said video signal at a second reduced resolution;

performing a second reduced resolution motion estimation based on a said fifth and sixth groups of pixels to obtain a second motion vector;

performing a motion estimation using said third group of pixels, translated by said second motion vector, and a subset of said fourth group of pixels to obtain a second incremental motion vector, said subset of said fourth group of pixels being pixels within a predetermined distance at said first resolution of the target position of said second motion vector; and providing as output said first motion vector equalling the sum of said second motion vector and said second incremental motion vector.

16. A method for performing motion estimation in the compression of video data, said video data comprising macroblocks of pixels in a current frame and macroblocks of pixels in a reference frame, said method comprising the steps of:

storing in a memory said macroblocks of said current frame and said macroblocks of said reference frame;

receiving in a filter a first group of pixels from said memory for resampling said first group of pixels, said first group of pixels being pixels from said macroblocks of said reference frame;

receiving in a matcher said resampled first group of pixels and a second group of pixels, said matcher matching said second group of pixels to said resampled first group of pixels, for deriving a set of scores each corresponding to one of a predetermined group of motion vectors between said current frame and said reference frame, said second group of pixels being pixels from a macroblock of a current frame and each of said scores being a measure of the differences between said second group of pixels and said resampled first group of pixels under a corresponding motion vector within said predetermined group; and selecting among said predetermined group of motion vectors, a motion vector for said macroblock of said current frame.

17. A method as in claim 16, wherein said step of selecting a motion vector comprises the steps of:

storing in a register file, for each motion vector of said predetermined group of motion vectors, the best score for said motion vector over the pixels of said macroblock of said current frame, said best score representing the least difference for said motion vector derived by said matcher;

comparing, for each motion vector of said predetermined group of motion vectors, said best score in said register file against the corresponding score derived by said matcher; and storing into said register file said corresponding score in lieu of said best score, when said corresponding score represents a lesser difference between said first and second group of pixels for said motion vector than said best score.

18. A method as in claim 16, wherein said first group of pixels includes a m×n configuration of reference pixels resampled to a (m−1)×(n−1) configuration of pixels, and wherein said second group of pixels comprises a p×q configuration of pixels, where m, n, p and q are integers.

19. A method as in claim 18, wherein said resampled first group of pixels are provided to said matcher in smaller groups over a predetermined number of clock cycles, each of said smaller groups including an (m−1)×(m−1) configuration of pixels.

20. A method as in claim 19, wherein each (m−1)×(m−1) configuration of pixels overlaps the immediately following (m−1)×(m−1) configuration of pixels in a subsequent clock cycle over an (m−1)×1 area.

21. A method as in claim 20, wherein in each clock cycle, an (m−1)×(m−1) configuration of pixels from said resampled first group are matched against a p×p configuration of pixels from said second group of pixels.

22. A method as in claim 21, wherein in said p×p configuration of pixels are non-overlapping with other p×p configuration of pixels provided to said matcher throughout said predetermined number of clock cycles.

23. A method as in claim 16, wherein m, n, p and q have values 4, 12, 2, and 8 respectively.

24. A method as in claim 16, further comprises the step of detecting a boundary of said reference frames, said means for detecting disables matching between said resampled first group of pixels and said second group of pixels for motion vectors which translate a macroblock of said resampled first group of pixels beyond said boundary detected.

25. A method as in claim 24, wherein said step of detecting a boundary disregards scores for motion vectors which renders a portion of a macroblock of said resampled first group of pixels beyond said boundary.

26. A method as in claim 16, wherein said step of storing in a memory comprises the step of:

organizing said memory into an odd memory bank, and an even memory bank;

providing a first input bus and a second input bus; and connecting a first multiplexing structure between said first and second input busses and said odd and even memory banks, to allow access to either one of said memory banks from either one of said first and second input busses.

27. A method as in claim 26, further comprising the steps of:

providing a first output bus and a second output bus; and connecting a second multiplexing structure between said first and second memory banks and said first and second output busses, to allow output data from either one of said odd and even memory banks to be routed to either one of said first and second output busses.

28. A method as in claim 27 further comprising the steps of:

receiving in each of a first register and a second register an n-bit output datum from the corresponding one of said odd and even memory banks, each of said first and second registers being clocked by opposite phases of a first clock signal having a first clock rate;

extracting an n-bit output datum from said n-bit data of said first and second memory banks; and receiving in a third register said n-bit output datum of said extracting step, said third register being clocked by a second clock signal having a clock rate twice said first clock rate.

29. A structure for performing motion estimation for a video signal, said video signal comprising a first group of pixels from a current frame and a second group of pixels in a reference frame, said structure comprising:

means for resampling said first and second groups of pixels to obtain a third group of pixels and a fourth group of pixels, said third and fourth groups of pixels being representations of said video signal at a first reduced resolution;

means for performing a first reduced resolution motion estimation based on a said third and fourth groups of pixels to obtain a first motion vector;

means for performing a second motion estimation using said first group of pixels, translated by said first motion vector, and a subset of said second group of pixels to obtain an incremental motion vector, said subset of said second group of pixels being pixels within a predetermined distance of the target position of said first motion vector; and means for providing as output a motion vector equalling the sum of said first motion vector and said incremental motion vector.

30. A structure as in claim 29, wherein said means for performing a first reduced resolution motion estimation comprises:

means for resampling said third and fourth groups of pixels to obtain a fifth group of pixels and a sixth group of pixels, said fifth and sixth groups of pixels being representations of said video signal at a second reduced resolution;

means for performing a second reduced resolution motion estimation based on a said fifth and sixth groups of pixels to obtain a second motion vector;

means for performing a motion estimation using said third group of pixels, translated by said second motion vector, and a subset of said fourth group of pixels to obtain a second incremental motion vector, said subset of said fourth group of pixels being pixels within a predetermined distance at said first resolution of the target position of said second motion vector; and means for providing as output said first motion vector equalling the sum of said second motion vector and said second incremental motion vector.

* * * * *